United States Patent
Mihara et al.

(10) Patent No.: US 7,393,912 B2
(45) Date of Patent: Jul. 1, 2008

(54) POLYHYDROXYALKANOATE CONTAINING AMIDE GROUP, SULFONIC GROUP, AND SULFONATE ESTER GROUP, METHOD FOR PRODUCING THE SAME, AND CHARGE CONTROL AGENT, TONER, IMAGE FORMING METHOD, AND IMAGE FORMING APPARATUS

(75) Inventors: Chieko Mihara, Isehara (JP); Tetsuya Yano, Atsugi (JP); Shinya Kozaki, Tokyo (JP); Tsutomu Honma, Atsugi (JP); Takashi Kenmoku, Fujisawa (JP); Tatsuki Fukui, Yokohama (JP); Ako Kusakari, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 11/159,354

(22) Filed: Jun. 23, 2005

(65) Prior Publication Data

US 2006/0014921 A1    Jan. 19, 2006

(51) Int. Cl.
*C08G 63/02*    (2006.01)

(52) U.S. Cl. ............... 528/272; 528/271; 528/274; 424/78.37; 430/108.22; 430/110.22; 430/110.2

(58) Field of Classification Search .................. None
See application file for complete search history.

(56) References Cited

U.S. PATENT DOCUMENTS

| 4,837,394 | A | 6/1989 | Alexandrovich et al. | .... 430/110 |
| 4,968,575 | A | 11/1990 | Matsumura et al. | .... 430/110 |
| 5,849,450 | A | 12/1998 | Wilson et al. | .... 430/110 |
| 2003/0059907 | A1 | 3/2003 | Suzuki et al. | .... 435/135 |
| 2003/0073804 | A1 | 4/2003 | Imamura et al. | .... 528/274 |
| 2003/0100700 | A1 | 5/2003 | Imamura et al. | .... 528/272 |
| 2003/0104300 | A1 | 6/2003 | Kenmoku et al. | .... 430/108.22 |
| 2003/0203987 | A1 | 10/2003 | Nomoto et al. | .... 523/160 |

FOREIGN PATENT DOCUMENTS

| EP | 1236752 A2 | 9/2002 |
| EP | 1253161 A2 | 10/2002 |
| EP | 1253162 A2 | 10/2002 |
| EP | 1254918 A2 | 11/2002 |
| EP | 1256606 A2 | 11/2002 |

OTHER PUBLICATIONS

U.S. Appl. No. 11/165,357, filed Jun. 2005, Yano et al.*
U.S. Appl. No. 11/165,356, filed Jun. 2005, Yano et al.*
U.S. Appl. No. 10/579,805, filed May 2006, Kenmoku et al.*
U.S. Appl. No. 10/567,762, filed Feb. 2006, Kenmoku et al.*
U.S. Appl. No. 10/581,698, filed Mar. 2007, Kenmoku et al.*
Steinbuchel, et al. "Diversity of bacterial polyhydroxyalkanoic acids", FEMS Microb.Lett., vol. 128, (1995) 219-228.
Park, et al., "Epoxidation of Bacterial Polyesters . . . 10-Undecenoic Acid", Macromolecules, vol. 31, (1998) 1480-1486.

* cited by examiner

*Primary Examiner*—James Seidleck
*Assistant Examiner*—Gennadiy Mesh
(74) *Attorney, Agent, or Firm*—Fitpatrick, Cella, Harper & Scinto

(57) ABSTRACT

A polyhydroxyalkanoate containing in a molecule at least one unit represented by the chemical formula (1). The polyhydroxyalkanoate is a biodegradable plastic with enhanced melt-processability and exhibits excellent charging stability, high chargeability, and enhanced dispersibility when used as a charge control agent of a toner in an electrophotographic process.

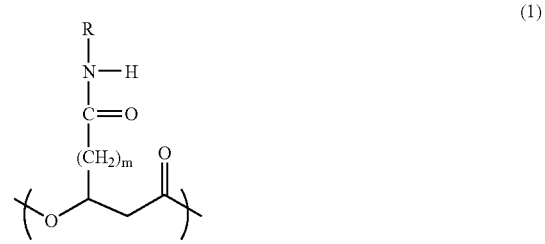

(1)

(R denotes $-A_1(-SO_2R_1)_x$. $R_1$ is selected from OH, a halogen atom, ONa, OK, and $OR_{1a}$. $R_{1a}$ and $A_1$ are selected from a substituted or unsubstituted aliphatic hydrocarbon structure, a substituted or unsubstituted aromatic ring structure, and a substituted or unsubstituted heterocyclic structure. Further, m and x are integers selected from 1 to 8, and when two or more units exist, each of R, $R_1 R_{1a}$, $A_1$, m, and x is defined as above independently for each of the units.)

26 Claims, 8 Drawing Sheets

POLYHYDROXYALKANOATE CONTAINING AMIDE GROUP, SULFONIC GROUP, AND SULFONATE ESTER GROUP, METHOD FOR PRODUCING THE SAME, AND CHARGE CONTROL AGENT, TONER, IMAGE FORMING METHOD, AND IMAGE FORMING APPARATUS

TECHNICAL FIELD

The present invention relates to a novel polyhydroxyalkanoate (hereinafter simply "PHA") containing a sulfonic group and a production method thereof. More specifically, the present invention relates to a polyhydroxyalkanoate containing a sulfonic group as a hydrophilic group or a polar group and a production method thereof.

Furthermore, the present invention relates to a charge control agent to be used in a recording process that utilizes, for example, an electrophotographic, electrostatic, or magnetic recording method, an electrostatic charge image developing toner, an image forming method making use of the toner, and an image forming apparatus making use of the toner.

BACKGROUND ART

Related Background Art for Resin (Problems in Resins Used in the Art)

Conventionally, plastics, such as a polyethylene terephthalate (PET) resin, a polyester resin, a vinyl chloride resin, and a polyolefin resin, have been used for various applications as molded products or the like such as food containers, beverage bottles, cosmetic containers, and flower and plant pots.

Most of those plastics would have been discarded after use. Conventionally, such plastic waste has been disposed by incineration, reclamation, or the like. However, the incineration of the waste generates large combustion energy. Thus, the incineration of the waste has problems in durability of an incinerator at high combustion temperatures, disposal costs involved in installation of a high-temperature-resistance incinerator, air pollution involved in generation of harmful incineration gas such as carbon monoxide, a sulfur compound, a chlorine gas, and dioxin, and the like. Furthermore, in the reclamation disposal, the waste will remain semi-permanently without being decomposed, and be deposited as waste on a disposal site. Therefore, the deposit is recognized as a waste problem being emerged as a social issue. Furthermore, the waste exists as it is in the earth, so that other problems will arise. For example, the ground of a reclaimed area cannot be stabilized, and the environment and various living beings in the reclaimed area and the surrounding areas thereof may be adversely affected.

For solving those problems, in recent years, biodegradable resins have been noteworthy in the art. Here, the phrase "biodegradable resins" means resins that have physical properties almost equal to those of general-purpose plastics when used as materials, and can be quickly decomposed after being disposed by the actions of microorganisms in the environment such as in soil, in compost, in activated sludge, and under water. In other words, the biodegradable resins can be finely decomposed, and some of the resins can be finally decomposed into carbon dioxide and water.

Conventionally, for satisfying the above requirements, in addition to specific polyester biodegradable resins, blended resin compositions have been known as biodegradable resins. Such blended resin compositions include those of a starch—ethylene/vinyl alcohol copolymer resin, an ethylene/vinyl alcohol copolymer resin—aliphatic polyester resin, and an aliphatic polyester resin—polyolefin resin. Those resins or resin compositions are practically used in the art through the use of processing means suitable for various applications. However, there has not been proposed an excellent resin having well-balanced properties in terms of various requisite physical properties, biodegradability required after being disposed, and processability required at the time of manufacture, for example.

(Polyhydroxyalkanoate (PHA))

In recent years, as one method of solving the environmental contamination caused by wastes of plastic molded products and so on, there has been proposed to use a biodegradable resin synthesized by a microorganism as a molding material. For instance, as a biodegradable resin originating from a microorganism, there have been known a polyhydroxyalkanoate (hereinafter, it may be abbreviated as PHA) such as poly-3-hydroxy-n-butyric acid (hereinafter, it may be abbreviated as PHB) or a copolymer of 3-hydroxy-n-valeric acid (hereinafter, it may be abbreviated as 3HV) with 3-hydroxy-n-butyric acid (hereinafter, it may be abbreviated as 3HB) (hereinafter, the copolymer may be abbreviated as PHB/V), polysaccharides such as bacterial cellulose and pullulan, and polyamino acids such as poly-γ-glutamic acid and polylysine. Of those, in particular, a PHA can be used for producing various kinds of products by melt-processing and so on as in the case of the conventional plastics. In addition, a PHA is expected to be applied as a medical flexible material and the like because of its excellent biocompatibility.

It has hitherto been reported that many microorganisms produce PHAs and accumulate PHAs in the cell. It is known that the PHAs thus produced may have various compositions and structures depending on types of microorganisms used for their production, the composition of culture medium, the conditions for culture and so forth. Researches on how to control compositions and structures of PHAs to be produced have hitherto chiefly been made from the viewpoint of the improvement in physical properties. In particular, biosynthesis of PHAs obtained by polymerizing monomer units having relatively simple structures including 3HB, 3HV, 3-hydroxy-n-hexanoic acid (hereinafter, referred to as 3HHx), and 4-hydroxy-n-butyric acid (hereinafter, referred to as 4HB) has been studied, and production of PHAs by various microorganisms are reported. However, PHAs containing 3-hydroxyalkanoate units of short-chain-length (hereinafter, may be abbreviated as scl-PHAs) have close melting point and heat decomposition temperature and tend to be heat-decomposed easily. Therefore, extrusion moldability was insufficient. Further, PHB has high crystallinity, and extension or the like thereof is small; therefore, mechanical properties tend to degrade.

Recently, researches on polyhydroxyalkanoate containing 3-hydroxyalkanoate units of medium-chain-length having about 4 to 12 carbon atoms (hereinafter, may be abbreviated as mcl-PHAs) are conducted vigorously. The production of mcl-PHAs using an acyclic aliphatic hydrocarbon, octanoic acid, hexanoic acid, sodium gluconate, or the like as a carbon source is confirmed. However, these mcl-PHAs have low melting points and become sticky above 50° C. and softening thereof may occur.

Meanwhile, the above PHAs are PHAs containing monomer units having alkyl groups alone on a side chain (hereinafter, may be referred to as usual-PHA) or PHAs similar thereto (for example, having alkenyl groups, which contain double bonds not in terminal portions, on a side chain) both of which are synthesized through β-oxidation of hydrocarbons or the like or through fatty acid synthesis from sugar by microorganisms. These PHAs are still not sufficient in terms of physical properties under the present situation, when considering widespread application thereof as plastics.

In order to expand the areas of application of PHAs, extensive studies for an improvement of physical properties thereof are important. Developments and searches on PHAs containing monomer units having more variety of structures are indispensable therefor. On the other hand, an "unusual PHAs", in which a substituent is introduced on a side chain, may be expected to bring forth a development as a "functional polymer" having extremely useful functions and properties resulting from the properties of the introduced substituent or the like by selecting the introduced substituent according to the desired physical properties or the like. That is, developments and searches on excellent PHAs allowing combination of functionality and biodegradability are also important objectives. Examples of the substituent may include: one having an aromatic ring (a phenyl group, a phenoxy group, or the like); an ester group; an unsaturated group having double bonds on terminal portions (an alkenyl group and an alkadienyl group), in particular, an allyl group; a cyano group; a halogenated hydrocarbon; and an epoxide. Examples of reported production of PHAs, which contain phenyl group or a partially substituted phenyl group as a substituent, include: production of a PHA containing a 3-hydroxy-5-phenyl valeric acid unit using 5-phenyl valeric acid as a substrate; production of a PHA containing a 3-hyroxy-5-(4'-tolyl)valeric acid unit using 5-(4'-tolyl) valeric acid as a substrate; and production of a PHA containing a 3-hydroxy-5-(2',4'-dinitrophenyl) valeric acid unit and a 3-hydroxy-5-(4'-nitrophenyl) valeric acid unit using 5-(2',4'-dinitrophenyl) valeric acid as a substrate. Examples of reported production of PHAs, which contain a phenoxy group or a partially substitute phenoxy group as a substituent, include: production of a PHA copolymer of 3-hydroxy-5-phenoxy valeric acid and 3-hydroxy-9-phenoxy nonanoic acid using 11-phenoxy undecanoic acid as a substrate; production of a PHA containing a 3-hydroxy-4-phenoxy butyric acid unit and a 3-hydroxy-6-phenoxy hexanoic acid unit from 6-phenoxy hexanoic acid; production of a PHA containing a 3-hydroxy-4-phenoxy butyric acid unit, a 3-hydroxy-6-phenoxy hexanoic acid unit, and 3-hydroxy-8-phenoxyoctanoic acid unit from 8-phenoxy octanoic acid; and production of a PHA containing a 3-hydroxy-5-phenoxy valeric acid unit and a 3-hydroxy-7-phenoxy heptanoic acid unit from 11-phenoxy undecanoic acid. Further, a PHA homopolymer containing a 3-hydroxy-5-(monofluorophenoxy) pentanoate (3H5(MFP)P) unit and a 3-hydroxy-5-(difluorophenoxy) pentanoate (3H5(DFP)P) unit and a PHA copolymer containing at least a 3H5(MFP)P unit or a 3H5(DFP)P unit are reported. The effect thereof includes a high melting point and capability of imparting stereoregularity and water repellency while retaining good processability. Further, researches are conducted on cyano group or nitro group substituted PHAs in addition to such fluorine group substituted PHAs described above. For example, reported is a production of a PHA containing 3-hydroxy-p-cyanophenoxy hexanoic acid or 3-hydroxy-p-nitrophenoxy hexanoic acid as a monomer unit using octanoic acid and p-cyanophenoxy hexanoic acid or p-nitrophenoxy hexanoic acid as substrates. PHAs of those reports are different from general PHAs having alkyl groups on side chains thereof, and each of the PHAs has an aromatic ring on a side chain, thus being advantageous in obtaining a polymer having physical properties derived from the aromatic ring. In addition, as an example of an unusual-PHA having a cyclohexyl group, production of the PHA from cyclohexyl butyric acid or cyclohexyl valeric acid is reported.

Recently, as a new category, not restricting to simply changing the physical properties, researches are conducted to develop new functions by producing PHAs having an appropriate functional group on a side chain and using the functional group. *Polymer*, 41, 1703-1709(2000) discloses that after producing PHA containing 3-hydroxyalkenoic acid as a monomer unit and having an unsaturated bond on a side chain terminus by using 10-undecenoic acid as a substrate, solubility of the PHA to solvents changed when it was converted to the corresponding 3-hydroxyalkanoic acid, which was synthesized through an oxidation reaction using potassium permanganate and has a diol on a side chain terminus. Thus, it become soluble in a polar solvent such as methanol, an acetone-water (80/20, v/v) mixed solvent, and dimethyl sulfoxide, and insoluble in a nonpolar solvent such as chloroform, tetrahydrofuran, and acetone. *Macromolecular chemistry*, 4, 289-293(2001) discloses that after producing a PHA containing 3-hydroxy-10-undecenoic acid as a monomer unit using 10-undecenoic acid as a substrate, an improvement of a decomposition rate was confirmed for PHA containing 3-hydroxy-9-carboxy nonanoic acid as a monomer unit synthesized through an oxidative cleavage reaction using potassium permanganate.

[Related Background Art for Toner]

Up to now, a number of methods are known as methods for electrophotography. In general, a copied image is obtained by forming an electrostatic latent image on an image-bearing member (photosensitive member) by utilizing a photoconductive material and by various means, subsequently developing the latent image by use of a toner to form a visible image (toner image), transferring the toner image to a transfer medium such as paper as the occasion demands, and then fixing the toner image to the transfer medium by heating and/or pressing. As methods by which an electrostatic latent image is formed into a visible image, cascade development, magnetic brush development, pressure development, and so forth are known in the art. Another method is also known in which a magnetic toner and a rotary developing sleeve provided with magnetic poles at the core are used and the magnetic toner is caused to scatter from the developing sleeve to a photosensitive member by the aid of a magnetic field.

Available as development methods used when electrostatic latent images are developed are a two-component development method making use of a two-component developer constituted of a toner and a carrier and a one-component development method making use of a one-component developer using no carrier and constituted only of a toner. Colored fine particles commonly called a toner are each composed of a binder resin and a colorant as essential components and optionally, a charge control agent, a magnetic powder, and so forth.

(Charge Control Agent)

In order to impart electric charges to the toner, the chargeability of the binder resin itself may be utilized without the use of any charge control agent, but the binder resin has poor charging stability with time and poor moisture resistance, thus making it difficult to obtain satisfactory image quality. Hence, a charge control agent is usually added for the purposes of charge retention and charge control of the toner.

Charge control agents nowadays known in the present technical field include, as agents having negative triboelectric properties (negative charge control agents), azo dye metal complexes, metal complexes of aromatic dicarboxylic acids, and metal complexes of salicylic acid derivatives. Also, known as positive charge control agents are nigrosine dyes, triphenylmethane dyes, organotin compounds such as quaternary ammonium salt dibutyltin oxides of various types, and so forth. Toners containing any of those as charge control agents, however, do not necessarily satisfy quality characteristics requisite for toner such as chargeability and stability with time depending on their compositions in some cases.

For example, toners containing azo dye metal complexes known as negative charge control agents are on a reasonable level in respect of the highness of charge amount. However, since the azo dye metal complexes are crystal compounds each having a low molecular weight, the complexes may have poor dispersibility depending on types of binder resins to be combined with the charge control agent. In such a case, the negative charge control agents are not uniformly distributed in the binder resins, and the resultant toners also have a charge amount distribution greatly lacking in sharpness, so that images to be obtained may have low gradation, showing poor image forming performance. Moreover, the azo dye metal complexes have color tones specific thereto, and hence, under the existing conditions, the complexes are used only in toners with limited hues centered around black. When the complexes are used for color toners, a serious problem arises in that the complexes do not have the clearness of colorants necessary for producing images highly requiring color tones.

As examples of nearly colorless negative charge control agents, metal complexes of aromatic dicarboxylic acids are cited, but the complexes are not perfectly colorless and exhibit low dispersibility in some cases because the complexes are crystal compounds each having a low molecular weight.

As for the nigrosine dyes and the triphenylmethane dyes known as positive charge control agents, the dyes themselves stand colored, hence under the existing conditions, the dyes are used only in toners with limited hues centered around black. The toners containing such dyes may have poor stability over time when used in continuous copying. Toners prepared from the conventional quaternary ammonium salts may exhibit insufficient moisture resistance, and may be poor in stability with time, failing to provide good quality images during repeated use.

In recent years, from the environmental conservation viewpoint, a curtailment of waste and an improvement in safety of waste have been globally perceived as problems. Such problems also exist in the field of electrophotography. With the wide spread use of imaging devices, the disposal of printed papers, waste toners, and copied papers is increasing year by year, and the safety of such waste is also an important subject from the standpoint of global environmental conservation.

Taking into account such a point, studies are being made on polymer charge control agents. Examples of the polymer charge control agents include compounds disclosed in U.S. Pat. No. 4,480,021, U.S. Pat. No. 4,442,189, and U.S. Pat. No. 4,925,765. Furthermore, in general, as polymer charge control agents used for toners exhibiting negative chargeability, there are employed copolymers of styrene and/or α-methylstyrene with alkyl(meth)acrylates or alkyl(meth)acrylate amides having a sulfonic group. Such materials are advantageous in that the materials are colorless, but should be added in a large amount to reach the target charge amount.

Thus, those compounds do not have sufficient performance as charge control agents, and have problems in charge amount, charging-rise property, stability with time, environmental stability, and so forth. Considering not only function but also influences on the human body and the environment of the charge control agent itself and the compounds or organic solvents used for the synthesis of the agent, there is a strong desire for a charge control agent which can achieve safer compounds, safer and milder synthesis processes, and use of smaller amounts of organic solvents. However, no report on the objective charge control agent and its synthesis process has been made. Hence, there is plenty of room for further improvement of a function of a charge control agent and its further contribution to environmental conservation.

[Other Prior Art Documents]

In the present invention, microorganisms described in U.S. Pat. No. 6,521,429 and U.S. Pat. No. 6,586,562 are used. In addition, the description about culture medium in J. Biol. Chem., 218, 97-106 (1956) is also incorporated herein. Furthermore, as the related art of the present invention, there are other documents that relate to a technique of obtaining a carboxylic acid by oxidative cleavage of a carbon-carbon double bond with an oxidizing agent (J. Chem. Soc., Perkin. Trans. 1, 806 (1973); Org. Synth., 4, 698 (1963); J. Org. Chem., 46, 19 (1981); and J. Am. Chem. Soc., 81, 4273 (1959)) and to a synthesis of 5-(4-methylphenly)valeric acid (Macromolecules, 29, 1762-1766 (1996)).

DISCLOSURE OF INVENTION

Researches to develop new functions for biodegradable resin PHA are attempted, but reports thereof are scarce. In particular, 3-hydroxy butyric acid has an advantage of being completely decomposed by microorganisms in the natural world; however, melt-processability was insufficient because of its property of high crystallinity and being hard. Therefore, a PHA, which improves the melt-processability, was desired.

The present invention provides a new PHA introducing a sulfonic group, which is a hydrophilic group, and a derivative thereof to improve the melt-processability and provides a production method for the new PHA. Further, a PHA of the present invention excels in biocompatibility from its hydrophilicity; therefore, its application as a flexible member for a medical application or the like can be expected.

Further, the present invention has an object to provide a negatively chargeable charge control agent which is more contributive to environmental conservation or the like, and which has high performance (large charge amount, quick rise of charging, superior stability with time, and high environmental stability) and improved dispersibility, an electrostatic charge image developing toner containing the charge control agent, and an image forming method and an image forming apparatus using the electrostatic charge image developing toner.

The inventors of the present invention have devoted themselves to research for a development of a new PHA introduced with a hydrophilic group, which is considered useful for improving the melt-processability, and as a result, have earned the following findings. That is, the inventors of the present invention have found that the above PHA has superb property as a charge control agent and is highly safe for human body and the environment. Further, when using an electrostatic charge image developing toner containing the above charge control agent for an image forming apparatus having a certain developing system, a significant advantage is exerted.

The present invention provides a polyhydroxyalkanoate characterized by including in a molecule thereof at least one unit represented by the chemical formula (1).

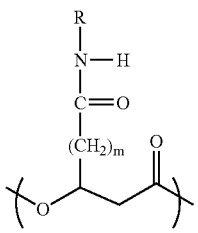

(1)

(R denotes $-A_1(-SO_2R_1)_x$. $R_1$ is selected from OH, a halogen atom, ONa, OK, and $OR_{1a}$. $R_{1a}$ and $A_1$ are selected from a substituted or unsubstituted aliphatic hydrocarbon structure, a substituted or unsubstituted aromatic ring structure, and a substituted or unsubstituted heterocyclic structure. Further, m and x are integers selected from 1 to 8, and when two or more units exist, each of R, $R_1$, $R_{1a}$, $A_1$, m, and x is defined as above independently for each of the units.)

Further, the present invention provides a production method for a polyhydroxyalkanoate characterized by comprising the steps of: preparing a base polyhydroxyalkanoate containing a unit represented by the chemical formula (22) and at least an amine compound represented by the chemical formula (23); and obtaining a polyhydroxyalkanoate containing a unit represented by the chemical formula (1) through a condensation reaction of the base polyhydroxyalkanoate and the amine compound.

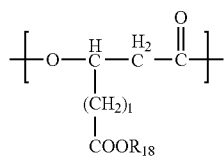

(22)

(l is an integer selected from 1 to 8, $R_{18}$ is selected from an H atom, an Na atom, and a K atom, and when two or more units exist, each of l and $R_{18}$ is defined as above independently for each of the units.)

(23)

($R_{19}$ is selected from OH, a halogen atom, ONa, OK, and $OR_{19a}$. Further, $R_{19a}$ and $A_3$ are selected from a substituted or unsubstituted aliphatic hydrocarbon structure, a substituted or unsubstituted aromatic ring structure, and a substituted or unsubstituted heterocyclic structure. y is an integer selected from 1 to 8, and when two or more units exist, each of $R_{19}$, $R_{19a}$, $A_3$, and y is defined as above independently for each of the units.)

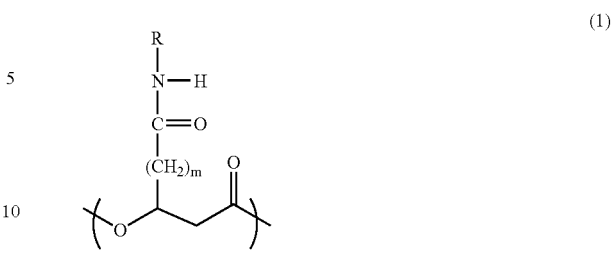

(1)

(R denotes $-A_1(-SO_2R_1)_x$. $R_1$ is selected from OH, a halogen atom, ONa, OK, and $OR_{1a}$. $R_{1a}$ and $A_1$ are selected from a substituted or unsubstituted aliphatic hydrocarbon structure, a substituted or unsubstituted aromatic ring structure, and a substituted or unsubstituted heterocyclic structure. Further, m and x are integers selected from 1 to 8, and when two or more units exist, each of R, $R_1$, $R_{1a}$, $A_1$, m, and x is defined as above independently for each of the units.)

Further, the present invention provides a charge control agent for controlling a charging state of a powder, characterized by including a polyhydroxyalkanoate containing in a molecule at least one unit represented by the chemical formula (1).

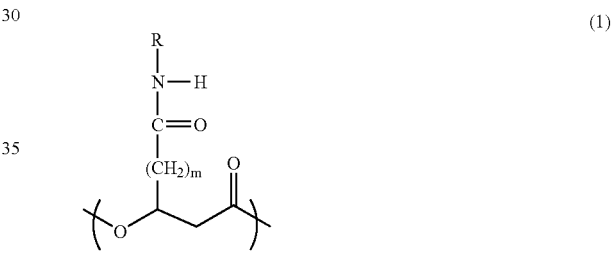

(1)

(R denotes $-A_1(-SO_2R_1)_x$. $R_1$ is selected from OH, a halogen atom, ONa, OK, and $OR_{1a}$. $R_{1a}$ and $A_1$ are selected from a substituted or unsubstituted aliphatic hydrocarbon structure, a substituted or unsubstituted aromatic ring structure, and a substituted or unsubstituted heterocyclic structure. Further, m and x are integers selected from 1 to 8, and when two or more units exist, each of R, $R_1$, $R_{1a}$, $A_1$, m, and x is defined as above independently for each of the units.)

Further, the present invention provides an electrostatic charge image developing toner, characterized by comprising at least a binder resin, a colorant, and the inventive charge control agent.

Further, the present invention provides an image forming method, characterized by including at least: a charging step of externally applying a voltage to a charging member to charge an electrostatic latent image bearing member; a latent image forming step of forming an electrostatic charge image on the charged electrostatic latent image bearing member; a developing step of developing the electrostatic charge image by using an electrostatic charge image developing toner to form a toner image on the electrostatic latent image bearing member, the electrostatic charge image developing toner being the inventive electrostatic charge image developing toner; a transferring step of transferring the toner image on the electrostatic latent image bearing member to a recording material; and a fixing step of heat-fixing the toner image on the recording material.

Further, the present invention provides an image forming apparatus, characterized by including at least: charging means for externally applying a voltage to a charging member to charge an electrostatic latent image bearing member; latent image forming means for forming an electrostatic charge image on the charged electrostatic latent image bearing member; developing means for developing the electrostatic charge image by using an electrostatic charge image developing toner to form a toner image on the electrostatic latent image bearing member, the electrostatic charge image developing toner being the inventive electrostatic charge image developing toner; transferring means for transferring the toner image on the electrostatic latent image bearing member to a recording medium; and fixing means for heat-fixing the toner image on the recording medium.

According to the present invention, a new PHA containing in a molecule, a unit having a sulfonic group, which is a hydrophilic group or a polar group, and a derivative thereof through an amide bond on a side chain and a production method for the new PHA are provided. The new PHA excels in melt-processability and excels in biocompatibility from its hydrophilicity; therefore, its application as a flexible member for a medical application or the like can be expected.

Further, according to the present invention, by adding one or more polyhydroxyalkanoates represented by the chemical formula (1) as a charge control agent to an electrostatic charge image developing toner composition, an electrostatic charge image developing toner that excels in chargeability, improves dispersibility and spent property of the compound in a toner resin, does not form a fog of the image, excels in transferability at the time of output from the image forming apparatus, and is highly adopted to electrophotographic process can be provided. Further, the charge control agent used in the present invention is colorless or weakly tinted, allowing a selection of an arbitrary colorant according to a hue required for a color toner. The charge control agent also has such a feature that it does not interfere with a hue inherent in dyes and pigments. In addition, the electrostatic charge image developing toner of the present invention is highly safe and is biodegradable, thus not requiring combustion for its disposal. The toner of the present invention has a tremendous meritorious effect industrially in terms of environmental conservation such as prevention of air pollution and global warming.

As described above, a polyhydroxyalkanoate of the present invention has a basic skeleton as a biodegradable resin. Therefore, the polyhydroxyalkanoate can be utilized in production of various products by melt-processing or the like in the same manner as in the conventional plastics, but unlike petroleum-derived synthetic polymers, the polyhydroxyalkanoate has peculiar characteristics in that the polyhydroxyalkanoate can be decomposed by organisms and be incorporated in the material cycle in nature. Accordingly, the polyhydroxyalkanoate is also an effective material from the viewpoint of prevention of air pollution and global warming since the polyhydroxyalkanoate requires no incineration treatment, and the polyhydroxyalkanoate can be utilized as plastics enabling environmental protection.

Moreover, the polyhydroxyalkanoate of the present invention exhibits highly excellent characteristics as the charge control agent and high safety to the human body and the environment. Further, a remarkable effect is obtained when an electrostatic charge image developing toner containing the charge control agent is used in an image forming apparatus having a certain developing system.

That is, the present invention provides a charge control agent containing the above polyhydroxyalkanoate and an electrostatic charge image developing toner containing the charge control agent. Further, the present invention provides an image forming method using the electrostatic charge image developing toner including: a charging step and a latent image forming step of externally applying voltage to a charging member, uniformly charging an electrostatic latent image bearing member, and then forming the latent image; a developing step of forming a toner image on the electrostatic latent image bearing member; a transferring step of transferring the toner image on the electrostatic latent image bearing member through or not through an intermediate transfer member to a recording medium; and a heat-fixing step of fixing the toner image on the recording medium by heat. The present invention also provides an image forming apparatus including respective means corresponding to the above respective steps, that is, charging means, latent image forming means, developing means, transferring means, and heat-fixing means.

BEST MODE FOR CARRYING OUT THE INVENTION

Figure 1:
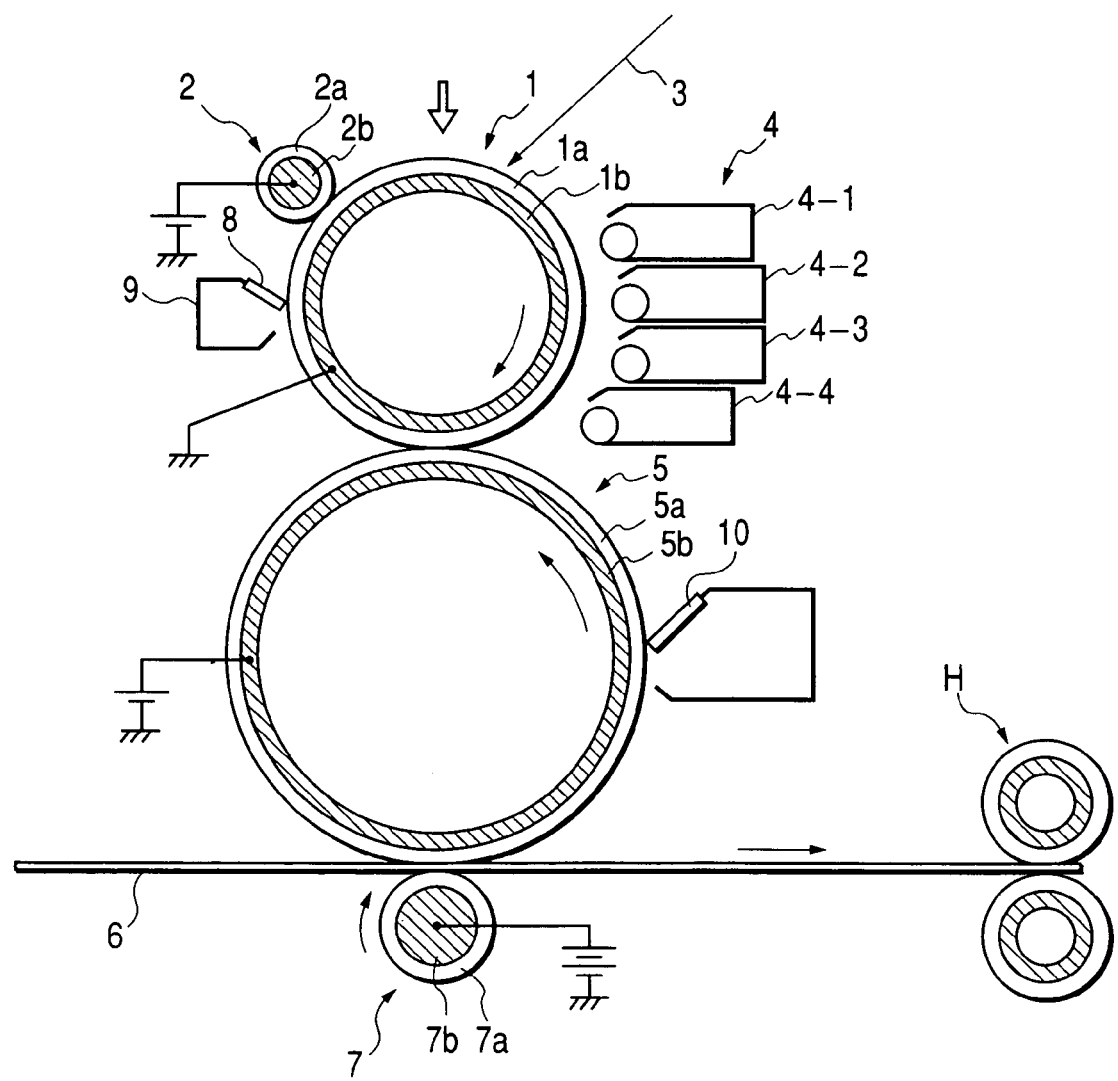
FIG. 1 is a schematic illustration of an image forming apparatus used in Example 25 to Example 30 and Comparative Example 7 to Comparative Example 12.

A target PHA represented by the chemical formula (1) in the present invention is produced through a reaction of a PHA containing a 3-hydroxy-ω-carboxyalkanoate unit represented by the chemical formula (22) with an aminosulfonate compound represented by the chemical formula (23).

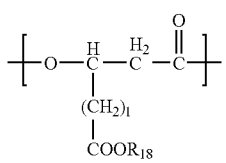

(22)

(l is an integer selected from 1 to 8, $R_{18}$ is an H atom, an Na atom, or a K atom, and when two or more units exist, each of l and $R_{18}$ is defined as above independently for each of the units.)

(23)

($R_{19}$ is selected from OH, a halogen atom, ONa, OK, and $OR_{19a}$. Further, $R_{19a}$ and $A_3$ are selected from a substituted or unsubstituted aliphatic hydrocarbon structure, a substituted or unsubstituted aromatic ring structure, and a substituted or unsubstituted heterocyclic structure. y is an integer selected from 1 to 8. When two or more units exist, each of $R_{19}$, $R_{19a}$, $A_3$, and y is defined as above independently for each of the units.)

(Production Method of PHA Containing a Unit Represented by the Chemical Formula (22))

A PHA represented by the chemical formula (22) is produced through oxidation of a double bond portion of a PHA containing a 3-hydroxy-ω-alkenoate unit represented by the chemical formula (24).

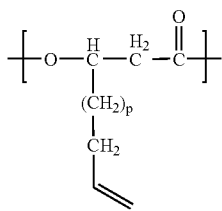

(24)

(p is an integer selected from 0 to 7, and when two or more units exist, p is defined as above independently for each of the units.)

Examples of known methods of obtaining a carboxylic acid from such a carbon-carbon double bond described above by an oxidation cleavage using an oxidant include: a method using a permanganate (J. Chem. Soc., Perkin. Trans. 1, 806 (1973)), a method using a dichromate (Org. Synth., 4, 698 (1963)), a method using a periodate (J. Org. Chem., 46, 19(1981)), a method using nitric-acid (Japanese Patent Application Laid-Open No. S59-190945), and a method using ozone (J. Am. Chem. Soc., 81, 4273(1959)). In addition, as for a PHA, the above Macromolecular chemistry, 4, 289-293 (2001) discloses a method of obtaining a carboxylic acid by conducting a reaction of a carbon-carbon double bond on a side chain terminus of a PHA using potassium permanganate as an oxidant under acidic condition. Similar methods can be used for the present invention as well.

As a permanganate used as an oxidant, potassium permanganate is common. The permanganate is used in an amount of generally 1 molar equivalent or more, preferably 2 to 10 molar equivalents with respect to 1 mole of a unit represented by the chemical formula (24) since the oxidation cleavage reaction is a stoichiometric reaction.

In order to bring a reaction system under acidic condition, various inorganic acids and organic acids such as sulfuric acid, hydrochloric acid, acetic acid, and nitric acid are generally used. However, when using an acid such as sulfuric acid, nitric acid, and hydrochloric acid, an ester bond in a main chain of a PHA is cleaved, thus resulting in a risk of invoking a decrease in molecular weight. Therefore, acetic acid is preferably used. An acid is used in a range of generally 0.2 to 2,000 molar equivalents, preferably 0.4 to 1,000 molar equivalents with respect to 1 mole of a unit represented by the chemical formula (24). If the amount is less than 0.2 molar equivalent, yield becomes low, and if the amount exceeds 2,000 molar equivalents, products decomposed by acid are by-produced. Therefore, both cases are not preferable. Further, crown ethers can be used for a purpose of accelerating a reaction. In this case, the crown ether and the permanganate form a complex, thereby exerting an effect of enhancing activity of the reaction. A generally used crown ether may include dibenzo-18-crown-6-ether, dicyclo-18-crown-6-ether, and 18-crown-6-ether. Crown ether is desirably used in a range of generally 0.005 to 2.0 molar equivalents, preferably 0.01 to 1.5 molar equivalents with respect to 1 mole of a permanganate.

Further, a solvent in an oxidation reaction is not particularly limited as long as it is a solvent inactive in a reaction. Examples of a solvent that can be used may include: water; acetone; ethers such as tetrahydrofuran and dioxane; aromatic hydrocarbons such as benzene; aliphatic hydrocarbons such as hexane and heptane; and halogenated hydrocarbons such as methyl chloride, dichloromethane, and chloroform. Of those solvents, halogenated hydrocarbons such as methyl chloride, dichloromethane, and chloroform and acetone are preferable considering solubility of a PHA therein.

In the above oxidation reaction, a PHA copolymer containing a unit represented by the chemical formula (24), a permanganate, and an acid may be loaded at once with a solvent for a reaction from the start, or each thereof may be added continuously or intermittently in a system for the reaction. Further, a reaction may be conducted by dissolving or suspending a permanganate alone in a solvent in advance, and then continuously or intermittently adding a PHA and an acid in a system or by dissolving or suspending a PHA alone in a solvent in advance, and then continuously or intermittently adding a permanganate and an acid in a system. Further, a reaction may be conducted by loading a PHA and an acid in advance, and then continuously or intermittently adding a permanganate in a system or by loading a permanganate and an acid in advance, and then continuously or intermittently adding a PHA in a system.

A reaction temperature is generally −40 to 40° C. preferably −10 to 30° C. A reaction time depends on a stoichiometric ratio of an ω-alkenoate unit represented by the chemical formula (24) and a permanganate and the reaction temperature, but is generally 2 to 48 hours.

Further, a reaction can be conducted under the same condition in a case of using a PHA containing a 3-hydroxy-substituted alkanoate unit represented by the chemical formula (9) or a 3-hydroxycyclohexyl alkanoate unit represented by the chemical formula (10), in addition to a 3-hydroxy-ω-alkenoate unit represented by the chemical formula (24).

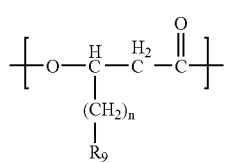

(9)

(n is an integer selected from 1 to 8, $R_9$ denotes a substituent containing a residue having a phenyl structure or a thienyl structure, and when two or more units exist, each of n and $R_9$ is defined as above independently for each of the units.)

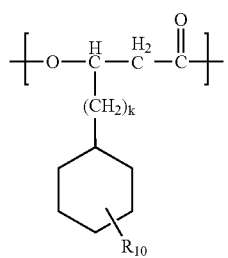

(10)

($R_{10}$ denotes a substituent to a cyclohexyl group and is selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group, and k is an integer selected from 0 to 8. When two or more units exist, $R_{10}$ is defined as above independently for each of the units.)

(Production Method of Polyhydroxyalkanoate Containing a Unit Represented By the Chemical Formula (24))

As described above, a PHA containing a unit represented by the chemical formula (22) is produced from a PHA containing a 3-hydroxy-ω-alkanoate unit, which contains a carbon-carbon double bond on a side chain terminus thereof, represented by the chemical formula (24).

A PHA containing a unit represented by the above chemical formula (24) is not particularly limited, and can be produced by using a production method through a microbial production process, a production method through a system of genetically-engineered plants, a production method of chemically polymerizing, or the like. Here, when such compounds as described above are produced by a method including a step of production by microorganisms, the polyhydroxyalkanoates are isotactic polymers composed only of the R form. However, the compounds are not particularly limited to isotactic polymers, and atactic polymers can also be utilized as far as the objects of the present invention can be accomplished with the compounds in both aspects of physical properties and function. Furthermore, the polyhydroxyalkanoates can be obtained also by a method including a chemical synthesis step utilizing ring-opening polymerization of lactone compounds, etc.

Each of various production methods for a PHA containing a 3-hydroxy-ω-alkenoate unit represented by the chemical formula (24) described above is described.

A PHA containing a unit represented by the chemical formula (24) is produced by culturing the above microorganisms in a culture medium containing ω-alkenoic acid represented by the chemical formula (25).

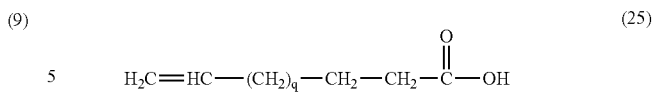

(25)

(wherein q is an integer selected from 1 to 8.)

A microorganism to be used for producing a PHA containing a unit represented by the chemical formula (24) may be any microorganism as long as the microorganism is one having a PHA-producing ability, that is, one capable of producing a PHA-type polyester that contains a 3-hydroxy-ω-alkenoate unit represented by the general formula (24) by being cultured in a medium that contains ω-alkenoic acid represented by the chemical formula (25). A suitable example of the available microorganism having a PHA-producing ability is one belonging to *Pseudomonas*. Of those, a strain, not showing an enzyme reactivity of oxidizing or epoxidizing a vinyl group substituted on a phenyl group, while possessing a PHA-producing ability, is more preferable.

More specifically, desirable are *Pseudomonas cichorii, Pseudomonas putida, Pseudomonas fluorecence, Pseudomonas oleovorans, Pseudomonas aeruginosa, Pseudomonas stutzeri, Pseudomonas jessenii*, and the like. More specific examples of the microorganisms include *Pseudomonas cichorii* strain YN2 (FERM BP-7375), *Pseudomonas cichorii* strain H45 (FERM BP-7374), *Pseudomonas jessenii* strain P161 (FERM BP-7376), and *Pseudomonas putida* strain P91 (FERM BP-7373). Those four microorganisms are deposited on Nov. 20, 2000 at International Patent Organism Depositary (IPOD), National Institute of Advanced Industrial Science and Technology (AIST), Tsukuba Central 6, 1-1, Higashi 1-chome., Tsukuba-shi, Ibaraki-ken 305-8566 Japan, and described in Japanese Patent Application Laid-Open Nos. 2001-288256 and 2002-080571.

It is also possible to use any medium as a medium to be used in the step of culturing a microorganism as far as the medium is a mineral salt medium containing a phosphate and a nitrogen source such as an ammonium salt or a nitrate. In addition, in the step of allowing the microorganism to produce a PHA, the productivity of the PHA may be improved by adjusting the concentration of the nitrogen source in the medium.

Furthermore, a nutrient such as yeast extract, polypeptone, or meat extract may be added in the medium to serve as a substrate for facilitating the proliferation of the microorganism. In other words, peptides may be added as an energy source or a carbon source in the form of a nutrient such as yeast extract, polypeptone, or meat extract.

Alternatively, for the medium, as an energy source or carbon source consumed upon the proliferation of the microorganism, used are the saccharides including: aldoses such as glyceroaldehyde, erythrose, arabinose, xylose, glucose, galactose, mannose, and fructose; alditols such as glycerol, erythritol, and xylitol; aldonic acids such as gluconic acid; uronic acids such as glucuronic acid and galacturonic acid; and disaccharides such as maltose, sucrose, and lactose.

In place of the saccharides, there may be used organic acids or salts thereof, more specifically, organic acids related to the TCA cycle, organic acids induced by a biochemical reaction which has one or two steps less than the TCA cycle, or water-soluble salts of the organic acids. Examples of the organic acids or salts thereof to be used may include: hydroxy carboxylic acids such as pyruvic acid, oxalacetic acid, citric acid, isocitric acid, ketoglutaric acid, succinic acid, fumaric acid, malic acid, and lactic acid; oxocarboxylic acids; and water-soluble salts thereof. Alternatively, amino acids such as aspartic acid and glutamic acid, or salts thereof can be used. At the time of adding the organic acid or the salt thereof, it is more preferable to select one or two or more compounds from the group consisting of: pyruvic acid; oxalacetic acid; citric acid; isocitric acid; ketoglutaric acid; succinic acid; fumaric acid; malic acid; lactic acid; and salts thereof, and then to add the selected compound (compounds) to the medium and dissolve therein. Alternatively, at the time of adding the amino acid or the salt thereof, it is more preferable to select one or more amino acids or salts thereof from the group consisting of aspartic acid, glutamic acid, and salts thereof and then to add the selected amino acid or salt to the medium and dissolve therein. In this case, if needed, all or a part of those compounds can be added in the form of a water-soluble salt and dissolved uniformly in the medium such that the pH of the medium cannot be affected.

The concentration of the cosubstrate to be added as the carbon source for the proliferation of microorganism and the energy supply source for production of a PHA to the medium is generally in the range of 0.1 to 5% (w/v), preferably in the range of 0.2 to 2% (w/v) per medium. That is, one or more of peptides, yeast extract, organic acids or salts thereof, amino acids or salts thereof, and saccharides, each of which can be used as the cosubstrate, can be added. At this time, it is desirable to add those compounds so that the total of their concentrations is within the above range.

A content of a substrate for producing the target PHA, that is, ω-alkenoic acid represented by the general formula (25), is desirably selected in a range of 0.01% to 1% (w/v), more preferably in a range of 0.02% to 0.2% (w/v) per medium.

The culture temperature has only to be a temperature at which the microorganism strain to be utilized can proliferate well. Generally, it is suitable to select the culture temperature within the range of 15 to 37° C. more preferably of 20 to 30° C.

The culture may be performed by any culture method such as a liquid culture or a solid culture as far as the microorganism to be utilized can proliferate therein and produce a PHA. Further, any type of culture may be used, including a batch, fed batch, semi-continuous, or continuous culture. For example, the liquid batch culture may be designed as a method in which oxygen is supplied while the medium is shaken, or an oxygen supply method for agitating aeration type using a jar fermenter.

As the technique of allowing a microorganism to produce and accumulate PHAs, a two-stage culture method with which the culture of a microorganism is performed by dividing the culture into two stages may be adopted in addition to a one-stage culture method of culturing a microorganism in a mineral medium containing a phosphate and a nitrogen source such as an ammonium salt or a nitrate added with a predetermined concentration of a substrate. In this two-stage culture method, as a first culture, the microorganism is allowed to sufficiently proliferate at first in a mineral medium that contains a phosphate and a nitrogen source such as an ammonium salt or a nitrate added with a predetermined concentration of a substrate, and then, as a second culture, bacterial cells obtained in the first culture is transferred to a medium that contains a restricted nitrogen source such as ammonium chloride in the culture added with a predetermined concentration of a substrate and is further cultured in the medium. The second culture allows the microorganism to produce and accumulate PHAs. The adoption of this two-stage culture method may improve the productivity of the target PHA.

In general, PHA type polyester to be produced has, on its side chain, a hydrophobic atomic group such as a vinyl alkyl group derived from a 3-hydroxy-ω-alkenoate unit. Therefore, the PHA type polyester is of poor water solubility and is accumulated in bacterial cells of a microorganism each having a PHA-producing ability. Thus, the microbial cells that produce and accumulate the target PHA type polyester can be easily separated from the medium by proliferating in the culture, and collecting the bacterial cells. The collected cultured bacterial cells are washed and dried, and then the target PHA polyester can be recovered.

Furthermore, PHAs are generally accumulated in bacterial cells of a microorganism having a PHA-producing ability. As a method of recovering the target PHAs from the microbial cells, any method ordinary performed in the art is applicable. For example, extraction with an organic solvent such as chloroform, dichloromethane, acetone, or ethyl acetate is the simplest method. In addition to those solvents, dioxane, tetrahydrofuran, or acetonitrile may also be used. In a work environment where the use of an organic solvent is undesirable, there may be adopted a method of recovering PHAs by removing bacterial cell components, except the target PHAs, after performing one of the following procedures instead of the solvent extraction method. That is, the procedures include: treatment with a surfactant such as SDS; treatment with an enzyme such as lysozyme; treatment with a reagent such as hypochlorite, ammonia, or EDTA; and physical crushing of microbial cells with one of the methods including ultrasonic crushing, homogenization, pressure crushing, bead impact, grinding, mashing, and freeze thawing.

As an example of a mineral medium that can be used in the production method of the present invention, the composition of the mineral medium (M9 medium) as employed in examples described hereinbelow is shown below.

(Composition of M9 Medium)
$Na_2HPO_4$: 6.3
$KH_2PO_4$: 3.0
$NH_4Cl$: 1.0
NaCl: 0.5

(g/L, pH=7.0)

Furthermore, for proliferation of good bacterial cells and improvement of the PHA productivity which is concomitant with the proliferation, it is required to add an appropriate amount of an essential trace element such as an essential trace metal element to a mineral medium such as the M9 medium. The addition of about 0.3% (v/v) of a trace component solution having the following composition to the medium is very effective. The addition of such a trace component solution supplies the trace metal element or the like to be used in the proliferation of a microorganism.

(Composition of Solution of Trace Components)
Nitrilotriacetic acid: 1.5
$MgSO_4$: 3.0
$MnSO_4$: 0.5
NaCl: 1.0
$FeSO_4$: 0.1
$CaCl_2$: 0.1
$CoCl_2$: 0.1
$ZnSO_4$: 0.1
$CuSO_4$: 0.1
$AlK(SO_4)_2$: 0.1
$H_3BO_3$: 0.1
$Na_2MoO_4$: 0.1
$NiCl_2$: 0.1

(g/L)

Also, by coexisting with a substrate for producing the target PHA, i.e., not only ω-alkenoic acid represented by the chemical formula (25), but also a substituted alkanoate compound represented by the chemical formula (26) or a cyclohexylalkanoate compound represented by the chemical formula (27) during culture, it is possible to produce a PHA that contains a 3-hydroxy-ω-alkenoate unit represented by the chemical formula (24) and in addition, a unit represented by the chemical formula (9), or a unit represented by the chemical formula (10). In this case, the content ratios of the ω-alkenoic acid represented by the chemical formula (25), the substituted alkanoate compound represented by the chemical formula (26), and the cyclohexylalkanoate compound represented by the chemical formula (27) are desirably selected to be in the range of 0.01 to 1% (w/v), more preferably of 0.02 to 0.2% (w/v) per medium.

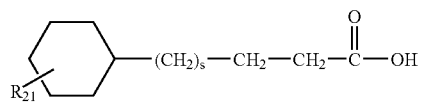
(26)

(r is an integer selected from 1 to 8. $R_{20}$ denotes a substituent containing a residue having a ring structure of a phenyl structure or a thienyl structure, and is one represented by one of the chemical formulae (11), (12), (13), (14), (15), (16), (17), (18), (19), (20), and (21). When two or more units exist, $R_{20}$ is defined as above independently for each of the units.)

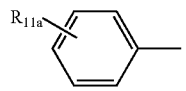
(27)

($R_{21}$ denotes a substituent to a cyclohexyl group and is selected from the group consisting of an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group, and s is an integer selected from 1 to 8.)

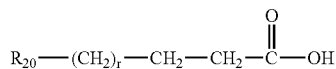
(11)

($R_{11a}$ denotes a substituent to the aromatic ring, and $R_{11a}$ is selected from an H atom, a halogen atom, a CN group, an $NO_2$ group, a $CH_3$ group, a $C_2H_5$ group, a $C_3H_7$ group, a $CH=CH_2$ group, $COOR_{11b}$ ($R_{11b}$ is selected from an H atom, an Na atom, and a K atom), a $CF_3$ group, a $C_2F_5$ group, and a $C_3F_7$ group, and when two or more units exist, $R_{11}$ is defined as above independently for each of the units.)

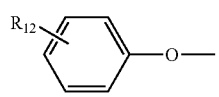
(12)

($R_{12}$ denotes a substituent to the aromatic ring, and $R_{12}$ is selected from an H atom, a halogen atom, a CN group, an $NO_2$ group, a $CH_3$ group, a $C_2H_5$ group, a $C_3H_7$ group, an $SCH_3$ group, a $CF_3$ group, a $C_2F_5$ group, and a $C_3F_7$ group, and when two or more units exist, $R_{12}$ is defined as above independently for each of the units.)

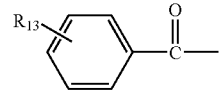
(13)

($R_{13}$ denotes a substituent to the aromatic ring, and $R_{13}$ is selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group, and when two or more units exist, $R_{13}$ is defined as above independently for each of the units.)

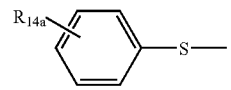
(14)

($R_{14a}$ denotes a substituent to the aromatic ring, and $R_{14a}$ is selected from an H atom, a halogen atom, a CN group, an $NO_2$ group, $COOR_{14b}$, $SO_2R_{14c}$ ($R_{14b}$ is selected from H, Na, K, $CH_3$, and $C_2H_5$, and $R_{14c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and $(CH_3)_3$—C group, and when two or more units exist, each of $R_{14a}$, $R_{14b}$, and $R_{14c}$ is defined as above independently for each of the units.)

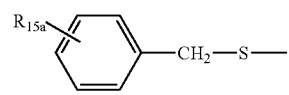
(15)

($R_{15a}$ denotes a substituent to the aromatic ring, and $R_{15a}$ is selected from an H atom, a halogen atom, a CN group, an $NO_2$ group, $COOR_{15b}$, $SO_2R_{15c}$ ($R_{15b}$ is selected from H, Na, K, $CH_3$, and $C_2H_5$, and $R_{15c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and $(CH_3)_3$—C group, and when two or more units exist, each of $R_{15a}$, $R_{15b}$, and $R_{15c}$ is defined as above independently for each of the units.)

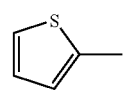
(16)

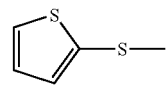
(17)

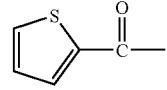
(18)

-continued

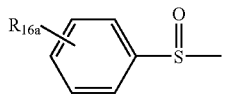
(19)

($R_{16a}$ denotes a substituent to the aromatic ring, and $R_{16a}$ is selected from an H group, a halogen atom, a CN group, an $NO_2$ group, $COOR_{16b}$, $SO_2R_{16c}$ ($R_{16b}$ is selected from H, Na, K, $CH_3$, and $C_2H_5$, and $R_{16c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and $(CH_3)_3$—C group, and when two or more units exist, each of $R_{16a}$, $R_{16b}$, and $R_{16c}$ is defined as above independently for each of the units.)

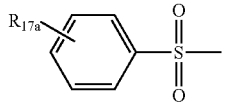
(20)

($R_{17a}$ denotes a substituent to the aromatic ring, and $R_{17a}$ is selected from an H atom, a halogen atom, a CN group, an $NO_2$ group, $COOR_{17b}$, $SO_2R_{17c}$ ($R_{17b}$ is selected from H, Na, K, $CH_3$, and $C_2H_5$, and $R_{17}C$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and $(CH_3)_3$—C group, and when two or more units exist, each of $R_{17a}$, $R_{17b}$, and $R_{17c}$ is defined as above independently for each of the units.)

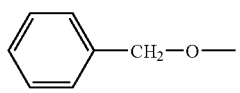
(21)

Further, a PHA containing in a molecule at least one unit of a 3-hydroxy-ω-carboxyalkanoate unit represented by the chemical formula (22) may be produced by a method of hydrolysis in the presence of an acid or an alkaline or a method of hydrogenolysis including a catalytic reduction using, as a raw material, a PHA copolymer containing at least one unit of a 3-hydroxy-ω-alkoxycarbonylalkanoate unit represented by the chemical formula (28).

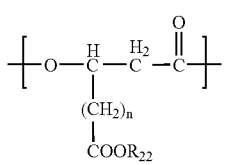
(28)

(wherein, n is an integer selected from 1 to 8, $R_{22}$ is one of the residues represented by the following formula,

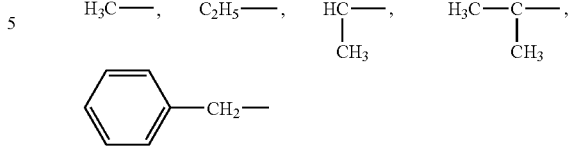

and when two or more units exist, each of n and $R_{22}$ is defined as above independently for each of the units.)

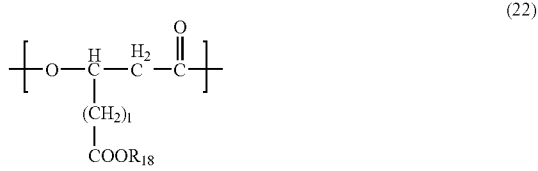
(22)

(wherein, l is an integer selected from 1 to 8, $R_{18}$ is selected from an H atom, an Na atom, and a K atom, and when two or more units exist, each of l and $R_{18}$ is defined as above independently for each of the units.)

Also, by coexisting with a substrate for producing the target PHA, i.e., not only ω-alkenoic acid represented by the chemical formula (25), but also a substituted alkanoate compound represented by the chemical formula (26) or a cyclohexylalkanoate compound represented by the chemical formula (27) during culture, it is possible to produce a copolymer with a PHA that contains a 3-hydroxy-ω-alkenoate unit represented by the chemical formula (24) and in addition, the unit represented by the chemical formula (9) or the unit represented by the chemical formula (10).

As described above, when such compounds are produced by a method including a step of production utilizing microorganisms, the PHAs are polymers that only have the R form and are isotactic. However, the compounds are not particularly limited to isotactic polymers, and atactic polymers can also be utilized as far as the objects of the present invention can be accomplished therewith in both aspects of physical properties and function. Furthermore, the PHAs can be obtained also by a method including a step for a chemical synthesis method utilizing ring-opening polymerization of lactone compounds, etc.

(Example of an Aminosulfonate Compound Represented By the Chemical Formula (23))

A compound may be represented by the chemical formula (23).

$$H_2N\text{-}A_3(\text{—}SO_2R_{19})_y \qquad (23)$$

($R_{19}$ is selected from OH, a halogen atom, ONa, OK, and $OR_{19a}$. Further, $R_{19a}$ and $A_3$ are selected from a substituted or unsubstituted aliphatic hydrocarbon structure, a substituted or unsubstituted aromatic ring structure, and a substituted or unsubstituted heterocyclic structure, y is an integer selected from 1 to 8, and when two or more units exist, each of $R_{19}$, $R_{19a}$, $A_3$, and y is defined as above independently for each of the units.)

$R_{19a}$ is preferably selected from a straight-chain or branched alkyl group having 1 to 8 carbon atoms and a substituted or unsubstituted phenyl group. $A_3$ represents a straight-chain or branched substituted or unsubstituted $C_1$ to $C_8$ alkylene group, a substituted or unsubstituted phenylene group, a substituted or unsubstituted naphthalene group, and a substituted or unsubstituted heterocyclic structure containing at least one selected from N, S, and O. If $A_3$ has a ring structure, an unsubstituted ring may be further condensed. Further, when two or more units exist, each of $R_{19}$, $R_{19a}$, and $A_3$ is defined as above independently for each of the units.

If $A_3$ is a straight-chain substituted or unsubstituted alkylene group, a compound represented by the following chemical formula (29) may be given as an example.

$$H_2N\text{-}A_4(\text{---}SO_2R_{20})_z \tag{29}$$

($R_{20}$ is selected from the group consisting of OH, a halogen atom, ONa, OK, and $OR_{20a}$. Further, $R_{20a}$ is selected from a straight-chain or branched alkyl group having 1 to 8 carbon atoms and a substituted or unsubstituted phenyl group. $A_4$ is a straight-chain or branched, substituted or unsubstituted $C_1$ to $C_8$ alkylene group, and an alkyl group, an alkoxy group, or the like having 1 to 20 carbon atoms may be substituted thereto. Z is an integer selected from 1 to 8, and when two or more units exist, each of $R_{20}$, $R_{20a}$, $A_4$ and Z is defined as above independently for each of the units.)

Examples of a compound represented by the chemical formula (29) may include 2-aminoethanesulfonic acid (taurine), 3-aminopropanesulfonic acid, 4-aminobutanesulfonic acid, 2-amino-2-methylpropanesulfonic acid, alkali metal salts thereof, and esters thereof.

If $A_3$ is a substituted or unsubstituted phenylene group, a compound represented by the following chemical formula (30) may be given as an example.

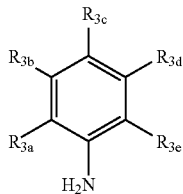

(30)

(At least one of $R_{3a}$, $R_{3b}$, $R_{3c}$, $R_{3d}$, and $R_{3e}$ is selected from $SO_2R_{3f}$ ($R_{3f}$ is selected from OH, a halogen atom, ONa, OK, and $OR_{3f1}$. $R_{3f1}$ is selected from a straight-chain or branched alkyl group having 1 to 8 carbon atoms and a substituted or unsubstituted phenyl group). In addition, $R_{3a}$, $R_{3b}$, $R_{3c}$, $R_{3d}$, and $R_{3e}$ are selected from a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ denotes one of an H atom, an Na atom, and a K atom), an acetamide group, an OPh group, an NHPh group, a $CF_3$ group, a $C_2F_5$ group, and a $C_3H_7$ group. When two or more units exist, each of $R_{3a}$, $R_{3b}$, $R_{3c}$, $R_{3d}$, $R_{3e}$, $R_{3f}$, $R_{3f1}$, and $R_{3g}$ is defined as above independently for each of the units.)

Examples of a compound represented by the chemical formula (30) may include: various aminobenzenesulfonic acid derivatives and salts such as p-aminobenzenesulfonic acid (sulfanilic acid), m-aminobenzenesulfonic acid, o-aminobenzenesulfonic acid, m-toluidine-4-sulfonic acid, sodium o-toluidine-4-sulfonate, p-toluidine-2-sulfonic acid, 4-methoxyaniline-2-sulfonic acid, o-anisidine-5-sulfonic acid, p-anisidine-3-sulfonic acid, p-anisidine-2-sulfonic acid, 3-nitroaniline-4-sulfonic acid, sodium 2-nitroaniline-4-sulfonate, sodium 4-nitroaniline-2-sulfonate, 1,5-dinitroaniline-4-sulfonic acid, 2-aminophenol-4-hydroxy-5-nitrobenzenesulfonic acid, sodium 2,4-dimethylaniline-5-sulfonate, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid, and aniline-2,4-disulfonic acid; and esters such as methyl esters and phenyl esters of various aminobenzenesulfonic acid derivatives and salts such as 2-aminobenzenesulfonic acid methyl ester, 4-aminobenzenesulfonic acid methyl ester, 2-aminobenzenesulfonic acid phenyl ester, 4-aminobenzenesulfonic acid phenyl ester, and alkali metal salts or the like thereof.

If $A_3$ is a substituted or unsubstituted naphthalene group, a compound represented by the following chemical formula (31A) or chemical formula (31B) may be given as an example.

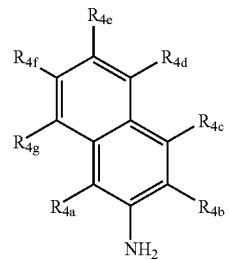

(31A)

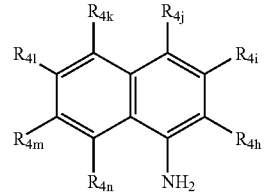

(31B)

(At least one of $R_{4a}$, $R_{4b}$, $R_{4c}$, $R_{4d}$, $R_{4e}$, $R_{4f}$, and $R_{4g}$ in the formula (31A), or at least one of $R_{4h}$, $R_{4i}$, $R_{4j}$, $R_{4k}$, $R_{4l}$, $R_{4m}$, and $R_{4n}$, in the formula (31B) is selected from $SO_2R_{4o}$. ($R_{4o}$ is selected from OH, a halogen atom, ONa, OK, and $OR_{4o1}$. $R_{4o1}$ is selected from a straight-chain or branched alkyl group having 1 to 8 carbon atoms and a substituted or unsubstituted phenyl group). In addition, $R_{4a}$, $R_{4b}$, $R_{4c}$, $R_{4d}$, $R_{4e}$, $R_{4f}$, $R_{4g}$, $R_{4h}$, $R_{4i}$, $R_{4j}$, $R_{4k}$, $R_{4l}$, $R_{4m}$, and $R_{4n}$ are selected from a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ denotes one of an H atom, an Na atom, and a K atom), an acetamide group, an OPh group, an NHPh group, a $CF_3$ group, a $C_2F_5$ group, and a $C_3H_7$ group. When two or more units exist, each of $R_{4a}$, $R_{4b}$, $R_{4c}$, $R_{4d}$, $R_{4e}$, $R_{4f}$, $R_{4g}$, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, and m is defined as above independently for each of the units.)

Examples of a compound represented by the chemical formula (31A) or (31B) may include: various naphthylamine sulfonic acid derivatives and salts such as 1-naphthylamine-5-sulfonic acid, 1-naphthylamine-4-sulfonic acid, 1-naphthylamine-8-sulfonic acid, 2-naphthylamine-1-sulfonic acid, 2-naphthylamine-5-sulfonic acid, 1-naphthylamine-6-sulfonic acid, 1-naphthylamine-7-sulfonic acid, 1-naphthylamine-2-ethoxy-6-sulfonic acid, 1-amino-2-naphthol-4-sulfonic acid, 6-amino-1-naphthol-3-sulfonic acid, sodium 1-amino-8-naphthol-2,4-sulfonate, and sodium 1-amino-8-naphthol-3,6-sulfonate; and in addition, esters such as methyl esters and phenyl esters of various naphthylamine sulfonic acid derivatives and salts such as 1-naphthylamine-8-sulfonic acid methyl ester, 2-naphthylamine-1-sulfonic acid methyl ester, 1-naphthylamine-8-sulfonic acid phenyl ester, and 2-naphthylamine-1-sulfonic acid phenyl ester, and alkali metal salts or the like thereof.

If $A_3$ is a substituted or unsubstituted heterocyclic structure containing at least one of N, S, and O, the heterocyclic structure may be any of a pyridine ring, a piperazine ring, a furan ring, a thiol ring, or the like. Examples of compounds may include: a sulfonic acid such as 2-aminopyridine-6-sulfonic acid, or 2-aminopiperazine-6-sulfonic acid; alkali metal salts thereof; and esters thereof.

Examples of a sulfonic acid ester may include a substituted or unsubstituted aliphatic hydrocarbon structure, a substituted or unsubstituted aromatic ring structure, and a substituted or unsubstituted heterocyclic structure. In particular, a straight-chain or branched alkyl group having 1 to 8 carbon atoms and a substituted or unsubstituted phenyl group are preferable. In terms of easiness of esterification or the like, $OCH_3$, $OC_2H_5$, $OC_6H_5$, $OC_3H_7$, $OC_4H_9$, $OCH(CH_3)_2$, $OCH_2(CH_3)_3$, $OC(CH_3)_3$, or the like are more preferable.

(Production Method of PHA Represented By the Chemical Formula (1))

A reaction of a PHA containing a unit represented by the chemical formula (22) with an aminosulfonate compound represented by the chemical formula (23) is described in detail.

A compound represented by the chemical formula (23) is used in a range of 0.1 to 50.0-fold moles, preferably 1.0 to 20.0-fold moles with respect to an amount of the unit represented by the chemical formula (22), used as a starting material.

A method of the present invention to form an amide bond from a carboxylic acid and an amine includes a condensation reaction through thermal dehydration. In particular, from a view of a mild reaction condition such that an ester bond of a polymer main chain is not cleaved, a method of activating a carboxylic acid portion with an activator to form an active acyl intermediate, and then reacting with an amine is effective. Examples of an active acyl intermediate include an acid halide, an acid anhydride, and an active ester. In particular, a method of using a condensation agent to form an amide bond within the same reaction field is preferable in terms of simplifying a productive process.

If required, a condensation reaction with an amine can be conducted once after isolating as an acid halide.

A condensation agent used can be suitably selected from a phosphate condensation agent used in condensation polymerization of an aromatic polyamide, a carbodiimide condensation agent used for peptide synthesis, an acid chloride condensation agent, and the like, according to a combination of the compounds of the chemical formulae (23) and (22).

Examples of the phosphate condensation agent may include a phosphite condensation agent, a phosphoric chloride condensation agent, a phosphoric anhydride condensation agent, a phosphate condensation agent, and a phosphoric amide condensation agent. In the reaction of the present invention, the phosphite condensation agent can be used. Examples of the phosphite used may include triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, trimethyl phosphite, and triethyl phosphite. Of those, triphenyl phosphite is preferably used. Further, a metal salt such as lithium chloride and calcium chloride may be added for an enhancement of solubility and reactivity of the polymer.

Examples of the carbodiimide condensation agent may include dicyclohexylcarbodiimide (DCC), diisopropylcarbodiimide (DIPC), and N-ethyl-N'-3-dimethylaminopropylcarbodiimide (EDC=WSCI), and a hydrochloride thereof (WSCI.HCl). DCC or WSCI may be used in combination with N-hydroxysuccinimide (HONSu), 1-hydroxybenzotriazole (HOBt), 3-hydroxy-4-oxo-3,4-dihydro-1,2,3-benzotriazine (HOObt), or the like. The condensation agent is used in a range of 0.1 to 50-fold moles, preferably 1 to 30-fold moles with respect to an amount of the compound represented by the chemical formula (22). Further, the condensation agent itself can be used as a reaction solvent.

A solvent can be used for the reaction of the present invention as required. Examples of a solvent used may include: hydrocarbons such as hexane, cyclohexane, and heptane; ketones such as acetone and methyl ethyl ketone; ethers such as dimethyl ether, diethyl ether, and tetrahydrofuran; halogenated hydrocarbons such as dichloromethane, chloroform, carbon tetrachloride, dichloroethane, and trichloroethane; aromatic hydrocarbons such as benzene and toluene; aprotic polar solvents such as N,N-dimethylformamide, dimethylsulfoxide, dimethylacetamide, and hexamethylphosphoramide; pyridine derivatives such as pyridine and picoline; and N-methylpyrrolidone. Pyridine, N-methylpyrrolidone, and the like are particularly preferably used. An amount of the solvent to use can be determined accordingly depending on a starting material, kind of a base, reaction conditions, or the like. According to the method of the present invention, a reaction temperature is not particularly limited, but the temperature is generally in a range of from $-20°$ C. to a melting point of the solvent. However, it is desirable to conduct a reaction at an optimum temperature according to the condensation agent used.

According to the method of the present invention, a reaction time is generally in a range of 1 to 48 hours. According to the present invention, a reaction liquid containing a PHA represented by the chemical formula (1), which was formed as described, can be purified by a conventional method such as distillation. Alternatively, the target PHA represented by the chemical formula (1) can be recovered by: uniformly mixing the reaction liquid containing a PHA with a solvent such as water, alcohols (methanol, ethanol, or the like) and ethers (dimethyl ether, diethyl ether, tetrahydrofuran, or the like), in which the PHA represented by the chemical formula (1) is insoluble; and reprecipitating the target PHA represented by the chemical formula (1). The obtained PHA represented by the chemical formula (1) can be isolated and purified as required. An isolating and purifying method is not particularly limited, and examples of the method thereof may include a method of reprecipitation using a solvent which does not dissolve a PHA represented by the chemical formula (1), a method by chromatography, and dialysis.

As another production method of the present invention, in a case where an R portion in the chemical formula (1) is $-A_1-SO_3H$, methyl-esterification can be conducted for the R portion of the chemical formula (1) to form $-A_1-SO_3CH_3$ using a methyl-esterification agent after the condensation reaction with an amine. As for the methyl-esterification agent, a method of methyl-esterification of an aliphatic acid in gas chromatographic analysis can be used.

Examples of acid catalysis include methods using hydrochloric acid-methanol, boron trifluoride-methanol, and sulfuric acid-methanol, and examples of basic catalysis include methods using sodium methoxide, tetramethylguanidine, and trimethylsilyldiazomethane. Of those, the method using trimethylsilyldiazomethane is preferable because methylation can be carried out under mild conditions.

The trimethylsilyldiazomethane is used in a range of 0.1 to 50-fold moles, preferably 1 to 20-fold moles with respect to an amount of -$A_1$—$SO_3H$ which is the group denoted by R in the chemical formula (1). A reaction temperature is not particularly limited, but is generally in a range of −20° C. to 30° C. According to the present invention, the reaction time, although not determined uniquely, is generally in a range of 1 to 48 hours.

Examples of the solvent used in the reaction of the present invention may include: hydrocarbons such as hexane, cyclohexane, and heptane; alcohols such as methanol and ethanol; halogenated hydrocarbons such as dichloromethane, chloroform, carbon tetrachloride, dichloroethane, and trichloroethane; aromatic hydrocarbons such as benzene and toluene; aprotic polar solvents such as N,N-dimethylformamide and dimethylsulfoxide; and pyridine derivatives. Halogenated hydrocarbons and alcohols are particularly preferably used. An amount of the solvent to use can be suitably determined accordingly depending on a starting material, reaction conditions, or the like.

According to the method of the present invention, a reaction temperature is not particularly limited, but the temperature is generally in a range of −20° C. to 30° C. However, it is desirable to carry out a reaction at an optimum temperature according to the condensation agent and reagents used.

According to the reaction of the present invention, a reaction solvent, a reaction temperature, a reaction time, and a purification method are not limited to the methods described above.

A molecular weight of the PHA of the present invention can be measured as a relative molecular weight and an absolute molecular weight. For example, the molecular weight can be simply measured using gel permeation chromatography (GPC) or the like. A specific method of measuring with GPC includes dissolving the above PHA in a solvent which can easily dissolve a PHA in advance, and measuring using a similar moving phase. A differential refractometer (RI) or an ultraviolet detector (UV) can be used as a detector according to the PHA to measure. The molecular weight is obtained through a relative comparison with a standard (polystyrene, polymethyl methacrylate, or the like). A solvent in which the polymer dissolves may be selected from the group consisting of dimethylformamide (DMF), dimethylsulfoxide (DMSO), chloroform, tetrahydrofuran (THF), toluene, and hexafluoroisopropanol (HFIP). For a polar solvent, a salt may be added for measurement.

Further, according to the present invention, the above PHA having a ratio (Mw/Mn) of a weight average molecular weight (Mw) to a number average molecular weight (Mn), which are measured as mentioned above, within a range of 1 to 10 is preferably used. The PHA of the present invention desirably has a number average molecular weight (Mn) of 1,000 to 1,000,000, preferably 1,000 to 500,000.

[Application to Toner]

Applications of the polyhydroxyalkanoate according to the present invention include an electrostatic charge image developing toner and an image forming process using such a toner. Specifically, the polyhydroxyalkanoate can be used as a charge control agent to be internally or externally added to the toner.

That is, the present invention provides a charge control agent containing the polyhydroxyalkanoate and further an electrostatic charge image developing toner containing the charge control agent. Furthermore, the present invention provides an image forming method including: a charging/latent image forming step of applying a voltage to a charging member from the outside to uniformly charge an electrostatic latent image bearing member and successively form an electrostatic latent image; a developing step of forming a toner image on the electrostatic latent image bearing member; a transferring step of transferring the toner image on the electrostatic latent image bearing member to a recording medium via or not via an intermediate transfer member; and a heat-fixing step of heat-fixing the toner image on the transferring material. The present invention also provides an image forming apparatus including the respective means corresponding to the respective steps of the above-mentioned method, that is, the charging means, the latent image forming means, the developing means, the transferring means, and the heat-fixing means.

<Use as Charge Control Agent>

It is important for a structure of the polyhydroxyalkanoate used in the present invention that the polyhydroxyalkanoate has a structure substituted with a sulfonic acid or the derivative thereof on a side chain as the monomer unit represented by the chemical formula (1). Those units having an anionic or electron attractive functional group are preferable for enhancing negative chargeability, and in fact, the charge control agent of the present invention has an excellent negative chargeability.

The polyhydroxyalkanoate used in the present invention has good compatibility with binder resins, in particular, very good compatibility with polyester binder resins. The toners containing the polyhydroxyalkanoate of the present invention have a high specific charge amount and good stability over time, so that the toners can constantly provide sharp images upon image forming in electrostatic recording even after storage for a long time. In addition, since the toners are colorless or weakly tinted and have negatively charging performance, the toners can be produced as both negatively chargeable black toners and color toners.

Further, by appropriately selecting kinds and ratios of monomer units constituting the polyhydroxyalkanoate of the present invention, the compatibility can be regulated in a wide range.

If the resin composition is selected such that the charge control agent can take a micro-phase separated structure in the toner binder, no electric continuity occurs in the toner and thus the toner can stably retain charges. Since the polyhydroxyalkanoate of the present invention contains no heavy metal, there is no polymerization inhibiting action by the heavy metal as observed in the case of metal-containing charge control agents when toners are produced by a suspension polymerization method or an emulsion polymerization method, with the result that toners can be produced stably.

<Addition of PHA to Toners>

The methods of incorporating the above-mentioned compounds into toners include an internally adding method and an externally adding method. When the compounds are internally added, the compounds are used generally in an amount ranging from 0.1 to 50% by mass, preferably from 0.2 to 20% by mass in terms of mass ratio of the charge control agent to the toner binder. If the amount is less than 0.1% by mass, unpreferably the degree of improvement in the chargeability of a toner is not significant. On the other hand, the amount exceeding 50% by mass is not preferable from the economical standpoint. When the compounds of the present invention are externally added, it is preferred that the mass ratio of the charge control agent to the toner binder is 0.01 to 5% by mass. In particular, it is preferred that they are fixed to the surface of the toner mechanochemically. Further, the polyhydroxyalkanoate of the present invention may be used in combination with known charge control agents.

The polyhydroxyalkanoate of the present invention generally has a number average molecular weight of 1,000 to 1,000,000, preferably 1,000 to 300,000. If less than 1,000, the polyhydroxyalkanoate is completely compatible with the toner binder so that it is difficult to form discontinuous domains, causing an insufficient charge amount and adverse influences on the flowability of the toner. If exceeding 500,000, it is difficult to disperse the polyhydroxyalkanoate in the toner.

A molecular weight of the polyhydroxyalkanoate of the present invention was measured using gel permeation chromatography (GPC) A specific method of measuring with GPC includes dissolving the above polyhydroxyalkanoate in a solvent which can easily dissolve the polyhydroxyalkanoate in advance, and measuring using a similar moving phase. Using a detector such as a differential refractometer (RI) and an ultraviolet detector (UV), a molecular weight distribution is obtained from a calibration curve of a standard polystyrene resin. A solvent in which the polymer dissolves may be selected from the group consisting of dimethylformamide (DMF) containing 0.1% by mass of LiBr, dimethylsulfoxide (DMSO), chloroform, tetrahydrofuran (THF), toluene, and hexafluoroisopropanol (HFIP).

Furthermore, in the present invention, it is preferred to use the polyhydroxyalkanoate that has a ratio (Mw/Mn) of a weight average molecular weight (Mw) to a number average molecular weight (Mn) in the range of 1 to 10.

In the present invention, it is preferred that the polyhydroxyalkanoate used has a melting point of 20 to 150° C. in particular, of 40 to 150° C. or does not have a melting point but has a glass transition point of 10 to 150° C., more preferably, 20 to 150° C. When the polyhydroxyalkanoate has a melting point of less than 20° C. or does not have a melting point but has a glass transition point of less than 20° C., the flowability of a toner or shelf stability tends to be adversely affected. If the polyhydroxyalkanoate has a melting point exceeding 150° C. or does not have a melting point but has a glass transition point exceeding 150° C. the charge control agent is difficult to knead in the toner so that the charge distribution tends to be broad.

In this case, the measurement of a melting point Tm and a glass transition point Tg may be performed by using a high-precision differential scanning calorimeter of inner-heat, input compensation type, for example, DSC-7 produced by PerkinElmer Inc.

In the toner binder and electrostatic charge image developing toner according to the present invention, the mass ratio of the charge control agent to the toner binder is usually 0.1 to 50% by mass, preferably 0.2 to 20% by mass. As for the composition ratio, the electrostatic charge image developing toner of the present invention contains usually 0.1 to 50% by mass of the charge control agent, 20 to 95% by mass of the toner binder, and 0 to 15% by mass of the coloring material. The toner may contain 60% by mass or less of magnetic powder (powder of ferromagnetic metals such as iron, cobalt, and nickel or compounds such as magnetite, hematite, and ferrite) when it is intended to exhibit a function combined with a function of a coloring material if necessary. Further, the electrostatic charge image developing toner of the present invention may contain various additives (lubricants (polytetrafluoroethylene, low molecular weight polyolefins, fatty acids, metal salts or amides thereof, and so forth), other charge control agents (metal-containing azo dyes, metal salt of salicylic acid and so forth), etc.). Further, hydrophobic colloidal silica fine particles and the like may be used in order to improve the flowability of the toner. The amount of the additives is usually 10% by mass or less based on the mass of the toner.

In the toners of the present invention, it is preferred that at least a portion of the toner binder forms a continuous phase and at least a portion of the charge control agent forms a discontinuous domain. As compared with the toner in which the charge control agent is completely compatible with the toner binder, forming no discontinuous domain therein, the added charge control agent tends to be exposed on the surface of the toner, so that addition of a small amount of the charge control agent exhibits a sufficient effect. The dispersion particle size of the domain is preferably 0.01 to 4 µm, more preferably 0.05 to 2 µm. If exceeding 4 µm, the dispersibility is insufficient so that the charge distribution is widened and a problem of degraded transparency of the toner arises. If the dispersion particle size is less than 0.01 µm, the situation is substantially the same as the case where the charge control agent is completely compatible with the toner binder, forming no discontinuous domain therein and in this case, and a large amount of charge control agent is required to be added. The fact that at least a portion of the charge control agent forms discontinuous domains and the dispersion particle size can be confirmed by observing a section of the toner with a transmission electron microscope. To clearly observe the interface, it is also effective to make an electron microscopic observation after staining the toner section with ruthenium tetroxide, osmium tetroxide, or the like.

In order to reduce the particle size of the discontinuous domains formed by the polyhydroxyalkanoate of the present invention, polymers compatible with the toner binder as well as with the polyhydroxyalkanoate of the present invention can be added as a compatibilizing agent. The compatibilizing agent includes polymers that include a polymer chain containing 50 mol % or more of a monomer having substantially the same structure as the monomer unit in the polyhydroxyalkanoate of the present invention and a polymer chain containing 50 mol % or more of a monomer having substantially the same structure as the monomer in the toner binder, with the polymer chains being connected in a graft- or block-form. The use amount of the compatibilizing agent is usually 30% by mass or less, preferably 1 to 10% by mass with respect to the mass of the polyhydroxyalkanoate of the present invention.

<Other Constituent Materials>

Hereinafter, other constituent materials contained in the electrostatic charge image developing toner of the present invention will be described.

(Binder Resin)

First, the binder resin is not particularly limited, and any binder resin that is usually used in producing toners may be employed. The charge control agent of the present invention can be mixed with a binder resin in advance before preparing a toner, and the mixture can be used as a toner binder composition having a charge control capacity according to the present invention. Examples of the binder resin include styrene polymers, polyester polymers, epoxy polymers, polyolefin polymers, and polyurethane polymers. These may be used singly or as mixtures.

Examples of the styrene polymer include copolymers of styrene and (meth)acrylate, copolymers of these monomers and other monomers copolymerizable therewith, and copolymers of styrene and a diene monomer (butadiene, isoprene, or the like) and copolymers of these monomers and other monomers copolymerizable therewith, and the like. Examples of the polyester polymer include polycondensation products from an aromatic dicarboxylic acid and an alkylene oxide adduct of an aromatic diol. Examples of the epoxy polymer include reaction products of an aromatic diol and epichlorohydrin and modified products thereof. Examples of the polyolefin polymer include polyethylene, polypropylene, and copolymer chains of these and other monomers copolymerizable therewith. Examples of the polyurethane polymer include polyaddition products of an aromatic diisocyanate and an alkylene oxide adduct of an aromatic diol.

Specific examples of the binder resin used in the present invention include polymers of polymerizable monomers described below, mixtures of these, or copolymerization products obtained by using two or more polymerizable monomers described below. Specifically, such polymers include, for example, styrene polymers such as styrene/acrylic acid copolymers or styrene/methacrylic acid copolymers, polyester polymers, epoxy polymers, polyolefin polymers, and polyurethane polymers, which can be preferably used.

Specific examples of the polymerizable monomer include: styrene and derivatives thereof such as o-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; ethylenically unsaturated monoolefins such as ethylene, propylene, butylene, and isobutylene; unsaturated polyenes, such as butadiene; vinyl halides such as vinyl chloride, vinylidene chloride, vinyl bromide, and vinyl fluoride; vinyl esters such as vinyl acetate, vinyl propionate, and vinyl benzoate; α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylates such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinylpyrrole, N-vinylcarbazole, N-vinylindole, and N-vinylpyrrolidone; vinylnaphthalenes; acrylic acid or methacrylic acid derivatives such as acrylonitrile, methacrylonitrile, and acrylamide; esters of the above-mentioned α,β-unsaturated acids and diesters of dibasic acids; dicarboxylic acids such as maleic acid, methyl maleate, butyl maleate, dimethyl maleate, phthalic acid, succinic acid, and terephthalic acid; polyol compounds such as ethylene glycol, diethylene glycol, triethylene glycol, 1,2-propylene glycol, 1,3-propylene glycol, 1,4-butanediol, 1,6-hexanediol, bisphenol A, hydrogenated bisphenol A, and polyoxyethylenated bisphenol A; isocyanates such as p-phenylene diisocyanate, p-xylylene diisocyanate, and 1,4-tetramethylene diisocyanate; amines such as ethylamine, butylamine, ethylenediamine, 1,4-diaminobenzene, 1,4-diaminobutane, and monoethanolamine; and epoxy compounds such as diglycidyl ether, ethylene glycol diglycidyl ether, bisphenol A glycidyl ether, and hydroquinone diglycidyl ether.

(Crosslinking Agent)

In preparing a binder resin in the present invention, crosslinking agents described below can also be used as necessary. Examples of a bifunctional crosslinking agent may include divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol #200 diacrylate, polyethylene glycol #400 diacrylate, polyethylene glycol #600 diacrylate, dipropylene glycol diacrylate, polypropylene glycol diacrylate, polyester type diacrylates (MANDA of Nippon Kayaku Co., Ltd.), and the above diacrylates whose acrylate moiety has been replaced with methacrylate.

More than bifunctional, that is, polyfunctional crosslinking agents may include pentaerythritol triacrylate, trimethylolethane triacrylate, trimethylolpropane triacrylate, tetrammethylolmethane tetraacrylate, oligoester acrylate and methacrylate thereof, and also 2,2-bis(4-methacryloxypolyethoxyphenyl)propane, diallyl phthalate, triallyl cyanurate, triallyl isocyanurate, triallyl trimellitate, and diallyl chlorendate.

(Polymerization Initiator)

In preparing a binder resin used in the present invention, polymerization initiators described below can be used as necessary. The polymerization initiator may include, for example, t-butyl peroxy-2-ethylhexanoate, cumyl perpivalate, t-butyl peroxylaurate, benzoyl peroxide, lauroyl peroxide, octanoyl peroxide, di-t-butyl peroxide, t-butylcumyl peroxide, dicumyl peroxide., 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1-bis(t-butylperoxy)-3,3,5-trimethylcyclohexane, 1,1-bis(t-butylperoxy)cyclohexane, 1,4-bis(t-butylperoxycarbonyl)cyclohexane, 2,2-bis(t-butylperoxy)octane, n-butyl-4,4-bis(t-butylperoxy)valerate, 2,2-bis(t-butylperoxy)butane, 1,3-bis(t-butylperoxyisopropyl)benzene, 2,5-dimethyl-2,5-di(t-butylperoxy)hexane, 2,5-dimethyl-2,5-di(t-butylperoxy)hexane, 2,5-dimethyl-2,5-di(benzoylperoxy)hexane, di-t-butyl diperoxyisophthalate, 2,2-bis(4,4-di-t-butylperoxycyclohexyl)propane, di-t-butyl peroxy-α-methylsuccinate, di-t-butyl peroxydimethylglutarate, di-t-butyl peroxyhexahydroterephthalate, di-t-butyl peroxyazelate, 2,5-dimethyl-2,5-di(t-butylperoxy)hexane, diethylene glycol bis(t-butylperoxycarbonate), di-t-butyl peoxytrimethyladipate, tris(t-butylperoxy)triazine, and vinyl tris(t-butylperoxy)silane. These may be used singly or in combination. As for the use amount thereof, they may be used in a concentration of 0.05 parts by mass or more (preferably 0.1 to 15 parts by mass) with respect to 100 parts by mass of the monomer.

(Other Biodegradable Plastics)

Further, in the present invention, a combination with a binder composed of other biodegradable plastics can be preferably used. The biodegradable plastics may include "Ecostar" and "Ecostar Plus" (Hagiwara Kogyo Co., Ltd.), "Biopol" (Monsanto Company), "Ajicoat" (Ajinomoto Co., Inc.), "Celgreen" (Daicel Chemical Industries, Ltd.), "Bionolle" (Showa Kobunshi K.K.), "Eco Plastic" (Toyota Motor Corporation), "LACEA" (Mitsui Chemical Inc.), "Biogreen" (Mitsubishi Gas Chemical Company, Inc.), "NatureWorks" (Cargill Dow LLC), and "Biomax" (Du Pont).

It is preferred that the binder resin and the charge control agent of the present invention are combined so that the polymer structure of the binder resin and that of the polymer chain of the charge control agent are as similar as possible to each other. If the polymer structure of the binder resin and that of the polymer chain of the charge control agent differ from each other to a considerable extent, dispersion of the charge control agent into the binder resin tends to be insufficient.

The charge control agent of the present invention is internally added to the resin binder in a mass ratio of usually 0.1 to 50% by mass, preferably 0.2 to 20% by mass. If the mass ratio of the internally added charge control agent is less than 0.1% by mass, the charge amount of the toner is small, while if it exceeds 50% by mass, the charging stability of the toner is deteriorated.

<Charge Control Agent Other Than PHA>

A conventionally used charge control agent other than the charge control agent of the present invention can be used in addition to the charge control agent of the present invention. Specific examples of the other charge control agents may include nigrosine dyes, quaternary ammonium salt, and monoazo metal complex salt dyes. The amount of the charge control agent to be added can be determined by taking into consideration conditions such as chargeability of the binder resin, the production method including the addition amount and dispersion method of the colorant, and the chargeability of other additives. The addition amount of the charge control agent can be used in the range of 0.1 to 20 parts by mass, preferably of 0.5 to 10 parts by mass with respect to 100 parts by mass of the binder resin. Alternatively, an inorganic particle of metal oxide or the like, or an inorganic material having a surface treated with the organic material described above may be used as a charge control agent. Each of those charge control agents may be used by adding and mixing in the binder resin or used in a form of being adhered on the surface of a toner particle.

<Colorant>

As for the colorant that constitutes the electrostatic charge image developing toner of the present invention, any colorant that is generally used in producing toners can be used and is not particularly limited. For example, carbon black, titanium white, and any other pigments and/or dyes can be used.

For example, when the electrostatic charge image developing toner of the present invention is used as a magnetic color toner, examples of the colorant that can be used include C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, and C.I. Basic Green 6. Examples of the pigment that can be used include chrome yellow, cadmium yellow, mineral fast yellow, navel yellow, naphthol yellow S, Hansa yellow G, permanent yellow NCG, tartrazine lake, chrome orange, molybdenum orange, permanent orange GTR, pyrazolone orange, benzidine orange G, cadmium red, permanent red 4R, watching red calcium salt, eosin lake, brilliant carmine 3B, manganese violet, fast violet B, methyl violet lake, Prussian blue, cobalt blue, alkali blue lake, victoria blue lake, phthalocyanine blue, fast sky blue, indanthrene blue BC, chrome green, chromium oxide, pigment green B, malachite green lake, and final yellow green G.

Further, when the electrostatic charge image developing toner of the present invention is used as a two-component full color toner, the following can be used as a colorant. Examples of the coloring pigment for magenta color toner include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, and 209, and C.I. Pigment Violet 19, C.I. Vat Red 1, 2, 10, 13, 15, 23, 29, and 35.

In the present invention, the above-cited pigments may be used singly. However, it is more preferable that a dye and a pigment are used in combination to increase sharpness of the pigment in terms of the image quality of full color images. Examples of the dye for magenta that can be used in this case include: oil-soluble dyes such as C.I. Solvent Red 1, 3, 8, 23, 24, 25, 27, 30, 49, 81, 82, 83, 84, 100, 109, and 121, C.I. Disperse Red 9, C.I. Solvent Violet 8, 13, 14, 21, and 27, and C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39, 40, and C.I. Basic Violet 1, 3, 7, 10, 14, 15, 21, 25, 26, 27, and 28.

Other coloring pigments include cyan coloring pigments, such as C.I. Pigment Blue 2, 3, 15, 16, and 17, C.I. Vat Blue 6, C.I. Acid Blue 45, and copper phthalocyanine pigments having a phthalocyanine skeleton substituted with 1 to 5 phthalimidomethyl groups.

Examples of the coloring pigment for yellow include C.I. Pigment Yellow 1, 2, 3, 4, 5, 6, 7, 10, 11, 12, 13, 14, 15, 16, 17, 23, 65, 73, and 83, and C.I. Vat Yellow 1, 3, and 20.

The dyes and pigments as described above may be used singly or as optional mixtures in order to obtain a desired color tone of the toner. In the case of taking into consideration the environmental preservation, the safety to the human body, or the like, various food dyes can be suitably used. The content of the above-mentioned colorants in the toner can be varied widely depending on a desired coloring effect or other factors. Usually, in order to obtain the best toner characteristics, that is, in the case of taking into consideration coloring power in printing, shape stability of toner, scattering of toner, or the like, the colorants are used in a proportion of usually 0.1 to 60 parts by mass, preferably 0.5 to 20 parts by mass with respect to 100 parts by mass of the binder resin.

<Other Components of Toner>

The electrostatic charge image developing toner of the present invention may contain, besides the above-mentioned binder resin and colorant components, the compounds described below within the range in which they do not give adverse influence on the effects of the present invention (in a proportion smaller than the contents of the binder resin component). Examples of such compounds include: aliphatic or alicyclic hydrocarbon resins and aromatic petroleum resins such as silicone resins, polyesters, polyurethanes, polyamides, epoxy resins, polyvinyl butyral, rosins, modified rosins, terpene resins, phenol resins, low molecular weight polyethylene, and low molecular weight polypropylene; chlorinated paraffin; and paraffin waxes. Preferably usable waxes among these specifically include low molecular weight polypropylene and by products thereof, low molecular weight polyesters and ester waxes, and aliphatic derivatives. Also, waxes prepared by fractionation of these waxes according to molecular weight by various methods may be preferably used in the present invention. Further, after the fractionation, oxidation, block copolymerization, or graft modification may be performed.

In particular, the electrostatic charge image developing toner of the present invention containing the above wax components exhibits excellent characteristics in the case where laminagraphic observation performed with a transmission electron microscope (TEM) shows that these wax components are dispersed in the binder resin in the form of substantially spherical and/or spindle-shaped islets.

<Toner Preparation Process>

As a specific method for preparing the electrostatic charge image developing toner of the present invention having the above constitution, any one of known methods can be used. The electrostatic charge image developing toner of the present invention can be prepared by the so-called pulverization method in which a toner is obtained, for example, by the following processes. That is, to be specific, the polyhydroxyalkanoate, resins such as a binder resin, and a wax that are added as needed are sufficiently mixed by using a mixer such as a Henschel mixer or a ball mill, and melt-kneaded by using a thermal kneader such as a heat roll, a kneader, or an extruder to make the resins compatible with each other. Then, a pigment, dye, or magnetic material as a colorant, and an additive that is added as needed such as a metal compound, are dispersed or dissolved in the kneaded resin and cooled and solidified. The solid product is then pulverized by a pulverizer such as a jet mill or a ball mill and classified to obtain the electrostatic charge image developing toner of the present invention having a desired particle size. Note that in the classification step, it is preferred to use a multisegment classifier to increase the production efficiency.

The electrostatic charge image developing toner of the present invention can be obtained also by the following method. That is, a binder resin and the polyhydroxyalkanoate are mixed in the form of solutions by using solvents (aromatic hydrocarbons such as toluene and xylene, halides such as chloroform and ethylene dichloride, ketones such as acetone and methyl ethyl ketone, amides such as dimethylformamide, and the like), and agitated. Thereafter, the mixed solution is poured into water to cause reprecipitation, and the solid products are filtered, dried, and pulverized by using a pulverizer such as a jet mill or a ball mill, followed by classification to obtain the electrostatic charge image developing toner of the present invention having a desired particle size. Note that in the classification step, it is preferred to use a multisegment classifier to increase the production efficiency.

Further, the electrostatic charge image developing toner of the present invention can be prepared also by a so-called polymerization method as described below. That is, in this case, the polyhydroxyalkanoate, a polymerizable monomer, and a pigment, dye, or magnetic material as a colorant, and optionally a crosslinking agent, a polymerization initiator, a wax, and other additives are mixed and dispersed and subjected to suspension polymerization in an aqueous dispersion medium in the presence of a surfactant and the like to synthesize polymerizable colored resin particles. Then, the obtained particles are subjected to solid-liquid separation, then dried, and classified as necessary to obtain the electrostatic charge image developing toner of the present invention.

Furthermore, colored fine particles containing no charge control agent can be prepared by the methods described above and then, the polyhydroxyalkanoate, singly or together with an external additive such as colloidal silica, may be added and fixed to the surface of the particles by a mechanochemical method or the like.

(Silica External Additive)

In the present invention, it is preferred that silica fine powder is added externally to the toner prepared by the above-mentioned method in order to improve charge stability, developability, flowability, and durability. On this occasion, use of silica fine powder that has a specific surface area in the range of $20 \, m^2/g$ or more (in particular, 30 to $400 \, m^2/g$) as measured by nitrogen adsorption according to the BET method can give good results. In this case, it is preferred to use the silica fine powder in an amount of about 0.01 to about 8 parts by mass, preferably about 0.1 to about 5 parts by mass, with respect to 100 parts by mass of the toner particles. As for the silica fine powder to be used, it is preferred to use one that is treated with a treating agent such as silicone varnish, various kinds of modified silicone varnish, silicone oil, various kinds of modified silicone oil, silane coupling agents, silane coupling agents having a functional group, and other or ganosilicon compounds as needed for the purpose of imparting to the toner hydrophobic nature or controlling the chargeability of the toner. These treating agents may be used as mixtures.

(Inorganic Powder)

To increase the developability and durability of the toner, it is preferred to add inorganic powders, for example: oxides of metals such as magnesium, zinc, aluminum, cerium, cobalt, iron, zirconium, chromium, manganese, strontium, tin, and antimony; composite metal oxides such as calcium titanate, magnesium titanate, and strontium titanate; metal salts such as calcium carbonate, magnesium carbonate, and aluminum carbonate; clay minerals such as kaolin; phosphate compounds such as apatite; silicon compounds such as silicon carbide and silicon nitride; and carbon powders such as carbon black and graphite. Of those, fine powders of zinc oxide, aluminum oxide, cobalt oxide, manganese dioxide, strontium titanate, and magnesium titanate are preferably used.

(Lubricant)

Further, lubricant powder as described below may be added to the toner. Examples of the lubricant powder include fluororesins such as Teflon, polyvinylidene fluoride; fluoro compounds such as carbon fluoride; fatty acid metal salts such as zinc stearate; fatty acid and fatty acid derivatives such as fatty acid esters; and molybdenum sulfide.

<Carrier>

The electrostatic charge image developing toner of the present invention having the above-mentioned constitution may be applied to various kinds of known toners; for example, it may be used as a nonmagnetic toner that is used singly as a nonmagnetic one-component developer or as a magnetic two-component developer together with a magnetic carrier, or as a magnetic toner used singly as a magnetic one-component developer. Any conventionally known carrier may be used as a carrier in the two-component developing method. Specifically, surface-oxidized or non-oxidized particles having an average particle size of 20 to 300 μm formed from metals such as iron, nickel, cobalt, manganese, chromium, and rare earth elements, alloys thereof or oxides may be used as carrier particles. It is preferred that the carrier used in the present invention includes the carrier particles described above, the surface of which are coated with a substance such as a styrene resin, an acrylic resin, a silicone resin, a fluoro resin, or a polyester resin or has such a substance adhered thereto.

<Magnetic Toner>

The electrostatic charge image developing toner of the present invention may contain a magnetic material in the toner particles to form a magnetic toner. In this case, the magnetic material may also serve as a colorant. The magnetic material that can be used on this occasion includes iron oxides such as magnetite, hematite, and ferrite; and metals such as iron, cobalt, and nickel, or alloys and mixtures of these metals with other metals such as aluminum, cobalt, copper, lead, magnesium, tin, zinc, antimony, beryllium, bismuth, cadmium, calcium, manganese, selenium, titanium, tungsten, and vanadium. Preferably, the magnetic materials that can be used in the present invention have an average particle size of 2 μm or less, more preferably about 0.1 to about 0.5 μm. It is preferred that they are contained in the toner in an amount of 20 to 200 parts by mass with respect to 100 parts by mass of the binder resin, particularly preferably 40 to 150 parts by mass with respect to 100 parts by mass of the binder resin.

Further, to accomplish high image quality, it is necessary to enable faithful developing of finer latent image dots. For this purpose, for example, it is preferable to adjust the electrostatic charge image developing toner particles of the present invention so as to have a weight average particle size in the range of 4 μm to 9 μm. That is, the toner particles having a weight average particle size of less than 4 μm are undesirable, since with such a toner the image transfer efficiency tends to decrease and much untransferred toner is liable to remain on the photosensitive member after the transfer, which tends to cause unevenness of image due to fogging/transfer failure. If the weight average particle size of the toner particle exceeds 9 μm, scattering of characters or line images tends to occur.

In the present invention, the average particle size and particle size distribution of the toner are measured by using Coulter Counter TA-II or Coulter Multisizer (manufactured by Beckman Coulter, Inc.), which is connected to an interface (manufactured by Nikkaki Bios Co., Ltd.) and a personal computer for outputting a number distribution and a volume distribution. As an electrolyte to be used in the measurement, there is used a 1% NaCl aqueous solution prepared with first grade sodium chloride. As the electrolyte, there may be also used, for example, commercially available ISOTON R-II (manufactured by Coulter Scientific Japan Co.). Specifically, for measurement, 0.1 to 5 ml of a surfactant (preferably an alkylbenzenesulfonate) as a dispersant and further 2 to 20 mg of a measurement sample are added to 100 to 150 ml of the electrolytic solution to prepare a sample for measurement. In the measurement, the resultant suspension of the measurement sample in the electrolytic solution is subjected to a dispersion treatment by an ultrasonic disperser for about 1 to 3 minutes and then subjected to measurement of the volume and number of toner particles of equal to or greater than 2 μm by using the above-mentioned Coulter Counter TA-II with a 100 μm-aperture as an aperture to calculate the volume distribution and the number distribution. Then, the volume-basis weight average particle size (D4) and number-basis length-average particle size (D1) related to the present invention are derived from the volume distribution and the number distribution, respectively.

<Charge Amount>

It is preferred that the electrostatic charge image developing toner of the present invention has a charge amount (two component method) per unit mass of −10 to −80 μC/g, more preferably −15 to −70 μC/g in order to increase transfer efficiency in a transfer method using a voltage applied transfer member.

Figure 7:
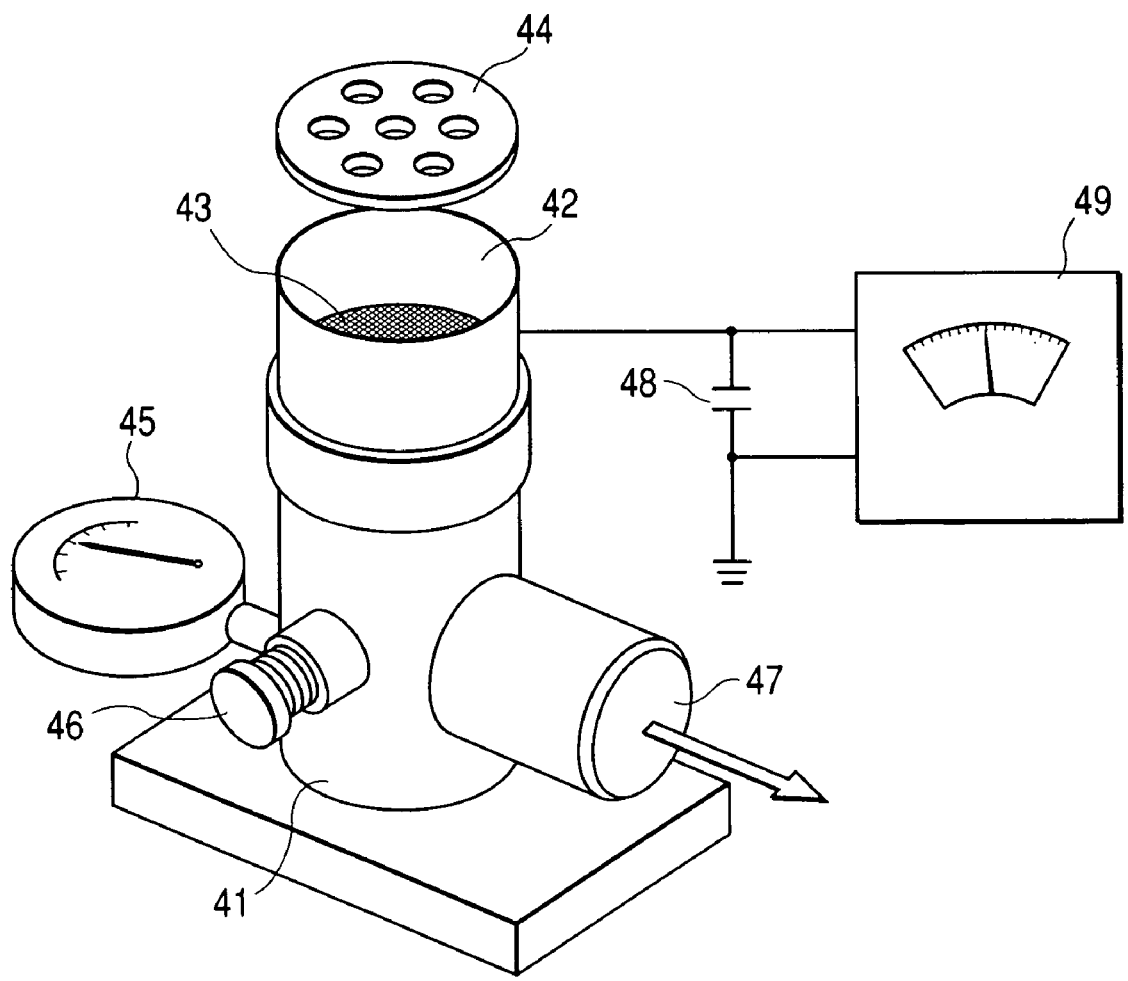
FIG. 7 is a schematic view showing a blow-off charge amount measuring device measuring a charge amount of a toner.

The method of measuring a charge amount (two component triboelectric charge amount) by a two component method used in the present invention is as indicated below. For measurement, a charge amount measuring apparatus as shown in FIG. 7 is used. First, under a certain environment, a mixture of 9.5 g of EFV 200/300 (manufactured by Powdertech Co., Ltd.) as a carrier and 0.5 g of toner to be measured is added into a 50 to 100 ml capacity polyethylene bottle, which is then placed in a shaker set under shaking conditions of a fixed amplitude of 100 mm and a shaking speed of 100 strokes per minute and shaken for a predetermined period of time. Then, 1.0 to 1.2 g of the mixture is charged in a metallic measurement container 42 (made of metal) having a 500-mesh screen 43 at the bottom of the charge amount measuring apparatus shown in FIG. 7 and covered with a metal lid 44. The total mass of the measurement container 42 is measured and denoted by W1 (g). Then, an aspirator (not shown), in which at least the part contacting with the measurement container 42 is an insulator, is operated to effect suction through a suction port 47 while pressure of a vacuum gauge 45 is so regulated as to be 2,450 Pa (250 mmAq) by adjusting an airflow control valve 46. In this state, suction is continued for 1 minute to remove the toner. The voltage at this time of a voltmeter 49 is denoted by V (volts). Here, reference numeral 48 designates a capacitor having a capacitance C (μF). The total mass of the measuring apparatus after the suction is measured and denoted by W2 (g). The triboelectric charge amount (μC/g) of the toner is calculated by the following equation:

Triboelectric charge amount (μC/g)=C×V/(W1−W2).

<Molecular Weight Distribution of Binder Resin>

It is preferred that the binder resin used as a constituent material of the electrostatic charge image developing toner of the present invention shows a low molecular weight region peak in the range from 3,000 to 15,000 in the molecular weight distribution by GPC, in particular, when it is prepared by a pulverization method. That is, if the GPC peak in the low molecular weight region exceeds 15,000, improvement in transfer efficiency may in some cases become insufficient. On the other hand, the use of a binder resin having a GPC peak in the low molecular weight region of less than 3,000 is not preferable since fusion tends to occur at the time of surface treatment.

In the present invention, the molecular weight of the binder resin is measured by GPC (gel permeation chromatography). A specific method for the measurement by GPC may include the following: the toner is beforehand extracted with THF (tetrahydrofuran) solvent for 20 hours by means of an Soxhlet extractor, and the sample thus obtained is used for measurement of molecular weight by using columns of A-801, 802, 803, 804, 805, 806, and 807, (manufactured by Showa Denko K.K.) connected in series, and using a calibration curve of standard polystyrene resin. In the present invention, it is preferred to use a binder resin having a ratio (Mw/Mn), which is a ratio of the weight average molecular weight (Mw) and number average molecular weight (Mn) thus measured, in the range of 2 to 100.

<Glass Transition Point of Toner>

It is preferred that the toner of the present invention is so prepared as to have a glass transition point Tg of 40 to 75° C. more preferably 52 to 70° C. by using appropriate materials in consideration of fixing property and shelf life. In this case, the glass transition point Tg of the toner is measured using a high-precision differential scanning calorimeter of inner-heat, input compensation type, for example, DSC-7, manufactured by PerkinElmer Inc., according to ASTM D 3418-82. In the present invention, when measuring the glass transition point Tg, the temperature of a sample to be measured is once elevated to record all the thermal hysteresis and then quickly cooled. Again, the temperature of the sample is elevated at a temperature rise rate of 10° C./minute within the temperature range of 0 to 200° C. A DSC curve obtained based on the results of measurements under these conditions may be suitably used.

<Image Forming Method and Apparatus>

The electrostatic charge image developing toner of the present invention having the constitution described above is particularly preferably applied to an image forming method including at least a charging step of charging an electrostatic latent image bearing member by applying a voltage to a charging member from the outside, a step of forming an electrostatic charge image on the charged electrostatic latent image bearing member, a developing step of developing the electrostatic charge image by using a toner to form a toner image on the electrostatic latent image bearing member, a transfer step of transferring the toner image on the electrostatic latent image bearing member to a recording medium, and a heat-fixing step of heat-fixing the toner image on the recording medium. Alternatively, the toner of the present invention may be particularly preferably applied to an image forming method in which a transfer step includes a first transfer step of transferring the toner image on the electrostatic latent image bearing member to an intermediate transfer member and a second transfer step of transferring the toner image on the intermediate transfer member to the recording medium.

EXAMPLES

Hereinafter, the present invention will be illustrated in more detail by referring to examples, but the present invention should not be construed as being limited thereto.

Tosoh HLC-8220, column; Tosoh TSK-GEL Super HM-H, solvent; chloroform, in polystyrene equivalent). As a result, the number average molecular weight (Mn) was 124,000, and the weight average molecular weight (Mw) was 242,000.

Further, for specifying the structure of the resultant PHA, an NMR analysis was carried out under the following conditions.

<Measuring Apparatus>
FT-NMR: Bruker DPX400
Resonance frequency: $^1$H=400 MHz

<Measuring Condition>
Measuring nuclide: $^1$H
Used solvent: TMS/CDCl$_3$
Measuring temperature: room temperature From the results, the resultant PHA was found to be a PHA copolymer containing 3-hydroxy-5-phenylvaleric acid (A unit), 3-hydroxy-10-undecenoic acid (B unit), 3-hydroxy-8-nonenoic acid (C unit), and 3-hydroxy-6-heptenoic acid (D unit) represented by the following chemical formula (32) as monomer units.

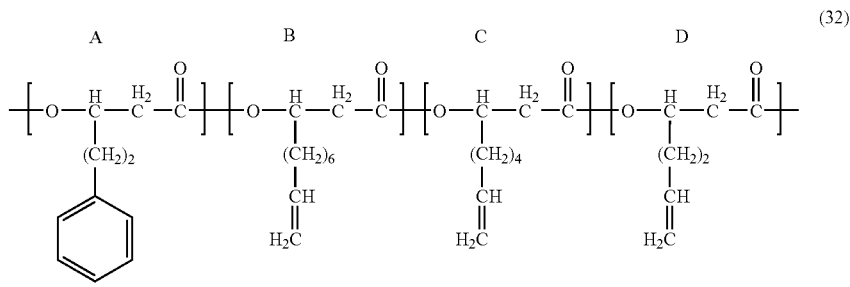

Referential Example A 20 shaking flasks (volume: 500mL) were prepared, 0.5 wt % of polypeptone (Wako Pure Chemical Industries, Ltd.), 6 mmol/L of 5-phenylvaleric acid, and 2 mmol/L of 10-undecenoic acid were dissolved in 200 mL of the aforementioned M9 medium, and the mixture was then placed in each of the 500-mL shaking flasks. The flasks were sterilized in an autoclave and cooled to room temperature. The culture solution (2 mL), in which *Pseudomonas cichorii* YN2 strain had been previously cultured with shaking in the M9 medium containing 0.5% of polypeptone for 8 hours, was added to the resultant medium, followed by culture at 30° C. for 64 hours. After completion of culture, each culture solution was centrifuged together to collect the cells. The cells were washed with methanol and dried. After the weight of the dried cells was measured, chloroform was added thereto. Then, the mixture was agitated at 35° C. for 72 hours, to thereby extract a polymer. Chloroform in which the polymer was extracted was filtered by using a membrane filter (0.45 µm), and the filtrate was then concentrated with an evaporator, followed by reprecipitation in cold methanol, to thereby recover the polymer. Then, the polymer was dried under reduced pressure to obtain the target polymer.

The weight of the freeze-dried cells (the dry weight of the cells) was measured as the obtained polymer. In this example, 2,708 mg of PHA (dry weight) was obtained.

The resultant PHA was evaluated for average molecular weight by gel permeation chromatography (GPC apparatus;

In addition, the percentage of the units was confirmed by $^1$H-NMR spectrum. From the results, it was found that 3-hydroxy-5-phenylvaleric acid (A unit) was 81 mol %, the total of three units of 3-hydroxy-10-undecenoic acid, 3-hydroxy-8-nonenic acid, and 3-hydroxy-6-heptenoic acid (B unit+C unit+D unit) was 15 mol %, and other compounds (straight-chain 3-hydroxyalkanoic acid having 4 to 12 carbon atoms and 3-hydroxyalka-5-enoic acid having 10 or 12 carbon atoms) was 4 mol %.

From the results, the PHA was found to be a PHA containing a 3-hydroxy-ω-alkenoate unit represented by chemical formula (24).

The polyhydroxyalkanoate obtained here was used in the following reaction.

After 1,000 mg of the PHA was added to a. 500-mL eggplant flask, the PHA was dissolved by adding 65 mL of dichloromethane. The flask was placed in an ice bath, 11 mL of acetic acid and 680 mg of 18-crown-6-ether were added thereto, and the resultant mixture was agitated. Subsequently, 540 mg of potassium permanganate was slowly added to the flask in the ice bath, and the mixture was agitated at room temperature for 20 hours. After completion of reaction, 50 mL of water and sodium bisulfite were added to the flask. Then, the mixture was adjusted to pH 1 with 1.0 mol/L (1.0 N) of hydrochloric acid. After dichloromethane in the mixed solution was distilled off with an evaporator, a polymer in the solution was recovered. The polymer was washed with 150 mL of ethanol and was further washed with 150 mL of pure water three times, followed by recovering the polymer. The polymer was dried under reduced pressure, to thereby obtain 920 mg of the target PHA.

The resultant PHA was evaluated for average molecular weight by gel permeation chromatography (GPC; Tosoh HLC-8220, column; Tosoh TSK-GEL Super HM-H, solvent; chloroform, in polystyrene equivalent). As a result, the number average molecular weight (Mn) was 81,000, and the weight average molecular weight (Mw) was 92,000.

For specifying the structure of the resultant PHA, an NMR analysis was carried out under the aforementioned conditions.

From the results, the PHA was found to be a PHA copolymer containing 3-hydroxy-5-phenylvaleric acid represented by the following chemical formula (33), 3-hydroxy-9-carboxynonanoic acid represented by the chemical formula (34), 3-hydroxy-7-carboxyheptanoic acid represented by the chemical formula (35), and 3-hydroxy-5-carboxyvaleric acid represented by the chemical formula (36) as monomer units.

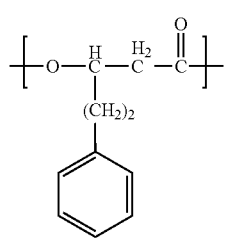

(33)

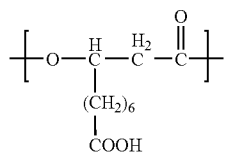

(34)

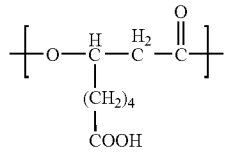

(35)

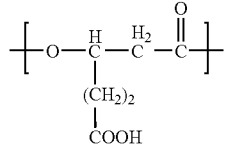

(36)

Moreover, a carboxyl group in the terminus of the side chain of the PHA was methyl-esterified with trimethylsilyl (TMS)diazomethane for determining the percentage of each unit of the resultant PHA.

After 50 mg of the target PHA was added to a 100-mL eggplant flask, the PHA was dissolved by adding 3.5 mL of chloroform and 0.7 mL of methanol. Then, 2 mL of TMS diazomethane-hexane solution (0.63 mol/L, Tokyo Kasei Kogyo Co., Ltd.) was added to the flask, and the mixture was agitated at room temperature for 30 minutes. After completion of reaction, the solvent was distilled off with an evaporator, and the polymer was then recovered. After the resultant polymer was washed with 50 mL of methanol, the polymer was recovered. The polymer was dried under reduced pressure to obtain 49 mg of a PHA.

An NMR analysis was carried out for determining the percentage of each unit in a manner similar to the above method. From the results, it was found that 3-hydroxy-5-phenylvaleric acid was 92 mol %, the total of three units of 3-hydroxy-9-carboxynonanoic acid, 3-hydroxy-7-carboxyheptanoic acid, and 3-hydroxy-5-carboxyvaleric acid was 7 mol %, and other compounds (straight-chain 3-hydroxyalkanoic acid having 4 to 12 carbon atoms and 3-hydroxyalka-5-enoic acid having 10 or 12 carbon atoms) was 1 mol %.

Example A-1

Under a nitrogen atmosphere, 200 mg of a polymer containing 7 mol % of a 3-hydroxy-ω-carboxyalkanoate unit obtained in Referential Example A and 22.9 mg of p-toluidine-2-sulfonic acid were placed in a 50-ml two-neck-flask, and 10 ml of pyridine was added, followed by agitating. Subsequently, 0.22 ml of triphenyl phosphite was added thereto, and the mixture was heated at 100° C. for 6 hours. After completion of reaction, reprecipitation was carried out with EtOH, and the reprecipitate was recovered by centrifugation. The resultant polymer was washed by agitating in water for 3 days, further washed by 1N hydrochloric acid for 1 day, and dried under vacuum for 1 day.

The average molecular weight of the resultant PHA was evaluated by gel permeation chromatography (GPC; Tosoh HLC-8020, column; Polymer Laboratories Mixed-C, solvent; DMF containing 0.1% LiBr, in polystyrene equivalent). As a result, the number average molecular weight (Mn) was 28,000.

The structure of the resultant polymer was analyzed by Fourier transform-infrared absorption (FT-IR) spectrum and $^1$H-NMR.

Figure 8:
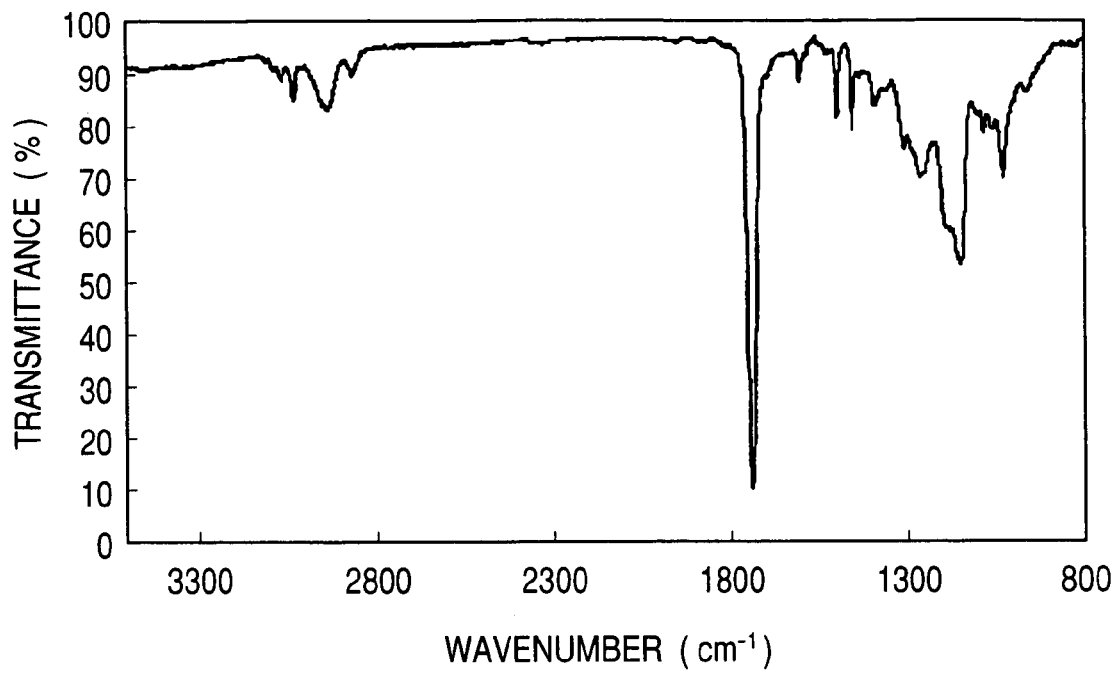
FIG. 8 is a diagram showing an FT-IR spectrum of a polymer obtained in Example A-1.

From the results of the analysis by Fourier transform-infrared absorption (FT-IR) spectrum (Nicolet AVATAR 360 FT-IR), it was found that the peak assigned to carboxylic acid of 1,693 cm$^{-1}$ reduced and a new peak assigned to an amide group of 1,668 cm$^{-1}$ appeared. FIG. 8 shows an FT-IR spectrum of the resultant polymer.

Moreover, from the results of the analysis of the resultant polymer by $^1$H-NMR (FT-NMR: Bruker DPX 400; resonance frequency: 400 MHz; measuring nuclide: $^1$H; used solvent: deuterated DMSO; measuring temperature: room temperature), it was found that a peak assigned to a methyl group of p-toluidine-2-sulfonic acid was shifted more than a peak assigned to a methyl group of p-toluidine-2-sulfonic acid of a raw material. As a result, the resultant PHA was found to be a PHA containing a unit represented by the chemical formula (7B).

In addition, the quantity of sulfur was determined using a sulfur analysis apparatus "TS-100" manufactured by Dia Instruments Co., Ltd. by "oxidative destruction-ultraviolet fluorescence analysis". As a result, the resultant PHA was found to be a PHA copolymer containing 4.9 mol % of a p-toluidine-2-sulfonic acid group.

By conducting the preparation method in large scale, 50 g of the PHA copolymer was obtained, and the compound was provided as Exemplary Compound A-1 and subjected to toner preparation and evaluation thereof.

Example A-2

The procedure of Example A-1 was repeated except that 27.3 mg of 2-amino-1-naphthalenesulfonic acid was used instead of 22.9 mg of p-toluidine-2-sulfonic acid used in Example A-1, to thereby obtain 84 mg of a polymer.

FT-IR revealed that an amide bond was formed because the peak assigned to carboxylic acid reduced and a new peak assigned to an amide group appeared as shown in FIG. 8. The resultant PHA was found to be a PHA containing a unit represented by the chemical formula (8A).

The resultant PHA was analyzed for the average molecular weight in a manner similar to Example A-1. The number average molecular weight (Mn) of the PHA was 27,500. Moreover, from the results of determination of sulfur quantity, the resultant PHA was found to be a PHA copolymer containing 4.7 mol % of a 2-amino-1-naphthalenesulfonic acid group.

By conducting the preparation method in large scale, 50 g of the PHA copolymer was obtained, and the compound was provided as Exemplary Compound A-2 and subjected to toner preparation and evaluation thereof.

Example A-3

The procedure of Example A-1 was repeated except that 21.2 mg of 4-aminobenzenesulfonic acid was used instead of 22.9 mg of p-toluidine-2-sulfonic acid used in Example A-1, to thereby obtain 76 mg of a polymer.

FT-IR revealed that an amide bond was formed because the peak assigned to carboxylic acid reduced and a new peak assigned to an amide group appeared as shown in FIG. 8. The resultant PHA was found to be a PHA containing a unit represented by the chemical formula (7A).

The resultant PHA was analyzed for the average molecular weight in a manner similar to Example A-1. The number average molecular weight (Mn) of the PHA was 29,300. Moreover, from the results of determination of sulfur quantity, the resultant PHA was found to be a PHA copolymer containing 4.5 mol % of a 4-aminobenzenesulfonic acid group.

By conducting the preparation method of the resultant polymer in large scale, 50 g of the PHA copolymer was obtained and the compound was provided as Exemplary Compound A-3 and subjected to toner preparation and evaluation thereof.

Example A-4

After 100 mg of the PHA obtained in Example A-2 was added to a 200-mL eggplant flask, the PHA was dissolved by adding 7 mL of chloroform and 1.4 mL of methanol. Then, 2 mL of TMS diazomethane-hexane solution (0.63 mol/L, Tokyo Kasei Kogyo Co., Ltd.) was added to the flask, and the mixture was agitated at room temperature for 30 minutes. After completion of reaction, the solvent was distilled off with an evaporator, and the polymer was then recovered. After the resultant polymer was washed with 50 mL of methanol, the polymer was recovered. The polymer was dried under reduced pressure to obtain 70 mg of a PHA.

For specifying the structure of the resultant PHA, an analysis was carried out by FT-IR.

As a result, the resultant PHA was found to be a methyl-esterified PHA because peaks assigned to a sulfonic group of 1,190 cm$^{-1}$ and 1,059 cm$^{-1}$ were shifted to peaks assigned to methyl sulfonate of 1,370 cm$^{-1}$ and 1,176 cm$^{-1}$.

Also, it was revealed that sulfonic acid was changed to methyl sulfonate because a peak assigned to sulfonic acid was not found by an acid value titration by using a potentiometric titrator (AT-510, manufactured by Kyoto Electronics Manufacturing, Co., Ltd.).

By conducting the preparation method in large scale, 50 g of the PHA copolymer was obtained, and the compound was provided as Exemplary Compound A-4 and subjected to toner preparation and evaluation thereof.

Example A-5

The procedure of Example A-1 was repeated except that 30.7 mg of 2-aminobenzenesulfonic acid phenyl ester was used instead of 22.9 mg of p-toluidine-2-sulfonic acid used in Example A-1, to thereby obtain 80 mg of a polymer.

FT-IR revealed that an amide bond was formed because the peak assigned to carboxylic acid reduced and a new peak assigned to an amide group appeared as shown in FIG. 8. Simultaneously, peaks assigned to sulfonic acid phenyl ester of 1,375 cm$^{-1}$ and 1,193 cm$^{-1}$ were found. As a result, the resultant PHA was found to be a PHA containing a unit represented by the chemical formula (7B).

The resultant PHA was analyzed for the average molecular weight in a manner similar to Example A-1. The number average molecular weight (Mn) of the PHA was 31,400. Moreover, from the results of determination of sulfur quantity, the resultant PHA was found to be a PHA copolymer containing 4.5 mol % of a 2-aminobenzenesulfonic acid phenyl ester group.

By conducting the preparation method of the resultant polymer in large scale, 50 g of the PHA copolymer was obtained and the compound was provided as Exemplary Compound A-5 and subjected to toner preparation and evaluation thereof.

Example A-6

The procedure of Example A-1 was repeated except that 30.7 mg of 2-amino-2-methylpropanesulfonic acid was used instead of 22.9 mg of p-toluidine-2-sulfonic acid used in Example A-1, to thereby obtain 71 mg of a polymer.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature) and Fourier transform-infrared absorption (FT-IR) spectrum (Nicolet AVATAR 360 FT-IR).

FT-IR revealed that an amide bond was formed because the peaks assigned to carboxylic acid reduced and a new peak assigned to an amide group appeared as shown in FIG. 8. The resultant PHA was confirmed to be a PHA containing a unit represented by the chemical formula (7B).

In addition, from the results of $^1$H-NMR for the resultant polymer, the resultant PHA was found to be a polyhydroxyalkanoate copolymer containing a 2-amino-2-methylpropanesulfonic acid group because a peak assigned to a methyl group at 1.5 ppm was shifted due to introduction of 2-amino-2-methylpropanesulfonic acid.

Moreover, from the results of determination of sulfur quantity, the resultant PHA was found to be a PHA copolymer containing 5 mol % of a 2-amino-2-methylpropanesulfonic acid group.

The resultant PHA was evaluated for average molecular weight by gel permeation chromatography (GPC; Tosoh HLC-8020, column; Polymer Laboratories PLgel 5µ MIXED-C, solvent; DMF/LiBr 0.1% (w/v), in polystyrene equivalent). As a result, the number average molecular weight (Mn) was 27,600, and the weight average molecular weight (Mw) was 31,000.

Example A-7

After 30 mg of the PHA obtained in Example A-6 was added to a 100-ml eggplant flask, the PHA was dissolved by adding 3 ml of chloroform and 0.6 ml of methanol and the mixture was cooled to 0° C. Then, 0.8 ml of a trimethylsilyl-diazomethane-hexane solution (2 mol/L, manufactured by Aldrich Co., Ltd.) was added to the flask, and the mixture was agitated for 4 hours. After completion of reaction, the solvent was distilled off with an evaporator, and a polymer was recovered.

Moreover, chloroform and methanol were added to the flask to dissolve the polymer again. Then, the solvent was distilled off with an evaporator. This procedure was repeated three times.

The polymer recovered here was dried under reduced pressure, to thereby obtain 24 mg of the PHA.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature). From the results of the $^1$H-NMR, the resultant PHA was found to be a polyhydroxyalkanoate copolymer containing 5 mol % of a methyl 2-amino-2-methylpropanesulfonate group because peaks assigned to methyl sulfonate were found at 3 to 4 ppm.

Also, it was revealed that sulfonic acid was changed to methyl sulfonate because a peak assigned to sulfonic acid was not found by an acid value titration by using a potentiometric titrator (AT-510, manufactured by Kyoto Electronics Manufacturing, Co., Ltd.).

The resultant PHA was evaluated for average molecular weight by gel permeation chromatography (GPC; Tosoh HLC-8020, column; Polymer Laboratories PLgel 5μ MIXED-C, solvent; DMF/LiBr 0.1% (w/v), in polystyrene equivalent). As a result, the number average molecular weight (Mn) was 24,000, and the weight average molecular weight (Mw) was 30,000.

Example A-8

The procedure of Example A-1 was repeated except that 21.1 mg of 2-aminobenzenesulfonic acid was used instead of 22.9 mg of p-toluidine-2-sulfonic acid used in Example A-1, to thereby obtain 78 mg of a polymer.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature) and Fourier transform-infrared absorption (FT-IR) spectrum (Nicolet AVATAR 360 FT-IR).

From the results of $^1$H-NMR, the resultant PHA was found to be a polyhydroxyalkanoate copolymer containing a 2-aminobenzenesulfonic acid group because peaks assigned to an aromatic ring were found at approximately 7.7 and 8.5 due to introduction of 2-aminobenzenesulfonic acid. FT-IR revealed that the resultant PHA was a PHA containing a unit represented by the chemical formula (7B) in which an amide bond was formed because the peaks assigned to carboxylic acid reduced and a new peak assigned to an amide group appeared as shown in FIG. 8. Regarding the average molecular weight, the number average molecular weight (Mn) of the PHA was 27,700. Moreover, from the results of determination of sulfur quantity, the resultant PHA was found to be a PHA copolymer containing 4.7 mol % of a 2-aminobenzenesulfonic acid group.

By conducting the preparation method in large scale, 50 g of the PHA copolymer was obtained, and the compound was provided as Exemplary Compound A-8 and subjected to toner preparation and evaluation thereof.

Example A-9

After 1.00 g of the PHA obtained in Example A-8 was added to a 300-ml eggplant flask, the PHA was dissolved by adding 70 ml of chloroform and 17 ml of methanol and the mixture was cooled to 0° C. Then, 27 ml of a trimethylsilyl-diazomethane-hexane solution (2 mol/L, manufactured by Aldrich Co., Ltd.) was added to the flask, and the mixture was agitated for 4 hours. After completion of reaction, the solvent was distilled off with an evaporator, and a polymer was recovered.

Moreover, chloroform and methanol were added to the flask to dissolve the polymer again. Then, the solvent was distilled off with an evaporator. This procedure was repeated three times.

The polymer recovered here was dried under reduced pressure, to thereby obtain 0.88 g of the PHA.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature). From the results of the $^1$H-NMR, the resultant PHA was found to be a polyhydroxyalkanoate copolymer containing 4 mol % of a methyl 2-aminobenzene-sulfonate group.

Also, it was revealed that sulfonic acid was changed to methyl sulfonate because a peak assigned to sulfonic acid Was not found by an acid value titration by using a potentiometric titrator (AT-510, manufactured by Kyoto Electronics Manufacturing, Co., Ltd.).

The resultant PHA was evaluated for average molecular weight by gel permeation chromatography (GPC; Tosoh HLC-8020, column; Polymer Laboratories PLgel 5μ MIXED-C, solvent; DMF/LiBr 0.1% (w/v), in polystyrene equivalent). As a result, the number average molecular weight (Mn) was 24,000, and the weight average molecular weight (Mw) was 31,000.

Example A-10

Under nitrogen atmosphere, 1.5 g of the polymer obtained in Referential Example A and 594 mg of 4-methoxyaniline-2-sulfonic acid were placed in a 100-ml three-neck-flask, and 57 ml of pyridine was added to the flask. After agitating the mixture, 1.5 ml of triphenyl phosphite was added to the flask, and the mixture was heated at 100° C. for 6 hours. After completion of reaction, reprecipitation was carried out with ethanol, and the reprecipitate was recovered. The resultant polymer was washed by agitating in pure water for 5.5 hours, and the polymer was recovered by filtration. After the filtrate was dried under reduced pressure, the dried product was dissolved in 150 ml of THF. Then, the mixture was mixed with 150 ml of 1N hydrochloric acid and agitated. After 13 hours, THF in the mixed solution was distilled off with an evaporator, and the polymer in the solution was then recovered.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature) and Fourier transform-infrared absorption (FT-IR) spectrum (Nicolet AVATAR 360 FT-IR).

From the results of $^1$H-NMR, the resultant PHA was found to be a polyhydroxyalkanoate copolymer containing 5 mol % of 4-methoxyaniline-2-sulfonic acid group because a peak assigned to an aromatic ring was found at 8.4 ppm due to introduction of 4-methoxyaniline-2-sulfonic acid group. The results of IR measurement revealed that the peak assigned to carboxylic acid of 1,693 cm$^{-1}$ reduced and a new peak assigned to an amide group of 1,669 cm$^{-1}$ appeared. The resultant PHA was found to be a PHA containing a unit represented by the chemical formula (7B).

The resultant PHA was evaluated for average molecular weight by gel permeation chromatography (GPC; Tosoh HLC-8020, column; Polymer Labolatories PLgel 5µ MIXED-C, solvent; DMF/LiBr 0.1% (w/v), in polystyrene equivalent). As a result, the number average molecular weight (Mn) was 36,000, and the weight average molecular weight (Mw) was 49,000.

Example A-11

After 0.90 g of the PHA obtained in Example A-10 was added to a 300-ml eggplant flask, the PHA was dissolved by adding 70 ml of chloroform and 17.5 ml of methanol and the mixture was cooled to 0° C. Then, 28 ml of a trimethylsilyl-diazomethane-hexane solution (2 mol/L, manufactured by Aldrich Co., Ltd.) was added to the flask, and the mixture was agitated for 4 hours. After completion of reaction, the solvent was distilled off with an evaporator, and a polymer was recovered.

Moreover, chloroform and methanol were added to the flask dissolve the polymer again. Then, the solvent was distilled off with an evaporator. This procedure was repeated three times.

The polymer recovered here was dried under reduced pressure, to thereby obtain 0.83 g of the PHA.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature). From the results of the $^1$H-NMR, the resultant PHA was found to be a polyhydroxyalkanoate copolymer containing 5 mol % of a methyl 4-methoxyaniline-2-sulfonate group because peaks assigned to methyl sulfonate were found at 3-4 ppm.

Also, it was revealed that sulfonic acid was changed to methyl sulfonate because a peak assigned to sulfonic acid was not found by an acid value titration by using a potentiometric titrator (AT-510, manufactured by Kyoto Electronics Manufacturing, Co., Ltd.).

The resultant PHA was evaluated for average molecular weight by gel permeation chromatography (GPC; Tosoh HLC-8020, column; Polymer Labolatories PLgel 5µ MIXED-C, solvent; DMF/LiBr 0.1% (w/v), in polystyrene equivalent). As a result, the number average molecular weight (Mn) was 33,000, and the weight average molecular weight (Mw) was 43,000.

Example A-12

Under nitrogen atmosphere, 1.5 g of the polymer obtained in Referential Example A and 650 mg of 1-naphthylamine-8-sulfonic acid were placed in a 100-ml three-neck-flask, and 56.5 ml of pyridine was added to the flask. After agitating the mixture, 1.5 ml of triphenyl phosphite was added to the flask, and the mixture was heated at 100° C. for 6 hours. After completion of reaction, reprecipitation was carried out with ethanol, and the reprecipitate was recovered. The resultant polymer was washed by agitating in pure water for 5.5 hours, and the polymer was recovered by filtration. After the filtrate was dried under reduced pressure, the dried product was dissolved in 150 ml of THF. Then, the mixture was mixed with 150 ml of 1N hydrochloric acid and agitated. 14 hours after the above operation, THF in the mixed solution was distilled off with an evaporator, and the polymer in the solution was then recovered.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature) and Fourier transform-infrared absorption (FT-IR) spectrum (Nicolet AVATAR 360 FT-IR).

The results of IR measurement revealed that the peak assigned to carboxylic acid of 1,693 cm$^{-1}$ reduced and a new peak assigned to an amide group of 1,670 cm$^{-1}$ appeared. The resultant PHA was found to be a PHA containing a unit represented by chemical formula (7B).

From the results of $^1$H-NMR, the resultant PHA was found to be a polyhydroxyalkanoate copolymer containing a 1-naphthylamine-8-sulfonic acid group because a peak assigned to a naphthyl group was shifted.

The resultant PHA was found to be a PHA containing a unit represented by the chemical formula (8B). The resultant PHA was evaluated for average molecular weight by gel permeation chromatography (GPC; Tosoh HLC-8020, column; Polymer Labolatories PLgel 5µ MIXED-C, solvent; DMF/LiBr 0.1% (w/v), in polystyrene equivalent). As a result, the number average molecular weight (Mn) was 29,000, and the weight average molecular weight (Mw) was 40,000.

Example A-13

After 1.00 g of the PHA obtained in Example A-12 was added to a 300-ml eggplant flask, the PHA was dissolved by adding 70 ml of chloroform and 17 ml of methanol and the mixture was cooled to 0° C. Then, 27 ml of a trimethylsilyl-diazomethane-hexane solution (2 mol/L, manufactured by Aldrich Co., Ltd.) was added to the flask, and the mixture was agitated for 4 hours. After completion of reaction, the solvent was distilled off with an evaporator, and a polymer was recovered.

Moreover, chloroform and methanol were added to the flask to dissolve the polymer again. Then, the solvent was distilled off with an evaporator. This procedure was repeated three times.

The polymer recovered here was dried under reduced pressure, to thereby obtain 0.87 g of the PHA.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature). From the results of the $^1$H-NMR, the resultant PHA was found to be a polyhydroxyalkanoate copolymer containing a methyl 1-naphthylamine-8-sulfonate group because peaks assigned to methyl sulfonate were found at 3-4 ppm.

Also, it was revealed that sulfonic acid was changed to methyl sulfonate because a peak assigned to sulfonic acid was not found by an acid value titration by using a potentiometric titrator (AT-510, manufactured by Kyoto Electronics Manufacturing, Co., Ltd.).

The resultant PHA was evaluated for average molecular weight by gel permeation chromatography (GPC; Tosoh HLC-8020, column; Polymer Labolatories PLgel 5μ MIXED-C, solvent; DMF/LiBr 0.1% (w/v), in polystyrene equivalent). As a result, the number average molecular weight (Mn) was 29,000, and the weight average molecular weight (Mw) was 43,000.

Example A-14

First, 10.0 g of 2-amino-1-naphthalenesulfonic acid (manufactured by Tokyo Kasei Kogyo Co., Ltd.) was added to a 2 L eggplant flask. Then, the compound was dissolved by adding 1,400 ml of chloroform and 460 ml of methanol, and the mixture was cooled to 0° C. Subsequently, 113 ml of a trimethylsilyldiazomethane-hexane solution (2 mol/L, manufactured by Aldrich Co., Ltd.). was added to the flask, and the mixture was agitated for 2 hours. After completion of reaction, the resultant mixture was filtered, and crystals precipitated during the reaction were removed, to thereby recover the filtrate containing the target product: methyl 2-amino-1-naphthalenesulfonate. The solvent in the solution containing methyl 2-amino-1-naphthalenesulfonate was distilled off with the evaporator, and a crude product was recovered.

The crude product thus obtained was purified by silica gel column chromatography, to thereby obtain 2.45 g of methyl 2-amino-1-napthalenesulfonate.

An analysis for specifying the structure of the resultant compound was carried out by $^1$H-NMR (FT-NMR: Bruker DPX 400; resonance frequency: 400 MHz; measuring nuclide: $^1$H; used solvent: deuterated DMSO; measuring temperature: room temperature). From the results, the resultant compound was found to be methyl 2-amino-1-naphthalenesulfonate.

Next, under a nitrogen atmosphere, 1.50 g of the polymer obtained in Referential Example A and 695 mg of methyl 2-amino-1-naphthalenesulfonate obtained above were placed in a 100-ml three-neck-flask, and 56 ml of pyridine was added to the flask. After agitating the mixture, 1.5 ml of triphenyl phosphite was added to the flask, and the mixture was heated at 100° C. for 6 hours. After completion of reaction, reprecipitation was carried out with ethanol, and the reprecipitate was recovered. The resultant polymer was washed by agitating in pure water for 2 hours, and the polymer was recovered by filtration. After the filtrate was dried under reduced pressure, the dried product was dissolved in 150 ml of THF. Then, the mixture was mixed with 150 ml of 1N hydrochloric acid and agitated. After 14 hours, THF in the mixed solution was distilled off with an evaporator, and the polymer in the solution was then recovered.

An analysis for specifying the structure of the resultant polymer was carried out by $^1$H-NMR (FT-NMR: Bruker DPX 400; resonance frequency: 400 MHz; measuring nuclide: $^1$H; used solvent: deuterated DMSO; measuring temperature: room temperature) and Fourier transform-infrared absorption (FT-IR) spectrum (Nicolet AVATAR 360 FT-IR).

The results of IR measurement revealed that the peak assigned to carboxylic acid of 1,693 cm$^{-1}$ reduced and a new peak assigned to an amide group of 1,670 cm$^{-1}$ appeared.

From the results of $^1$H-NMR, the resultant PHA was found to be a PHA containing a unit represented by chemical formula (BA) and a PHA copolymer containing a 6 mol % of methyl 2-amino-1-naphthalenesulfonate group because a peak assigned to a naphthyl group was shifted.

The resultant PHA was evaluated for average molecular weight by gel permeation chromatography (GPC; Tosoh HLC-8020, column; Polymer Labolatories PLgel 5μ MIXED-C, solvent; DMF/LiBr 0.1% (w/v), in polystyrene equivalent). As a result, the number average molecular weight (Mn) was 33,000, and the weight average molecular weight (Mw) was 43,000.

Referential Example B 20 shaking flasks (volume: 500 mL) were prepared, 0.5 wt % of polypeptone (Wako Pure Chemical Industries, Ltd.), 6 mmol/L of 5-phenoxy valeric acid, and 3.75 mmol/L of 10-undecenoic acid were dissolved in 200 mL of the aforementioned M9 medium, and the mixture was then placed in each of the 500-mL shaking flasks. The flasks were sterilized in an autoclave and cooled to room temperature. The culture solution (2 mL), in which Pseudomonas cichorii YN2 strain had been previously cultured with shaking in the M9 medium containing 0.5% of polypeptone for 8 hours, was added to the resultant medium, followed by culture at 30° C. for 64 hours. After completion of culture, each culture solution was centrifuged together to collect the cells. The cells were washed with methanol and dried. After the weight of the dried cells was measured, chloroform was added thereto. Then, the mixture was agitated at 35° C. for 72 hours, to thereby extract a polymer. Chloroform in which the polymer was extracted was filtered by using a membrane filter (0.45 μm), and the filtrate was then concentrated with an evaporator, followed by reprecipitation in cold methanol, to thereby recover the polymer. Then, the polymer was dried under reduced pressure to obtain the target polymer.

The weight of the freeze-dried cells (the dry weight of the cells) was measured as the obtained polymer. In this example, 1,528 mg of PHA (dry weight) was obtained.

The resultant PHA was evaluated for average molecular weight by gel permeation chromatography (GPC; Tosoh HLC-8220, column; Tosoh TSK-GEL Super HM-H, solvent; chloroform, in polystyrene equivalent). As a result, the number average molecular weight (Mn) was 104,000, and the weight average molecular weight (Mw) was 231,000.

Further, for specifying the structure of the resultant PHA, an NMR analysis was carried out under the following conditions.

<Measuring Apparatus>
FT-NMR: Bruker DPX400
Resonance frequency: $^1$H=400 MHz

<Measuring Condition>
Measuring nuclide: $^1$H
Used solvent: TMS/CDCl$_3$
Measuring temperature: room temperature From the results, the resultant PHA was found to be a PHA copolymer containing 3-hydroxy-5-phenoxyvaleric acid (A unit), 3-hydroxy-10-undecenoic acid (B unit), 3-hydroxy-8-nonenoic acid (C unit), and 3-hydroxy-6-heptenoic acid (D unit) represented by the following chemical formula (37) as monomer units.

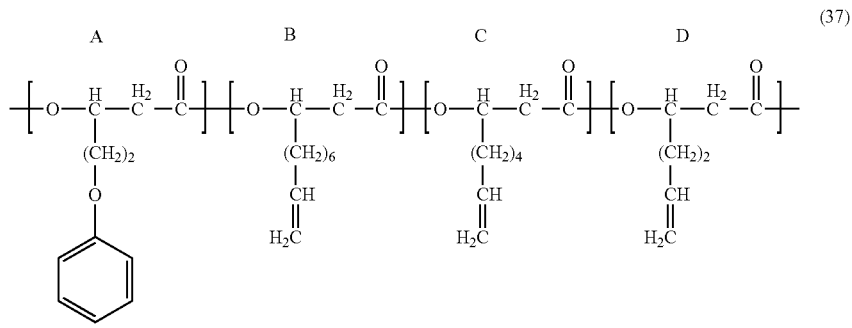

(37)

In addition, the percentage of the units was confirmed by $^1$H-NMR spectrum. From the results, it was found that 3-hydroxy-5-phenoxyvaleric acid (A unit) was 69 mol %, the total of three units of 3-hydroxy-10-undecenoic acid, 3-hydroxy-8-nonenic acid, and 3-hydroxy-6-heptenoic acid (B+C+D) was 23 mol %, and other compounds (straight-chain 3-hydroxyalkanoic acid having 4 to 12 carbon atoms and 3-hydroxyalka-5-enoic acid having 10 or 12 carbon atoms) were 8 mol %.

From the results, the PHA was found to be a PHA containing a 3-hydroxy-ω-alkenoate unit represented by the chemical formula (24).

The polyhydroxyalkanoate obtained here was used in the following reaction.

After 303 mg of the PHA was added to a 200-mL eggplant flask, the PHA was dissolved by adding 20 mL of dichloromethane. The flask was placed in an ice bath, 3 mL of acetic acid and 300 mg of 18-crown-6-ether were added thereto, and the resultant mixture was agitated. Subsequently, 241 mg of potassium permanganate was slowly added to the flask in the ice bath, the mixture was agitated at room temperature for 20 hours. After completion of reaction, 50 mL of water and sodium bisulfite were added to the flask. Then, the mixture was adjusted to pH 1 with 1.0 mol/L (1.0 N) of hydrochloric acid. After dichloromethane in the mixed solution was distilled off with an evaporator, a polymer in the solution was recovered. The polymer was washed with 100 mL of methanol and was further washed with 100 mL of pure water three times, followed by recovering the polymer. The polymer was dried under reduced pressure, to thereby obtain 247 mg of the target PHA.

The resultant PHA was evaluated for average molecular weight by gel permeation chromatography (GPC; Tosoh HLC-8220, column; Tosoh TSK-GEL Super HM-H, solvent; chloroform, in polystyrene equivalent). As a result, the number average molecular weight (Mn) was 29,400, and the weight average molecular weight (Mw) was 102,800.

For specifying the structure of the resultant PHA, an NMR analysis was carried out under the aforementioned conditions.

From the results, the PHA was found to be a PHA copolymer containing 3-hydroxy-5-phenoxyvaleric acid represented by the following chemical formula (38), 3-hydroxy-9-carboxynonanoic acid represented by the chemical formula (34), 3-hydroxy-7-carboxyheptanoic acid represented by the chemical formula (35), and 3-hydroxy-5-carboxyvaleric acid represented by the chemical formula (36) as monomer units.

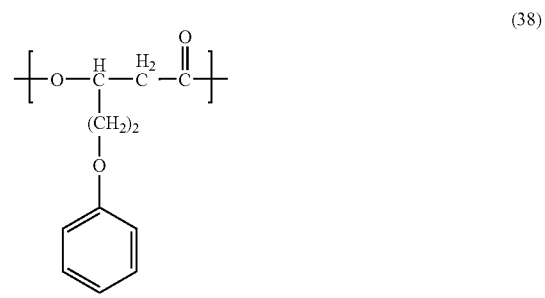

(38)

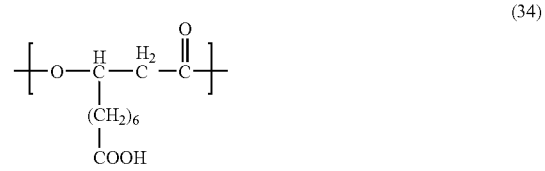

(34)

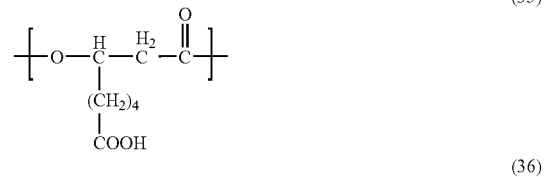

(35)

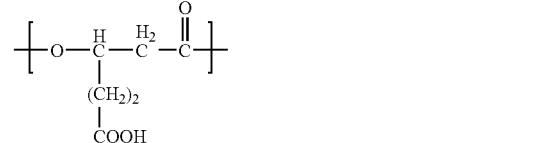

(36)

Moreover, a carboxyl group in the terminus of the side chain of the PHA was methyl-esterified with trimethylsilyldiazomethane for determining the percentage of each unit of the resultant PHA.

After 50 mg of the target PHA was added to a 100-mL eggplant flask, the PHA was dissolved by adding 3.5 mL of chloroform and 0.7 mL of methanol. Then, 2 mL of trimethylsilyldiazomethane-hexane solution (0.63 mol/L, Tokyo Kasei Kogyo Co., Ltd.) was added to the flask, and the mixture was agitated at room temperature for 30 minutes. After completion of reaction, the solvent was distilled off with an evaporator, and the polymer was then recovered. After the resultant polymer was washed with 50 mL of methanol, the polymer was recovered. The polymer was dried under reduced pressure to obtain 49 mg of a PHA.

An NMR analysis was carried out for determining the percentage of each unit in a manner similar to the above method. From the results, it was found that 3-hydroxy-5-phenoxyvaleric acid was 83 mol %, the total of three units of 3-hydroxy-9-carboxynonanoic acid, 3-hydroxy-7-carboxyheptanoic acid, and 3-hydroxy-5-carboxyvaleric acid was 8 mol %, and other compounds (straight-chain 3-hydroxyalkanoic acid having 4 to 12 carbon atoms and 3-hydroxyalka-5-enoic acid having 10 or 12 carbon atoms) were 9 mol %.

Example B-1

To a 50-ml flask, 28.0 mg of p-toluidine-2-sulfonic acid and 16 ml of dichloromethane were added, and the mixture was agitated with ice-cooling for 1 hour. Subsequently, 18.2 mg of 1-hydroxybenzotriazole (HOBt), 9 ml of a solution of 150 mg of polymer containing 8 mol % of a 3-hydroxy-ω-carboxyalkanoate unit obtained in Referential Example B in dichloromethane, and 9 ml of a solution of 27.8 mg of dicyclocarbodiimide (DCC) in dichloromethane were sequentially added. Then, the mixture was agitated at 0° C. for 1 hour and at room temperature for 24 hours. After completion of reaction, insoluble products were removed, and the solvent of the reaction mixture was distilled off. The resultant polymer was dissolved again in dichloromethane, followed by reprecipitation in ethanol. After that, washing was performed with ethanol and water to recover a polymer. The polymer was dried under reduced pressure, to thereby obtain 99 mg of a PHA.

Figure 9:
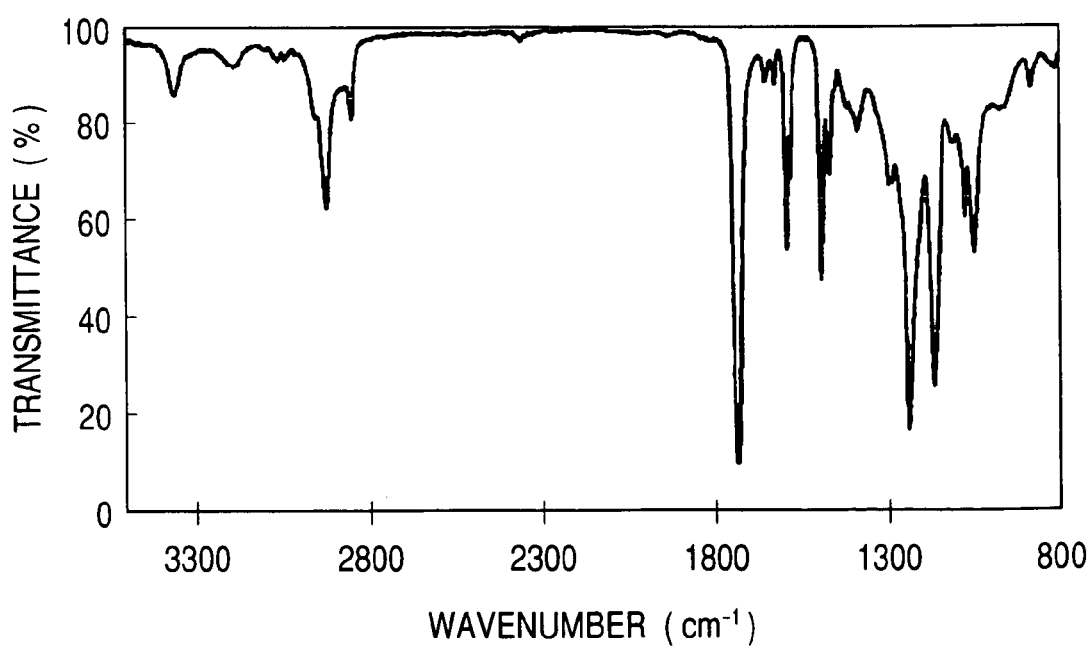
FIG. 9 is a diagram showing an FT-IR spectrum of a polymer obtained in Example B-1.

FT-IR revealed that an amide bond was formed because peaks assigned to an amide group of 1,657 cm$^{-1}$ and 1,631 cm$^{-1}$ were newly found. FIG. 9 shows an FT-IR spectrum of the resultant polymer.

The resultant PHA was analyzed in a manner similar to Example A-1. Regarding the average molecular weight, the number average molecular weight (Mn) of the PHA was 33,300. Moreover, from the results of determination of sulfur quantity, the resultant PHA was found to be a PHA copolymer containing 3.8 mol % of a p-toluidine-2-sulfonic acid group.

By conducting the preparation method of the resultant polymer in large scale, 50 g of the PHA copolymer was obtained and the compound was provided as Exemplary Compound B-1 and subjected to toner preparation and evaluation thereof.

Example B-2

The procedure of Example B-1 was repeated except that 21.3 mg of 2-aminobenzenesulfonic acid was used instead of 22.9 mg of p-toluidine-2-sulfonic acid used in Example B-1, to thereby obtain 74 mg of a polymer.

FT-IR revealed that an amide bond was formed because the peaks assigned to carboxylic acid reduced and a new peak assigned to an amide group appeared as shown in FIG. 9. The resultant PHA was confirmed to be a PHA containing a unit represented by the chemical formula (7A).

The resultant PHA was analyzed in a manner similar to Example A-1. Regarding the average molecular weight, the number average molecular weight (Mn) of the PHA was 34,600. Moreover, from the results of determination of sulfur quantity, the resultant PHA was found to be a PHA copolymer containing 3.6 mol % of a 2-aminobenzenesulfonic acid group.

By conducting the preparation method of the resultant polymer in large scale, 50 g of the PHA copolymer was obtained and the compound was provided as Exemplary Compound B-2 and subjected to toner preparation and evaluation thereof.

Referential Example C

The culture procedure and extraction procedure in Referential Example A were repeated except that 6 mmol/L of 5-phenylvaleric acid and 2 mmol/L of 10-undecenoic acid used in Referential Example A were replaced with 4.8 mmol/L of 5-(phenylsulfanyl)valeric acid and 2 mmol/L of 10-undecenoic acid, to thereby obtain 1,934 mg of a PHA (dry weight). The resultant PHA was evaluated for average molecular weight in a manner similar to Example A. As a result, the number average molecular weight (Mn) was 430,000, and the weight average molecular weight (Mw) was 1,500,000. Further, for specifying the structure of the resultant PHA, an NMR analysis was carried out under the same conditions as those in Example A.

From the results, the resultant PHA was found to be a PHA copolymer containing 3-hydroxy-5-(phenylsulfanyl) valeric acid ($A_1$ unit), 3-hydroxy-10-undecenoic acid ($B_1$ unit), 3-hydroxy-8-nonenoic acid ($C_1$ unit), and 3-hydroxy-6-heptenoic acid ($D_1$ unit) represented by the following chemical formula (39) as monomer units.

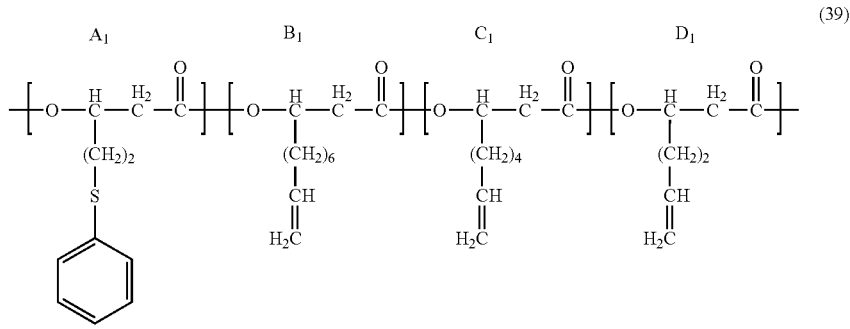

(39)

In addition, the percentage of the units was confirmed by $^1$H-NMR spectrum. From the results, it was found that the $A_1$ unit was 78 mol %, the total of three units. ($B_1$ unit+$C_1$ unit+$D_1$ unit) was 19 mol %, and other compounds (straight-chain 3-hydroxyalkanoic acid having 4 to 12 carbon atoms and 3-hydroxyalka-5-enoic acid having 10 or 12 carbon atoms) were 3 mol %.

302 mg of the obtained polyhydroxyalkanoate was added to a 200-mL eggplant flask, and the PHA was dissolved by adding 20 mL of dichloromethane. The mixture was placed in an ice bath, 3 mL of acetic acid and 1,154 mg of 18-crown-6-ether were added thereto, and the resultant mixture was agitated. Subsequently, 917 mg of potassium permanganate was added slowly thereto in the ice bath, the mixture was agitated at room temperature for 19 hours. After completion of reaction, 50 mL of water and 3,010 mg of sodium bisulfite were added to the flask. Then, the mixture was adjusted to pH 1 with 1.0 N of hydrochloric acid. After dichloromethane in the mixed solution was distilled off using an evaporator, a polymer in the solution was recovered. The polymer was washed with 100 mL of methanol and was further washed with 100 mL of pure water three times, followed by recovering the polymer. The resulting polymer was dried under reduced pressure, to thereby obtain 311 mg of the target PHA.

The resultant PHA was evaluated for average molecular weight in a manner similar to Referential Example A. As a result, the number average molecular weight (Mn) was 62,000, and the weight average molecular weight (Mw) was 260,000.

For specifying the structure of the resultant PHA, an NMR analysis was carried out under the same conditions as those in Referential Example A.

From the results, the PHA was found to be a polyhydroxyalkanoate copolymer containing 3-hydroxy-5-(phenylsulfonyl)valeric acid, 3-hydroxy-9-carboxynonanoic acid, 3-hydroxy-7-carboxyheptanoic acid, and 3-hydroxy-5-carboxyvaleric acid represented by the following chemical formula (40) as monomer units.

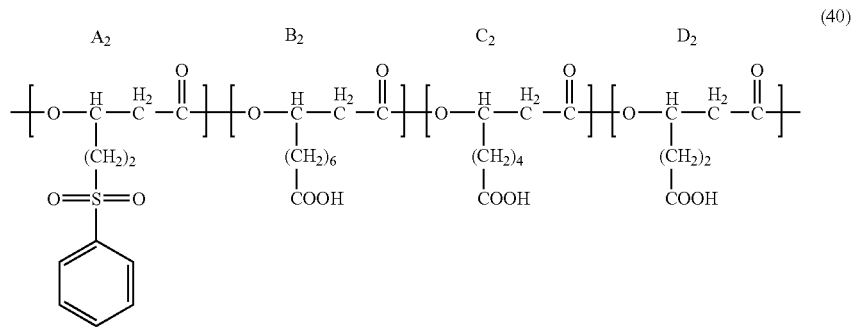

(40)

Moreover, a carboxyl group in the terminus of the side chain of the PHA was methyl-esterified with trimethylsilyldiazomethane for calculating the percentage of the unit of the resultant PHA. After 30 mg of the target PHA was added to a 100-mL eggplant flask, the PHA was dissolved by adding 2.1 mL of chloroform and 0.7 mL of methanol. Then, 0.5 mL of trimethylsilyldiazomethane-hexane solution (2.0 mol/L, Aldrich Co., Ltd.) was added to the flask, and the mixture was agitated at room temperature for 30 minutes. After completion of reaction, the solution was distilled off with an evaporator, and the polymer was then recovered. After the resultant polymer was washed with 50 mL of methanol, the polymer was recovered. The polymer was dried under reduced pressure, to thereby obtain 31 mg of the PHA.

An NMR analysis was carried out for determining the percentage of each unit in a manner similar to the above method. From the results of $^1$H-NMR spectrum, it was found that 3-hydroxy-5-(phenylsulfony)valeric acid was 89 mol %, the total of three units of 3-hydroxy-9-carboxynonanoic acid, 3-hydroxy-7-heptanoic acid, and 3-hydroxy-5-valeric acid was 8 mol %, and the total of other compounds (straight-chain 3-hydroxyalkanoic acid having 4 to 12 carbon atoms and 3-hydroxyalka-5-enoic acid having 10 or 12 carbon atoms) was 3 mol %.

Example C-1

The procedure of Example C-1 was repeated except that the PHA in Referential Example C was used instead of the PHA in Referential Example A used in Example A-1 and 15.3 mg of 2-aminoethanesulfonic acid (taurine) was used instead of 22.9 mg of p-toluidine-2-sulfonic acid, to thereby obtain 80 mg of a polymer.

FT-IR revealed that an amide bond was formed because the peaks assigned to carboxylic acid reduced and a new peak assigned to an amide group appeared as shown in FIG. 8. The resultant PHA was found to be a PHA containing a unit represented by the chemical formula (2).

The resultant PHA was analyzed in a manner similar to Example A-1. Regarding the average molecular weight, the number average molecular weight (Mn) of the PHA was 27,800.

Next, various toners were produced using a compound produced by a method selected from the methods of the present invention, as a charge control agent, and were evaluated.

Example 1

First, to a 2-liter four-necked flask provided with a high-speed agitating device T.K. Homo Mixer, an $Na_3PO_3$ aqueous solution was added, and heated to 60° C. while adjusting the agitator speed to 10,000 rpm. A $CaCl_2$ aqueous solution was gradually added to the above solution to prepare an aqueous dispersion medium containing a minute water insoluble dispersant $Ca_3(PO_4)_2$.

On the other hand, after dispersing the following compositions for 3 hours using a ball mill, 10 parts by mass of a releasing agent (ester wax) and 10 parts by mass of 2,2'-azobis(2,4-dimethylvaleronitrile), which is a polymerization initiator, were added to prepare a polymerizable monomer composition.

| | |
|---|---|
| Styrene | 82 parts by mass |
| Ethylhexyl acrylate | 18 parts by mass |
| Divinylbenzene | 0.1 parts by mass |
| Cyan colorant (C.I. Pigment Blue 15) | 6 parts by mass |
| Polyethylene oxide resin (Mw = 3200, acid number = 8) | 5 parts by mass |
| Exemplary compound (A-1) | 2 parts by mass |

Next, the monomer composition thus obtained was added to the water dispersion medium prepared in advance. The resulting mixture was agitated at 10,000 rpm to granulate the monomer composition. Thereafter, polymerization was performed 80° C. for 6 hours after reaction at 65° C. for 3 hours while agitating the granules by using a paddle-type agitating vane. After completion of the polymerization reaction, the reaction product was cooled, added acid to dissolve water insoluble dispersant $Ca_3(PO_4)_2$, filtered, washed with water and dried to produce blue polymer particles (1). Measurement of the particle size of the obtained blue polymer particles (1) by using Coulter Counter Multisizer (available from Beckman Coulter K.K.) revealed that the particles had a weight average particle size of 7.2 μm. Also, it showed that they had a fine powder amount (the proportion of particles having 3.17 μm or less in number distribution) of 4.9% by number.

1.3 parts by mass of hydrophobic silica fine powders (BET=270 $m^2/g$) treated with hexamethyldisilazane as a flow improver was added to 100 parts by mass of the thus-prepared blue polymer particles (1), followed by mixing by a dry-mixing process with a Henschel mixer, resulting in a blue toner (1) of Example 1. Furthermore, 7 parts by mass of the resulting blue toner (1) was mixed with 93 parts by mass of a resin-coated magnetic ferrite carrier (average particle size: 45 μm) to prepare a two-component blue developer (1) for magnetic brush development.

Examples 2 to 4

The procedure of Example 1 was repeated except that Exemplary Compounds A-4, A-8, and B-1 were used in place of Exemplary Compound A-1, to thereby obtain blue toners (2) to (4) of Examples 2 to 4. The characteristics of the toners were measured in the same manner as in Example 1, and the results obtained are shown in Table 1. Using the toners, two-component blue developers (2) to (4) of Examples 2 to 4 were obtained in the same manner as in Example 1.

Comparative Example 1

The procedure of Example 1 was repeated except that Exemplary Compounds were not used, to thereby blue toner (5) of Comparative Example 1. The characteristics of the toner were measured in the same manner as in Example 1, and the results obtained are shown in Table 1. Using the toner, a two-component blue developer (5) of Comparative Example 1 was obtained in the same manner as in Example 1.

<Evaluation>

For the two-component blue developers (1) to (4) obtained in Example 1 and the two-component blue developer (5) obtained in Comparative Example 1, toner charge amounts after 10-second and 300-second agitation were measured according to the measurement method of charge amount as described above under a normal temperature and normal humidity environment (25° C. 60% RH) and a high temperature and high humidity environment (30° C. 80% RH). The measured values of a two-component blow-off charge amount were rounded off to the first decimal place, and the chargeability was evaluated based on the following criteria. Table 1 collectively shows the results obtained.

[Chargeability]
◎: Very good (−20 μC/g or less)
o: Good (−19.9 to −10.0 μC/g)
Δ: Practicable (−9.9 to −5.0 μC/g)
x: Unpracticable (−4.9 μC/g or more)

Examples 5 to 8

The procedure of Example 1 was repeated except that 2.0 parts by mass of Exemplary Compounds A-1, A-4, A-8, and B-1 were used and that a yellow colorant (Hansa yellow G) was used in place of the cyan colorant, to thereby obtain yellow toners (1) to (4) of Examples 5 to 8. The characteristics of the toners were measured in the same manner as in Example 1, and the results obtained are shown in Table 1. Using the toners, two-component yellow developers (1) to (4) were obtained in the same manner as in Example 1.

Comparative Example 2

The procedure of Example 1 was repeated except that Exemplary Compounds were not used and that a yellow colorant (Hansa yellow G) was used in place of the cyan colorant, to thereby obtain yellow toner (5) of Comparative Example 2. The characteristics of the toner were measured in the same manner as in Example 1, and the results obtained are shown in Table 1. Using the toner, a two-component yellow developer (5) of Comparative Example 2 was obtained in the same manner as in Example 1.

<Evaluation>

For the two-component yellow developers (1) to (4) obtained in Examples 5 to 8 and the two-component yellow developer (5) obtained in Comparative Example 2, toner charge amounts after 10-second or 300-second agitation were measured according to the measurement method for charge amount as described above under a normal temperature and normal humidity environment (25° C. 60% RH) and a high temperature and high humidity environment (30° C. 80% RH). The measured values of a two-component blow-off charge amount were rounded off to the first decimal place and the chargeability was evaluated based on the same criteria as in Examples 1 to 4. Table 1 collectively shows the results thereof.

Examples 9 to 12

The procedure of Example 1 was repeated except that 2.0 parts by mass of Exemplary Compounds A-2, A-3, A-5, and B-2 were used and that a carbon black (DBP oil absorption: 110 ml/100 g) was used in place of the cyan colorant, to thereby obtain black toners (1) to (4) in Examples 9 to 12. The characteristics of the toners were measured in the same manner as in Example 1 and the results obtained are shown in Table 1. Using the toners, two-component black developers (1) to (4) were obtained in the same manner as in Example 1.

Comparative Example 3

The procedure of Example 1 was repeated except that Exemplary Compounds were not used and that carbon black (DBP oil absorption: 110 mL/100 g) was used in place of the cyan colorant, to thereby obtain black toner (5) of Comparative Example 3. The characteristics of the toner were measured in the same manner as in Example 1, and the results obtained are shown in Table 1. Using the toner, a two-component black developer (5) of Comparative Example 3 was obtained in the same manner as in Example 1.

<Evaluation>

For the two-component black developers (1) to (4) obtained in Examples 9 to 12 and the two-component black developer (5) obtained in Comparative Example 3, toner charge amounts after 10-second or 300-second agitation were measured according to the measurement method for charge amount as described above under a normal temperature and normal humidity environment (25° C., 60% RH) and a high temperature and high humidity environment (30° C. 80% RH). The measured values of a two-component blow-off charge amount were rounded off to the first decimal place and the charge amounts were evaluated based on the same criteria as in Examples 8 to 14. Table 1 collectively shows the results obtained.

Example 13

| | |
|---|---|
| Styrene-butyl acrylate copolymer resin (glass transition temperature of 70° C.) | 100 parts by mass |
| Magenta pigment (C.I. Pigment Red 114) | 5 parts by mass |
| Exemplary Compound A-2 | 2 parts by mass |

The above components were mixed and then molten and kneaded with a biaxial extruder (L/D=30). The resulting kneaded product was cooled. Then, the kneaded product was roughly pulverized with a hammer mill and then finely pulverized with a jet mill, followed by being classified. Consequently, magenta coloring particles (1) were obtained by the pulverization. It was found that the particle size of the magenta coloring particles (1) was 7.6 μm in weight average particle size, and the number of fine particles was 5.2% by number.

1.5 parts by mass of a hydrophobic silica fine powder (BET=250 m²/g) treated with hexamethyldisilazane as a flow improver was mixed with 100 parts by mass of the magenta coloring particles (1) by a dry-mixing process with a Henschel mixer, resulting in a magenta (red) toner (1) of this example. Furthermore, 7 parts by mass of the resulting magenta toner (1) was mixed with 93 parts by mass of a resin-coated magnetic ferrite carrier (average particle size: 45 μm) to prepare a two-component magenta (red) developer (1) for magnetic brush development.

Examples 14 to 16

The procedure of Example 13 was repeated except that Exemplary Compounds A-3, A-5, and B-2 were used in place of Exemplary Compound A-2, to thereby obtain magenta (red) toners (2) to (4) of Examples 14 to 16. The characteristics of the toners were measured in the same manner as in Example 1, and the results obtained are shown in Table 1. Using the toners, two-component magenta (red) developers (2) to (4) of Examples 14 to 16 were obtained in the same manner as in Example 13.

Comparative Example 4

The procedure of Example 13 was repeated except that Exemplary Compounds were not used, to thereby obtain magenta (red) toner (5) of Comparative Example 4. The characteristics of the toner were measured in the same manner as in Example 1, and the results obtained are shown in Table 1. Using the toner, a two-component magenta (red) developer (5) of Comparative Example 4 was obtained in the same manner as in Example 13.

<Evaluation>

For the two-component magenta (red) developers (1) to (4) obtained in Examples 13 to 16 and the two-component magenta (red) developer (5) obtained in Comparative Example 4, toner charge amounts-after 10-second and 300-second agitation were measured according to the measurement method of charge amount as described above under a normal temperature and normal humidity environment (25° C. 60% RH) and a high temperature and high humidity environment (30° C. 80% RH). The measured values of a two-component blow-off charge amount were rounded off to the first decimal place, and the chargeability was evaluated based on the following criteria. Table 1 collectively shows the results obtained.

[Chargeability]
◎: Very good (−20 μC/g or less)
o: Good (−19.9 to −10.0 μC/g)
Δ: Practicable (−9.9 to −5.0 μC/g)
x: Not practicable (−4.9 μC/g or more)

Examples 17 to 20

The procedure of Example 13 was repeated except that 2.0 parts by mass of Exemplary Compounds A-1, A-4, A-8, and B-1 were used and that carbon black (DBP oil absorption: 110 mL/100 g) was used in place of the magenta pigment, to thereby obtain black toners (6) to (9) of Examples 17 to 20. The characteristics of the toners were measured in the same manner as in Example 1, and the results obtained are shown in Table 1. Using the toners, two-component black developers (6) to (9) were obtained in the same manner as in Example 13.

Comparative Example 5

The procedure of Example 13 was repeated except that Exemplary Compounds were not used and carbon black (DBP oil absorption: 110 mL/100 g) was used in place of the magenta pigment, to thereby obtain black toner (10) of Comparative Example 5. The characteristics of the toner were measured in the same manner as in Example 1, and the results obtained are shown in Table 1. Using the toner, a two-component black developer (10) of Comparative Example 5 was obtained in the same manner as in Example 13.

<Evaluation>

For the two-component black developers (6) to (9) obtained in Examples 17 to 20 and the two-component black developer (10) obtained in Comparative Example 5, toner charge amounts after 10-second and 300-second agitation were measured according to the measurement method of charge amount as described above under a normal temperature and normal humidity environment (25° C. 60% RH) and a high temperature and high humidity environment (30° C. 80% RH). The measured values of a two-component blow-off charge amount were rounded off to the first decimal place, and the chargeability was evaluated based on the same criteria as in Examples 13 to 16. Table 1 collectively shows the results obtained.

Example 21

| | |
|---|---|
| Polyester resin | 100 parts by mass |
| Carbon black (DBP absorption: 110 mL/100 g) | 5 parts by mass |
| Exemplary Compound (A-1) | 2 parts by mass |

A polyester resin was synthesized as follows. 751 parts of bisphenol A propylene oxide 2 mol adduct, 104 parts of terephthalic acid, and 167 parts of trimellitic anhydride were condensation-polymerized using 2 parts of dibutyltin oxide as a catalyst to obtain the polyester resin having a softening point of 125° C.

The above components were mixed and then molten and kneaded with a biaxial extruder (L/D=30). The resulting kneaded product was cooled. Then, the kneaded product was roughly pulverized with a hammer mill and then finely pulverized with a jet mill, followed by being classified. Consequently, black coloring particles (11) were obtained by the pulverization. It was found that the particle size of the black coloring particles (11) was 7.4 μm in weight average particle size, and the number of fine particles was 5.0% by number.

1.5 parts by mass of a hydrophobic silica fine powder (BET=250 m$^2$/g) treated with hexamethyldisilazane as a flow improver was mixed with 100 parts by mass of the black coloring particle (11) by a dry-mixing process with a Henschel mixer, resulting in a black toner (17) of this example. Furthermore, 7 parts by mass of the resulting black toner (17) was mixed with 93 parts by mass of a resin-coated magnetic ferrite carrier (average particle size: 44 μm) to prepare a two-component black developer (11) for magnetic brush development.

Examples 22 to 24

The procedure of Example 21 was repeated except that Exemplary Compounds A-4, A-8, and B-1 were used in place of Exemplary Compound A-1, to thereby obtain black toners (11) to (14) of Examples 22 to 24. The characteristics of the toners were measured in the same manner as in Example 1, and the results obtained are shown in Table 1. Using the toners, two-component black developers (11) to (14) of Examples 22 to 24 were obtained in the same manner as in Example 21.

Comparative Example 6

The procedure of Example 21 was repeated except that Exemplary Compounds were not used, to thereby obtain black toner (15) of Comparative Example 6. The characteristics of the toner were measured in the same manner as in Example 1, and the results obtained are shown in Table 1. Using the toner, a two-component black developer (15) of Comparative Example 6 was obtained in the same manner as in Example 21.

<Evaluation>

For the two-component black developers (11) to (14) obtained in Examples 21 to 24 and the two-component black developer (15) obtained in Comparative Example 6, toner charge amounts after 10-second or 300-second agitation were measured according to the measurement method for charge amount as described above under a normal temperature and normal humidity environment (25° C. 60% RH) and a high temperature and high humidity environment (30° C., 80% RH). The measured values of a two-component blow-off charge amount were rounded off to the first decimal place and evaluated based on the following criteria.

Table 1 collectively shows the results obtained.

[Chargeability]

⊚: Very good (−20 μC/g or less)

o: Good (−19.9 to −10.0 μC/g)

Δ: Practicable (−9.9 to −5.0 μC/g)

x: Unpracticable (−4.9 μC/g or more)

Examples 25 to 30 and Comparative Examples 7 to 12

In each of Examples 25 to 30 and Comparative Examples 7 to 12, a two-component developer prepared using one of the toners of Examples 1, 5, 9, 13, 17 and 21 and Comparative Examples 1 to 6 is used respectively. First, an image forming apparatus used in the image forming method of each of Examples 25 to 30 and Comparative Examples 7 to 12 is described. FIG. 1 is a schematic illustration showing the cross section of the image forming apparatus for carrying out the image forming method of the examples and the comparative examples of the present invention. A photosensitive drum 1 shown in FIG. 1 includes a photosensitive layer 1a having an organic photo-semiconductor on a substrate 1b and is constructed to be rotated in the direction of an arrow. In addition, the surface of the photosensitive drum 1 is charged at a surface potential of about −600 V by a charging roller 2 which is provided as a charging member facing the photosensitive drum 1 and rotating in contact with the photosensitive drum 1. As shown in FIG. 1, the charging roller 2 is constructed such that a conductive elastic layer 2a is applied on a core metal 2b.

Figure 2:
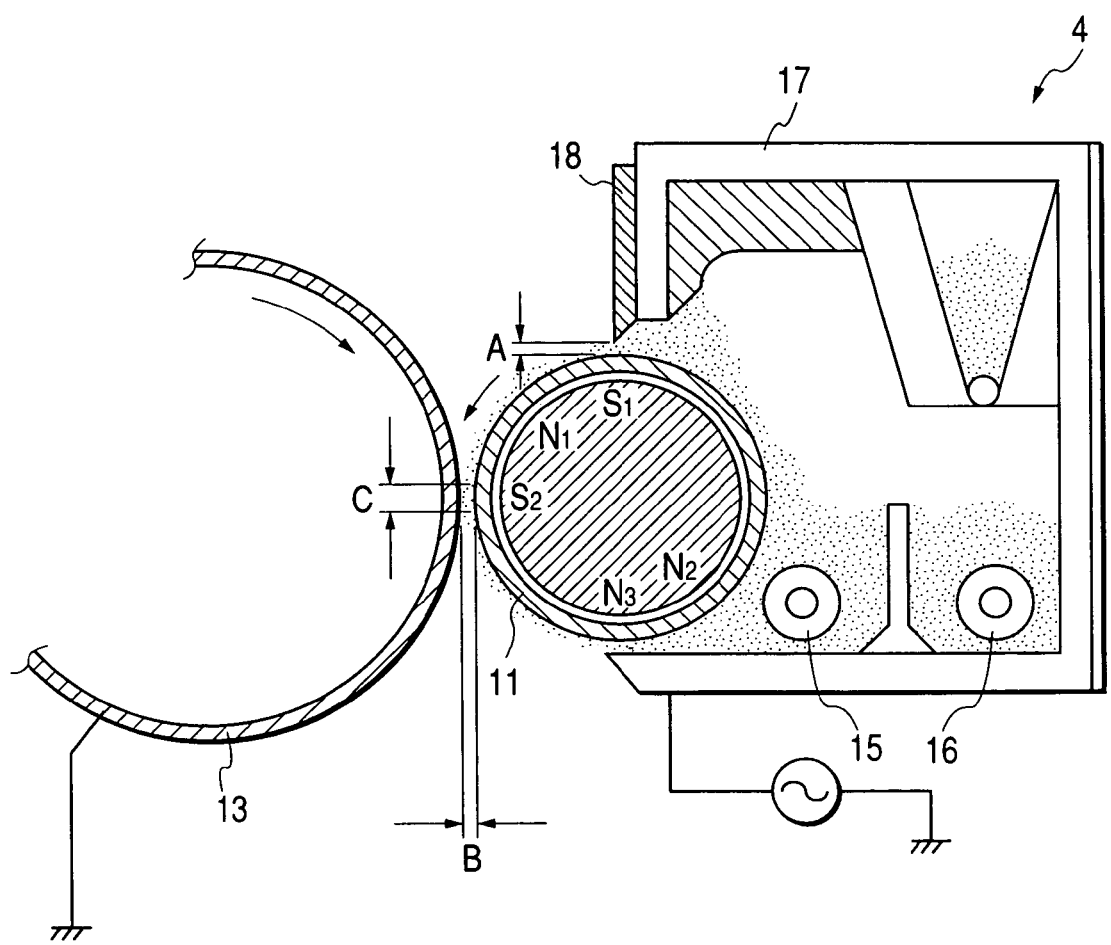
FIG. 2 is a sectional view of a main part of a developing device for a two-component developer used in Example 25 to Example 30 and Comparative Example 7 to Comparative Example 12.

Next, the exposure of light 3 is performed on the photosensitive drum 1 the surface of which is charged. At this time, an electrostatic charge image having an exposure potential of −100 V and a dark potential of −600 V can be formed by switching the exposure on and off on the photosensitive member by a polygon mirror according to digital image information. Subsequently, the electrostatic charge image on the photosensitive drum 1 is elicited by reverse development using a plurality of developing devices 4 (4-1, 4-2, 4-3, and 4-4), and a toner image is formed on the photosensitive drum 1. At this time, the toner image was formed with a yellow toner, a magenta toner, a cyan toner, or a black toner using the two-component developer obtained in each of Examples 4 to 21 and Comparative Examples 1 to 6 as a developer. FIG. 2 is an enlarged sectional view of the main portion of each developing device 4 for a two-component developer used at the time.

Next, the toner image of the photosensitive drum 1 is transferred to an intermediate transfer member 5. The photosensitive drum 1 and the intermediate transfer member 5 rotate together by being in contact with each other. As a result, a developed color image formed by overlapping four colors is formed on the intermediate transfer member 5. The transfer residual toner, remaining untransferred to the photosensitive drum 1, can be recovered by the cleaner member 8 in the residual-toner container 9.

The intermediate transfer member 5 is constructed by a core metal 5b provided as a supporting member and an elastic layer 5a laminated on the core metal 5b as shown in FIG. 1. Used in this example was a intermediate transfer member 5 obtained by coating a pipe-shaped core metal 5b with an elastic layer 5a in which carbon black was provided as a conductivity imparting material and was sufficiently dispersed in nitrile-butadiene rubber (NBR) The hardness of the elastic layer 5a measured based on "JIS K-6301" was 30 degrees and the volume resistivity was 10$^9$ Ω·cm. A transfer current required for an image transfer from the photosensitive drum 1 to the intermediate transfer member 5 was about 5 μA, which could be obtained by applying a voltage of +500 V to the core metal 5b from a power supply.

A developed color image formed by overlapping four colors on the intermediate transfer member 5 is transferred to a recording medium such as paper by a transfer roller 7, followed by fixing on the recording medium by a thermal fixing device H. The transfer roller 7 is constructed such that an elastic layer 7a is formed on a core metal 7b having an outer diameter of 10 mm. The elastic layer 7a is coated with a material having carbon as a conductivity imparting material which is sufficiently dispersed in a foam made of an ethylene-propylene-diene terpolymer (EPDM). The elastic layer 7a used was one having a volume resistivity of $10^6 \Omega \cdot cm$ and a hardness of 35 degrees measured based on "JIS K-6301". In addition, a voltage was applied on the transfer roller 7, allowing a transfer current of 15 µA to flow.

Figure 5:
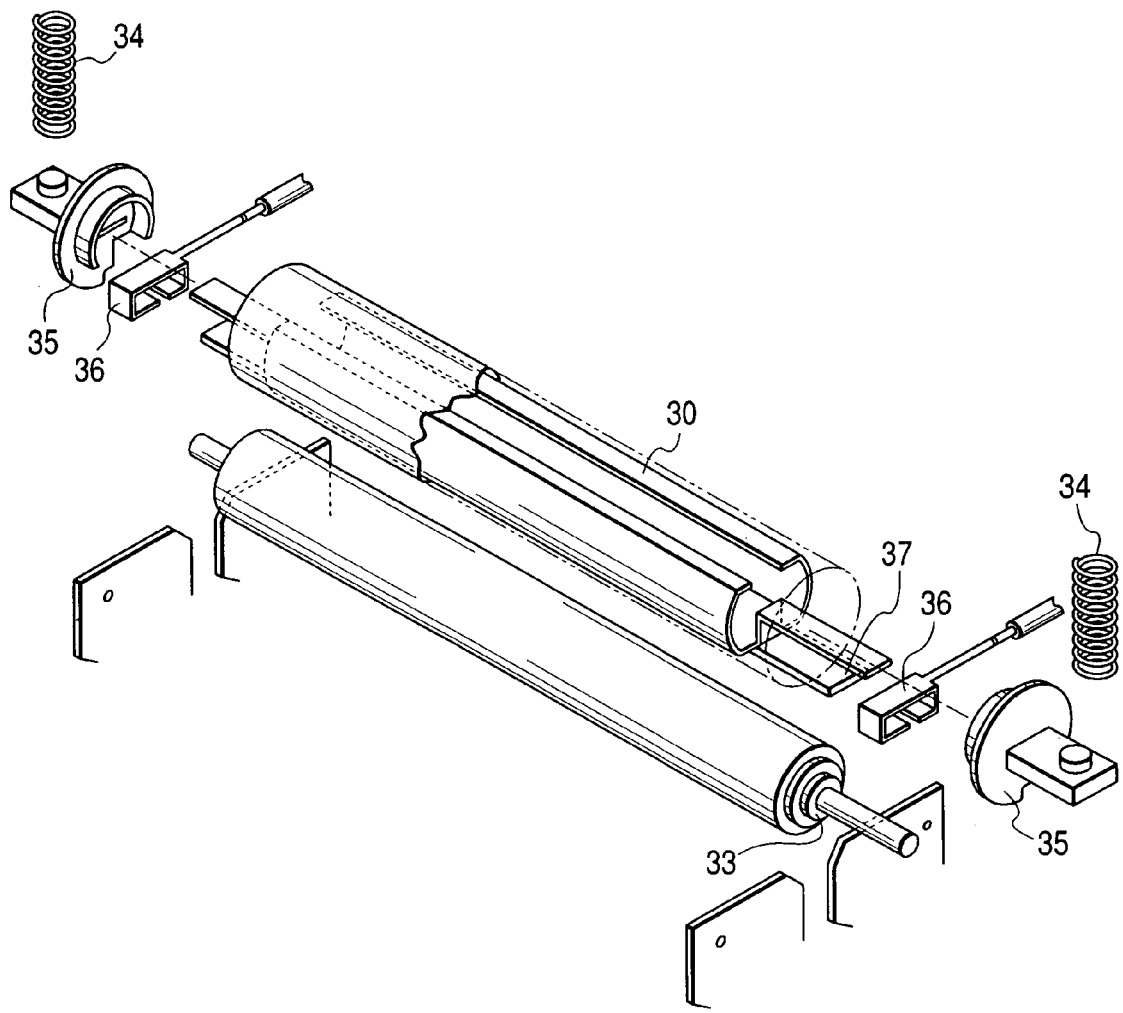
FIG. 5 is an exploded perspective view of a main part of a fixing device used in Examples of the present invention.
Figure 6:
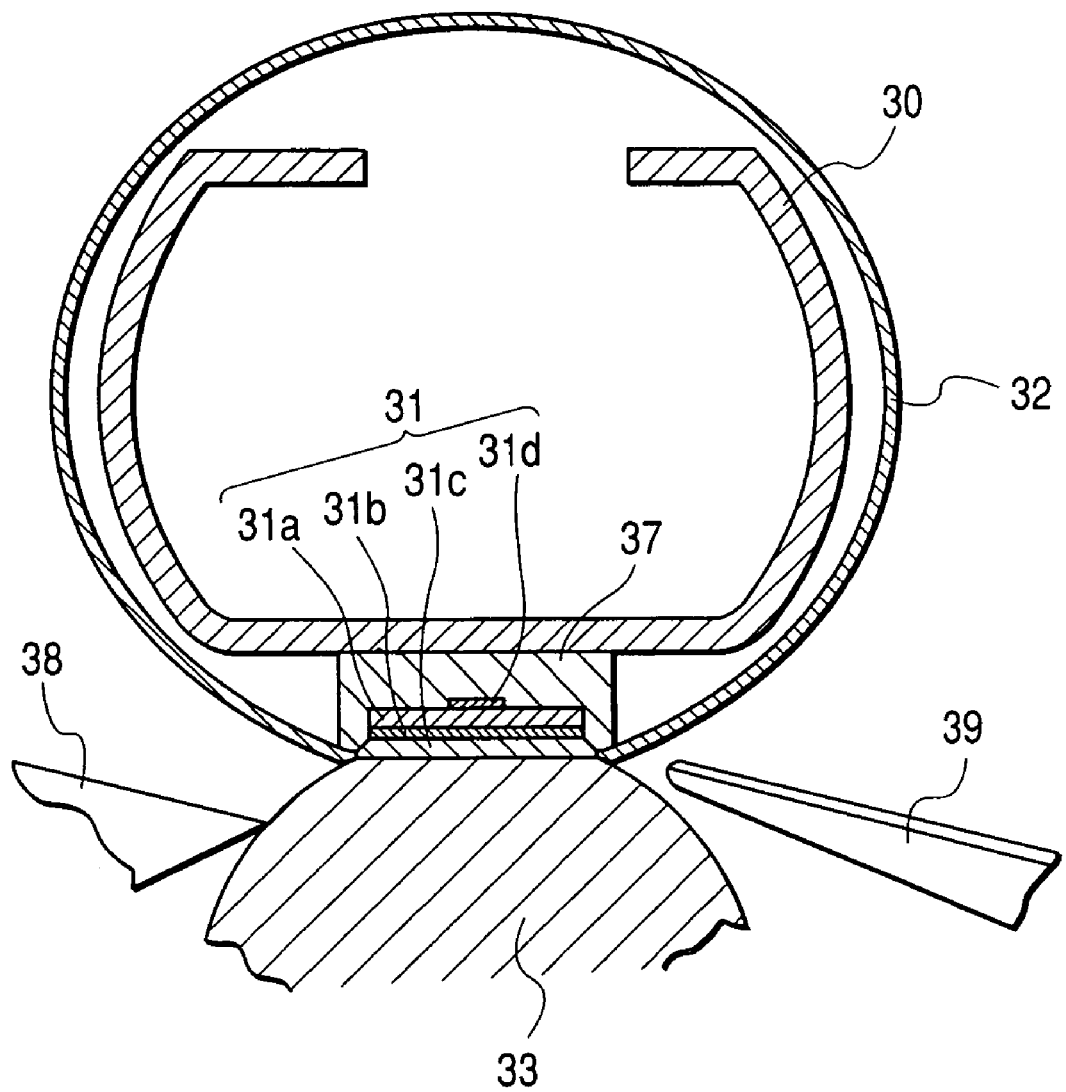
FIG. 6 is an enlarged sectional view of a main part showing a state of a film of a fixing device, not in operation, used in Examples of the present invention.

In the apparatus shown in FIG. 1, a thermal fixing device H used was a fixing device of a thermal roller-type as shown in FIGS. 5 and 6, without an oil-applying mechanism. In this case, the fixing device used was one having a surface layer made of a fluorine resin for each of an upper roller and a lower roller. In addition, the diameter of the roller was 60 mm. A fixing temperature at the time of fixing was set to 160° C. and a nip width was set to 7 mm. Furthermore, the transfer residual toner on the photosensitive drum 1, which was recovered by cleaning, was transferred to a developing machine by a reuse mechanism to be reused.

<Evaluation>

Under the above conditions, a print-out test was performed at a print-out speed of 8 sheets (A-4 size)/min. under a normal temperature and normal humidity environment (25° C. 60% RH) and a high temperature and high humidity environment (30° C. 80% RH). Using a two-component developer prepared using each of toners of Examples 1, 5, 9, 13, 17, and 21, and a two-component developer prepared using each of toners of Comparative Examples 1 to 6, a print-out test was performed in an intermittent mode (i.e., a mode of which the developing machine stops for 10 seconds whenever the machine prints out one sheet, while the degradation of toner is promoted by an preliminary operation at the time of a restart) with single color while sequentially supplying the developer. The resulting print-out image was evaluated for the following items. The results of the evaluation are summarized in Table 2.

[Evaluation of Printed-Out Image]

1. Image Density

An image was printed out on a predetermined number of sheets of usual plain paper for copiers (75 g/m²). An image density was evaluated based on the degree of maintenance of the image density of an image at the time of completion of printing with respect to the initial image. The image density was measured by using Macbeth reflective densitometer (manufactured by Macbeth Co.) relative to a printed-out image of a white back ground portion having an original density of 0.00 based on the following criteria:

◎: Excellent (having an image density of 1.40 or more at the time of completion of printing)
o: Good (having an image density of 1.35 or more and less than 1.40 at the time of completion of printing)
Δ: Fair (having an image density of 1.00 or more and less than 1.35 at the time of completion of printing)
x: Unacceptable (having an image density of less than 1.00 at the time of completion of printing)

2. Image Fog

A certain image was printed out on a predetermined number of sheets of usual plain paper for copiers (75 g/m²) and the printed-out image at the time of completion of a printing test was evaluated with respect to a white solid image. Specifically, evaluation was made in the following manner. A reflective densitometer (REFLECTOMETER ODEL TC-6DS manufactured by Tokyo Denshoku Co., Ltd.) was used to measure the worst value Ds of a reflection density of the white background portion of a printed-out image and the average value Dr of reflection density of a sheet before printing. From these values a value of (Ds−Dr) was obtained, which was defined as a fog amount and evaluated based on the following criteria.

◎: Very good (having a fog amount of 0% or more and less than 1.5%)
o: Good (having a fog amount of 1.5% or more and less than 3.0%)
Δ: Practicable (having a fog amount of 3.0% or more and less than 5.0%)
x: Unpracticable (having a fog amount of less than 5.0% or more)

3. Transferability

A black solid image was printed out on a predetermined number of sheets of usual plain paper for copiers and a dropout amount of the image at the time of completion of printing was detected by visual observation and evaluated based on the following criteria.

◎: Very good (almost no dropout)
o: Good (Slight dropout)
Δ: Practicable
x: Unpracticable.

In addition, in Examples 25 to 30 and Comparative Examples 7 to 12, the image outputs were performed on 5,000 sheets. The occurrence of damages on the surface of the photosensitive drum, the intermediate transfer member, the adhesion of the residual toner, and an influence on printed-out image (i.e., matching with the image forming apparatus) were evaluated by visual observation, respectively. As a result, in the system adopting the two-component developers of Examples 25 to 30, there were absolutely no scratches on the surface of the photosensitive drum and the intermediate transfer member and the adhesion of the residual toner was not confirmed, and there was very good matching with the image forming apparatus. On the other hand, in the system adopting the two-component developers of Comparative Examples 7 to 12, adhesion of the toner on the surface of the photosensitive drum was confirmed in all cases. In addition, in the system adopting the two-component developer of Comparative Examples 7 to 12, a problem arose in matching with the image forming apparatus in that adhesion of the toner on the surface of the intermediate transfer member and surface damages were confirmed and that an image defect such as vertical streaks developed on the image.

Examples 31 to 33 and Comparative Examples 13 to 15

Figure 3:
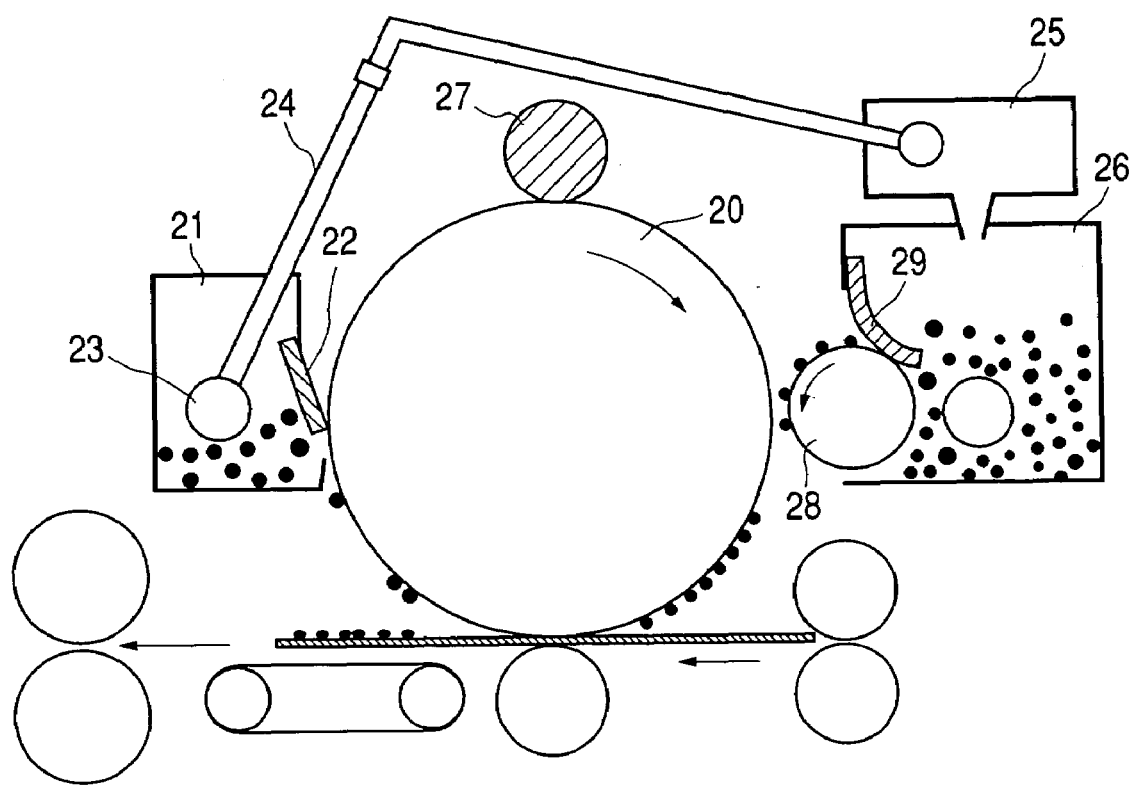
FIG. 3 is a schematic illustration of an image forming apparatus having a reuse mechanism of a toner used in Example 31 to Example 34 and Comparative Example 13 to Comparative Example 15.

When the image forming method of each of Examples 31 to 33 and Comparative Examples 13 to 15 was performed, each of the toners obtained in Examples 1, 5, and 9, and Comparative Examples 1 to 3 was used as a developer. As means for forming an image, as shown in FIG. 3, there was used an image forming apparatus obtained by modifying a commercially available laser beam printer (LBP-EX, produced by Canon, Inc) by attaching a reuse mechanism on the printer and resetting. That is, the image forming apparatus shown in FIG. 3 is provided with the system in which untransferred toner remaining on a photosensitive drum 20 after the transfer is scraped off with an elastic blade 22 of a cleaner 21 in contact with the photosensitive drum 20, and then the scraped-off toner is transferred to the inside of the cleaner 21 by a cleaner roller and is furthermore transferred through a cleaner reuse 23. Subsequently, the toner returns to a developing device 26 through a hopper 25 using a supply pipe 24 provided with a transfer screw, followed by utilizing a recovered toner.

In the image forming apparatus shown in FIG. 3, the surface of the photosensitive drum 20 was charged with a primary charging roller 27. The primary charging roller 27 is a rubber roller (12 mm in diameter and 50 gf/cm in contact pressure) coated with a nylon resin, in which conductive carbon is dispersed. An electrostatic latent image having a dark potential VD of −700 V and a light potential VL of −200 V was formed on the electrostatic latent image bearing member (the photosensitive drum 20) by laser exposure (600 dpi, not shown). As a toner bearing member was a developing sleeve 28 having a surface roughness Ra of 1.1, the surface of which was coated with a resin dispersed with carbon black was used. As a member for restricting the film thickness of the toner, a urethane rubber blade 29 was used by contacting with the surface of the developing sleeve 28.

Figure 4:
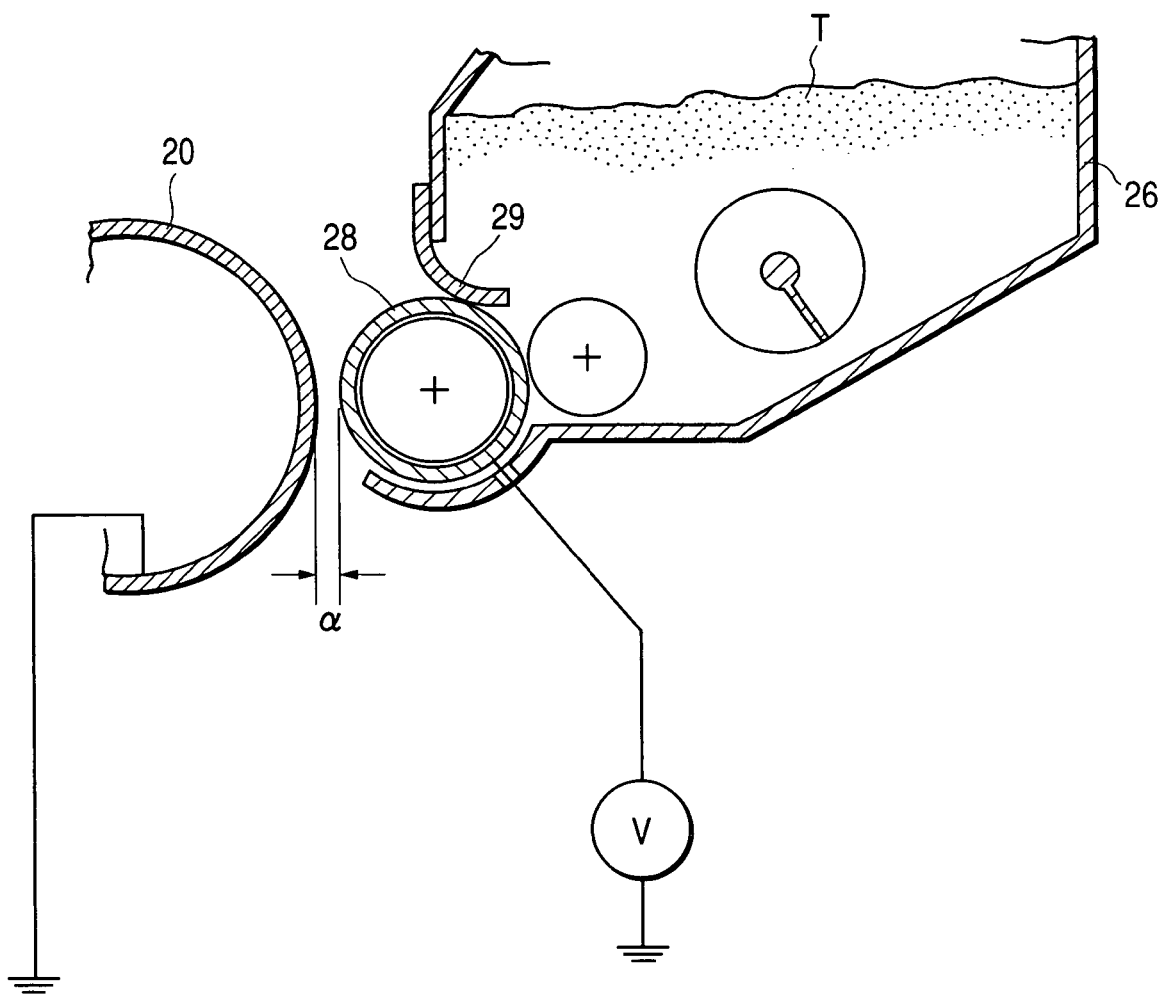
FIG. 4 is a sectional view of a main part of a developing device for a one-component developer used in Example 31 to Example 34 and Comparative Example 13 to Comparative Example 15.

FIG. 4 shows an enlarged sectional view of a main portion of the developing device for a one component developer used in each of Examples 31 to 33 and Comparative Examples 13 to 15. As a condition for developing an electrostatic latent image, the velocity of the developing sleeve 28 was set to be 1.1 times as high as the moving speed of the surface of the photosensitive drum 20 facing the developing sleeve 28. Furthermore, the distance a between the photosensitive drum 20 and the developing sleeve 28 (between S and D) was defined as 270 μm. As a member for restricting the film thickness of the toner, the urethane rubber blade 29 was used by contacting with the surface of the developing sleeve 28. In addition, the predetermined temperature of the thermal fixing device for fixing a toner image was 160° C. Furthermore, as a fixing device, a fixing device shown in each of FIGS. 5 and 6 was used.

[Transition of Image Density while Running]

An image was printed out on a predetermined number of sheets of usual plain paper for copiers (75 g/m$^2$). An image density was evaluated based on the degree of maintenance of the image density of an image at the time of completion of printing with respect to the initial image. The image density was measured by using Macbeth reflective densitometer (manufactured by Macbeth Co.) relative to a printed-out image of a white background portion having an original density of 0.00 based on the following criteria:

◎: Excellent (having an image density of 1.40 or more at the time of completion of printing)
o: Good (having an image density of 1.35 or more and less than 1.40 at the time of completion of printing)
Δ: Fair (having an image density of 1.00 or more and less than 1.35 at the time of completion of printing)
x: Unacceptable (having an image density of less than 1.00 at the time of completion of printing)

[Image Fog]

A certain image was printed out on a predetermined number of sheets of usual plain paper for copiers (75 g/m$^2$) and the printed-out image at the time of completion of a printing was evaluated with respect to the white background area (or a white solid image). Specifically, evaluation was made in the following manner. The white background area of a printed-out image was measured with respect to a reflection density using a reflective densitometer (REFLECTOMETER ODEL TC-6DS manufactured by Tokyo Denshoku Co., Ltd.) and the worst value thereof was named "Ds". The average value of reflection density of a sheet of copy paper before printing was named "Dr". From these values a value of (Ds−Dr) was obtained, which was defined as a fog amount and evaluated based on the following criteria.

◎: Very good (having a fog amount of 0% or more and less than 1.5%)
o: Good (having a fog amount of 1.5% or more and less than 3.0%)
Δ: Practicable (having a fog amount of 3.0% or more and less than 5.0%)
x: Unpracticable (having a fog amount of 5.0% or more)

1. Evaluation on Matching With Developing Sleeve

After the print-out test was completed the appearance of the residual toner adhered on the surface of the developing sleeve and an influence on the printed-out image were evaluated by visual observation.

◎: Very good (no occurrence)
o: Good (little occurrence)
Δ: Practicable (some adhered portions, but little influence on the image)
x: Unpracticable (many adhered portions, unevenness of image)

2. Evaluation on Matching With a Photosensitive Drum

Occurrence of damages or adhesion of residual toner on the surface thereof, and its influence on a printed-out image were evaluated by visual observation.

◎: Very good (no occurrence)
o: Good (a few damages, little influence on image)
Δ: Practicable (some adhered portions and damages, but little influence on image).
x: Unpracticable (many adhered portions, and image defects such as vertical streaks)

3. Evaluation on Matching With a Fixing Device

The surface appearance of a fixing film was observed, and the results of surface quality and the status of adhesion of residual toner were comprehensively averaged to evaluate the durability.

(1) Surface Quality

The appearance of damages and tear on the surface of the fixing film after the completion of the print-out test was visually observed and evaluated.

◎: Very good (no occurrence)
o: Good (little occurrence)
Δ: Practicable
x: Unpracticable (2) Adhesion Status of Residual Toner The adhesion status of the residual toner on the surface of the fixing film after the completion of the print-out test was visually observed and evaluated.

◎: Very good (no occurrence)
o: Good (little occurrence)
Δ: Practicable
x: Unpracticable Example 34

From the image forming apparatus of FIG. 3, the toner reuse mechanism was detached. Then, the print-out test was performed in the same way as that of Examples 31 to 33, except that a print-out speed was set to 16 sheets (A4 size)/min. The test was performed with a continuous mode (i.e., the consumption of toner was facilitated without stopping the developing device) while the blue toner (1) of Example 8 was sequentially supplied. The evaluation on the printed-out image and the matching with an image-evaluating device used were evaluated with respect to the same items as those of Examples 31 to 33 and Comparative Examples 13 to 15. The results were favorable with respect to each item.

TABLE 1

Particle size distribution and chargeability of toners in each color

| Example | Exemplary Compound No. | Toner No. | Particle size distribution Average particle size (μm) | Fine powder amount (%) | Chargeability Normal temperature and normal humidity (Q/M) 10 seconds | 300 seconds | High temperature and high humidity (Q/M) 10 seconds | 300 seconds |
|---|---|---|---|---|---|---|---|---|
| 1 | A-1 | Blue (1) | 7.2 | 4.9 | ◎ | ◎ | ◎ | ◎ |
| 2 | A-4 | Blue (2) | 7.4 | 5.1 | ◎ | ◎ | ◎ | ◎ |
| 3 | A-8 | Blue (3) | 7.2 | 4.8 | ◎ | ◎ | ◎ | ◎ |
| 4 | B-1 | Blue (4) | 7.4 | 5.3 | ◎ | ◎ | ◎ | ◎ |
| 5 | A-1 | Yellow (1) | 7.3 | 5.2 | ◎ | ◎ | ◎ | ◎ |
| 6 | A-4 | Yellow (2) | 7.1 | 5.2 | ◎ | ◎ | ◎ | ◎ |
| 7 | A-8 | Yellow (3) | 7.3 | 5.1 | ◎ | ◎ | ◎ | ◎ |
| 8 | B-1 | Yellow (4) | 7.4 | 5.3 | ◎ | ◎ | ◎ | ◎ |
| 9 | A-2 | Black (1) | 7.0 | 5.1 | ◎ | ◎ | ◎ | ◎ |
| 10 | A-3 | Black (2) | 6.9 | 5.0 | ◎ | ◎ | ◎ | ◎ |
| 11 | A-5 | Black (3) | 7.4 | 5.2 | ◎ | ◎ | ◎ | ◎ |
| 12 | B-2 | Black (4) | 7.3 | 5.4 | ◎ | ◎ | ◎ | ◎ |
| 13 | A-2 | Red (1) | 7.6 | 5.2 | ◎ | ◎ | ◎ | ◎ |
| 14 | A-3 | Red (2) | 7.6 | 5.5 | ◎ | ◎ | ◎ | ◎ |
| 15 | A-5 | Red (3) | 7.5 | 5.3 | ◎ | ◎ | ◎ | ◎ |
| 16 | B-2 | Red (4) | 7.7 | 5.3 | ◎ | ◎ | ◎ | ◎ |
| 17 | A-1 | Black (6) | 7.6 | 5.7 | ◎ | ◎ | ◎ | ◎ |
| 18 | A-4 | Black (7) | 7.8 | 5.6 | ◎ | ◎ | ◎ | ◎ |
| 19 | A-8 | Black (8) | 7.8 | 5.4 | ◎ | ◎ | ◎ | ◎ |
| 20 | B-1 | Black (9) | 7.6 | 5.5 | ◎ | ◎ | ◎ | ◎ |
| 21 | A-1 | Black (11) | 7.4 | 5.0 | ◎ | ◎ | ◎ | ◎ |
| 22 | A-4 | Black (12) | 7.8 | 5.4 | ◎ | ◎ | ◎ | ◎ |
| 23 | A-8 | Black (13) | 7.9 | 5.7 | ◎ | ◎ | ◎ | ◎ |
| 24 | B-1 | Black (14) | 7.6 | 5.3 | ◎ | ◎ | ◎ | ◎ |
| Comparative Example 1 | — | Blue (5) | 7.2 | 5.3 | x | x | x | x |
| Comparative Example 2 | — | Yellow (5) | 7.4 | 5.4 | x | x | x | x |
| Comparative Example 3 | — | Black (5) | 7.2 | 5.1 | x | Δ | x | Δ |
| Comparative Example 4 | — | Red (5) | 7.5 | 5.6 | x | Δ | x | Δ |
| Comparative Example 5 | — | Black (10) | 7.8 | 5.7 | x | Δ | x | Δ |
| Comparative Example 6 | — | Black (15) | 7.7 | 4.9 | x | Δ | x | Δ |

(For the sake of simplicity, the yellow toner is called Yellow and the magenta toner is called Red).

TABLE 2

| Examples | Two-component developer | Normal temperature and normal humidity Image Density | Image Fog | Transferability | High temperature and high humidity Image Density | Image Fog | Transferability |
|---|---|---|---|---|---|---|---|
| 25 | Blue (1) | ◎ | ◎ | ◎ | ◎ | ◎ | ◎ |
| 26 | Yellow (1) | ◎ | ◎ | ◎ | ◎ | ◎ | ◎ |
| 27 | Black (1) | ◎ | ◎ | ◎ | ◎ | ◎ | ◎ |
| 28 | Red (1) | ◎ | ◎ | ◎ | ◎ | ◎ | ◎ |
| 29 | Black (6) | ◎ | ◎ | ◎ | ◎ | ◎ | ◎ |
| 30 | Black (11) | ◎ | ◎ | ◎ | ◎ | ◎ | ◎ |
| Comparative Example 7 | Blue (5) | x | x | x | x | x | x |
| 8 | Yellow (5) | x | x | x | x | x | x |
| 9 | Black (5) | Δ | Δ | x | Δ | x | x |
| 10 | Red (5) | Δ | Δ | x | Δ | x | x |
| 11 | Black (10) | Δ | Δ | x | Δ | x | x |
| 12 | Black (15) | Δ | Δ | x | Δ | x | x |

TABLE 3

| | | Evaluation result of printed-out image | | | | | Evaluation on matching with each device | | | |
|---|---|---|---|---|---|---|---|---|---|---|
| | | Transition of image density while running | | | | Image fog after | | | Fixing device | |
| Example | Toner | Initial stage | 1,000 sheets | 10,000 sheets | 30,000 sheets | 10,000 sheets | Developingsleeve | Photosensitive drum | Surface quality | Toner adhesion |
| 31 | Blue (1) | ◎ | ◎ | ◎ | ◎ | ◎ | ◎ | ◎ | ◎ | ◎ |
| 32 | Yellow (1) | ◎ | ◎ | ○ | ◎ | ◎ | ◎ | ◎ | ◎ | ◎ |
| 33 | Black (1) | ◎ | ◎ | ◎ | ◎ | ◎ | ◎ | ◎ | ◎ | ◎ |
| Comparative Example 13 | Blue (5) | Δ | x | x | x | x | x | x | x | x |
| Comparative Example 14 | Yellow (5) | Δ | x | x | x | x | x | x | x | x |
| Comparative Example 15 | Black (5) | ○ | Δ | x | x | x | x | x | x | x |

The invention claimed is:

1. A polyhydroxyalkanoate, characterized by comprising in a molecule thereof at least one unit represented by the following chemical formula (1);

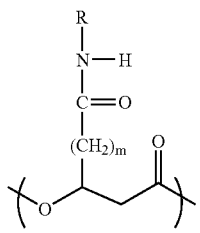

(1)

(R denotes -$A_1$(—$SO_2R_1$)$_x$, $R_1$ is selected from OH, a halogen atom, ONa, OK, and $OR_{1a}$, $R_{1a}$ and $A_1$ are selected from a substituted or unsubstituted aliphatic hydrocarbon structure, a substituted or unsubstituted aromatic ring structure, and a substituted or unsubstituted heterocyclic structure, further, m and x are integers selected from 1 to 8, and when two or more units exist, each of R, $R_1$, $R_{1a}$, $A_1$, m, and x is defined as above independently for each of the units).

2. A polyhydroxyalkanoate according to claim 1, characterized in that the unit represented by the chemical formula (1) is a unit represented by the following chemical formula (2);

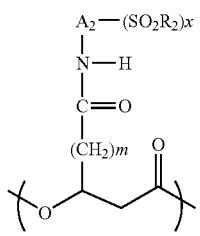

(2)

($R_2$ is selected from OH, a halogen atom, ONa, OK, and $OR_{2a}$, $R_{2a}$ is selected from a straight-chain or branched alkyl group having 1 to 8 carbon atoms and a substituted or unsubstituted phenyl group. $A_2$ is a straight-chain or branched alkylene group having 1 to 8 carbon atoms. Further, m and x are integers selected from 1 to 8, and when two or more units exist, each of $A_2$, $R_2$, $R_{2a}$, m, and x is defined as above independently for each of the units).

3. A polyhydroxyalkanoate according to claim 1, characterized in that the unit represented by the chemical formula (1) is a unit represented by the following chemical formula (3);

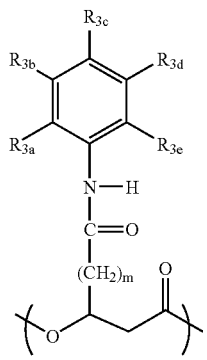

(3)

(at least one of $R_{3a}$, $R_{3b}$, $R_{3c}$, $R_{3d}$, and $R_{3e}$ is selected from $SO_2R_{3f}$ ($R_{3f}$ is selected from OH, a halogen atom, ONa, OK, and $OR_{3f1}$, $R_{3f1}$ is selected from a straight-chain or branched alkyl group having 1 to 8 carbon atoms and a substituted or unsubstituted phenyl group), and in addition, $R_3$ at $R_{3b}$, $R_{3c}$, $R_{3d}$, and $R_{3e}$ are selected from a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ is selected from an H atom, an Na atom, and a K atom), an acetamide group, an OPh group, an NHPh group, a $CF_3$ group, a $C_2F_5$ group, and a $C_3H_7$ group. Further, m is an integer selected from 1 to 8, and when two or more units exist, each of $R_{3a}$, $R_{3b}$, $R_{3c}$, $R_{3d}$, $R_{3e}$, $R_{3f}$, $R_{3f1}$, $R_{3g}$ and m is defined as above independently for each of the units).

4. A polyhydroxyalkanoate according to claim 1, characterized in that the unit represented by the chemical formula (1) is a unit represented by the following chemical formula (4A) or (4B);

(4A)

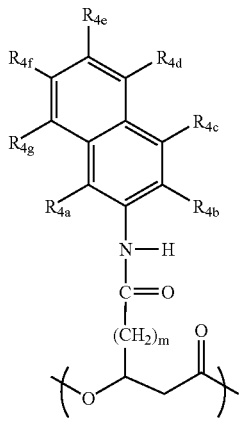

(at least one of $R_{4a}$, $R_{4b}$, $R_{4c}$, $R_{4d}$, $R_{4e}$, $R_{4f}$, and $R_{4g}$ is selected from $SO_2R_{4o}$ ($R_{4o}$ is selected from OH, a halogen atom, ONa, OK, and $OR_{4o1}$. $R_{4o1}$ is selected from a straight-chain or branched alkyl group having 1 to 8 carbon atoms and a substituted or unsubstituted phenyl group). In addition, $R_{4a}$, $R_{4b}$, $R_{4c}$, $R_{4d}$, $R_{4e}$, $R_{4f}$, and $R_{4g}$ are selected from a H atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ is selected from an H atom, an Na atom, and a K atom), an acetamide group, an OPh group, an NHPh group, a $CF_3$ group, a $C_2F_5$ group, and a $C_3H_7$ group, further, m is an integer selected from 1 to 8, and when two or more units exist, each of $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, and m is defined as above independently for each of the units);

(4B)

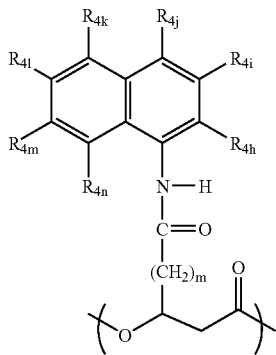

(at least one of $R_{4h}$, $R_{4i}$, $R_{4j}$, $R_{4k}$, $R_{4l}$, $R_{4m}$, and $R_{4n}$ is selected from $SO_2R_{4o}$ ($R_{4o}$ is selected from OH, a halogen atom, ONa, OK, and $R_{4o1}$. $R_{4o1}$ is selected from a straight-chain or branched alkyl group having 1 to 8 carbon atoms and a substituted or unsubstituted phenyl group). In addition, $R_{4h}$, $R_{4i}$, $R_{4j}$, $R_{4k}$, $R_{4l}$, $R_{4m}$, and $R_{4n}$ are selected from a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ is selected from an H atom, an Na atom, and a K atom), an acetamide group, an OPh group, an NHPh group, a $CF_3$ group, a $C_2F_5$ group, and a $C_3H_7$ group. Further, m is an integer selected from 1 to 8, and when two or more units exist, each of $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, and m is defined as above independently for each of the units).

5. A polyhydroxyalkanoate according to claim 1, characterized in that the unit represented by the chemical formula (1) is a unit represented by the following chemical formula (5);

(5)

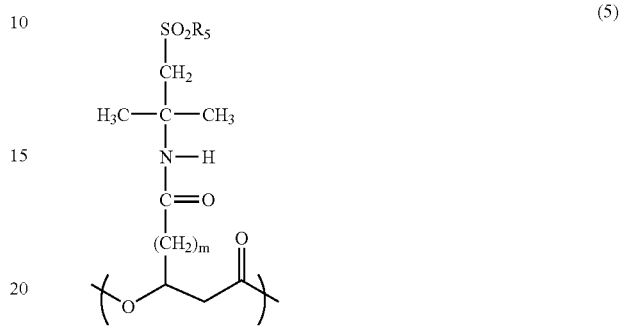

($R_5$ is selected from OH, a halogen atom, ONa, OK, and $OR_{5a}$, $R_{5a}$ is selected from a straight-chain or branched alkyl group having 1 to 8 carbon atoms and a substituted or unsubstituted phenyl group. Further, m is an integer selected from 1 to 8, and when two or more units exist, each of $R_5$, $R_{5a}$, and m is defined as above independently for each of the units).

6. A polyhydroxyalkanoate according to claim 1, characterized in that the unit represented by the chemical formula (1) is a unit represented by the following chemical formula (6);

(6)

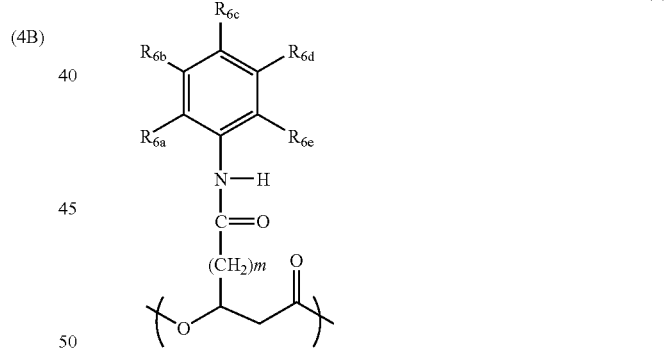

(at least one of $R_{6a}$, $R_{6c}$, and $R_{6e}$ is selected from $SO_2R_{6f}$ ($R_{6f}$ is selected from OH, a halogen atom, ONa, OK, and $OR_{6f1}$, $R_{6f1}$ is selected from a straight-chain or branched alkyl group having 1 to 8 carbon atoms and a substituted or unsubstituted phenyl group). In addition, $R_{6a}$, $R_{6b}$, $R_{6c}$, $R_{6d}$, and $R_{6e}$ are selected from a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{6g}$ ($R_{6g}$ is selected from an H atom, an Na atom, and a K atom), an acetamide group, an OPh group, an NHPh group, a $CF_3$ group, a $C_2F_5$ group, and a $C_3H_7$ group. Further m is an integer selected from 1 to 8, and when two or more units exist, each of $R_{6a}$, $R_{6b}$, $R_{6c}$, $R_{6d}$, $R_{6e}$, $R_{6f}$, $R_{6f1}$, $R_{6g}$, and m is defined as above independently for each of the units).

7. A polyhydroxyalkanoate according to claim 1, characterized in that the unit represented by the chemical formula (1) is a unit represented by the following chemical formula (7A) or (7B);

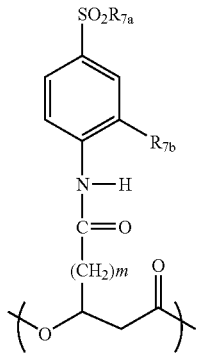
(7A)

($R_{7a}$ is selected from OH, a halogen atom, ONa, OK, and $OR_{7c}$, $R_{7c}$ is selected from a straight-chain or branched alkyl group having 1 to 8 carbon atoms and a substituted or unsubstituted phenyl group. $R_{7b}$ is selected from an H atom, a halogen atom, and a straight-chain or branched alkyl group or alkoxy group having 1 to 20 carbon atoms. Further, m is an integer selected from 1 to 8, and when two or more units exist, each of $R_{7a}$, $R_{7b}$, $R_{7c}$, and m is defined as above independently for each of the units);

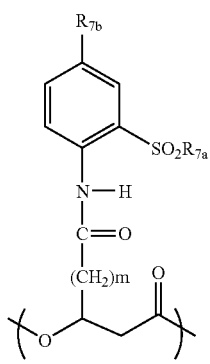
(7B)

($R_{7a}$ is selected from OH, a halogen atom, ONa, OK, and $OR_{7c}$, $R_{7c}$ is selected from a straight-chain or branched alkyl group having 1 to 8 carbon atoms and a substituted or unsubstituted phenyl group. $R_{7b}$ is selected from an H atom, a halogen atom, and a straight-chain or branched alkyl group or alkoxy group having 1 to 20 carbon atoms, further, m is an integer selected from 1 to 8, and when two or more units exist, each of $R_{7a}$, $R_{7b}$, $R_{7c}$, and m is defined as above independently for each of the units).

8. A polyhydroxyalkanoate according to claim 1, characterized in that the unit represented by the chemical formula (1) is a unit represented by the following chemical formula (8A) or (8B);

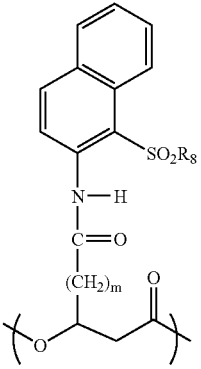
(8A)

($R_8$ is selected from OH, a halogen atom, ONa, OK, and $OR_{8a}$, $R_{8a}$ is selected from a straight-chain or branched alkyl group having 1 to 8 carbon atoms and a substituted or unsubstituted phenyl group. Further, m is an integer selected from 1 to 8, and when two or more units exist, each of $R_8$, $R_{8a}$, and m is defined as above independently for each of the units);

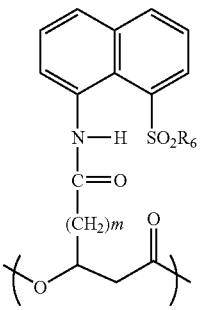
(8B)

($R_8$ is selected from OH, a halogen atom, ONa, OK, and $OR_{8a}$, $R_{8a}$ is selected from a straight-chain or branched alkyl group having 1 to 8 carbon atoms and a substituted or unsubstituted phenyl group, further, m is an integer selected from 1 to 8, and when two or more units exist, each of $R_8$, $R_{8a}$, and m is defined as above independently for each of the units).

9. A polyhydroxyalkanoate according to any one of claims 1 to 8, characterized in that the polyhydroxyalkanoate represented by each of the chemical formulae (1) to (8) further comprises in a molecule thereof at least one unit of m=2, m=4, m=6, or m=8.

10. A polyhydroxyalkanoate according to any one of claims 1 to 8, characterized by comprising, in addition to the units represented by the chemical formulae (1) to (8), at least one of a unit represented by the following chemical formula (9) and a unit represented by the following chemical formula (10);

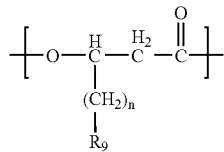
(9)

(n is an integer selected from 1 to 8, $R_9$ denotes a substituent containing a residue having a phenyl structure or a thienyl structure, and when two or more units exist, each of n and $R_9$ is defined as above independently for each of the units);

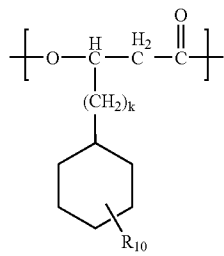
(10)

($R_{10}$ denotes a substituent to a cyclohexyl group and is selected from an H atom, a CN group, an $NO_2$ group, a halogen atom, a $CH_3$ group, a $C_2H_5$ group, a $C_3H_7$ group, a $CF_3$ group, a $C_2F_5$ group, and a $C_3F_7$ group, and k is an integer selected from 0 to 8, when two or more units exist, each of k and $R_{10}$ is defined as above independently for each of the units).

11. A polyhydroxyalkanoate according to claim 10, characterized in that $R_9$ in the chemical formula (9), which contains a residue having one of a phenyl structure and a thienyl structure, is one represented by one of the following chemical formulae (11), (12), (13), (14), (15), (16), (17), (18), (19), (20), and (21), and when two or more units exist, $R_9$ is defined as above independently for each of the units:

a group consisting of unsubstituted and substituted phenyl groups represented by the following chemical formula (11);

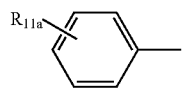
(11)

($R_{11a}$ denotes a substituent to the aromatic ring, and $R_{11a}$ is selected from an H atom, a halogen atom, a CN group, an $NO_2$ group, a $CH_3$ group, a $C_2H_5$ group, a $C_3H_7$ group, a $CH=CH_2$ group, $COOR_{11b}$ ($R_{11b}$ is selected from an H atom, an Na atom, and a K atom), a $CF_3$ group, a $C_2F_5$ group, and a $C_3F_7$ group, and when two or more units exist, $R_{11a}$ is defined as above independently for each of the units);

a group consisting of unsubstituted and substituted phenoxy groups represented by the following chemical formula (12);

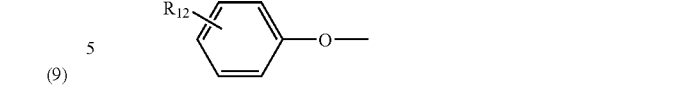
(12)

($R_{12}$ denotes a substituent to the aromatic ring, and $R_{12}$ is selected from an H atom, a halogen atom, a CN group, an $NO_2$ group, a $CH_3$ group, a $C_2H_5$ group, a $C_3H_7$ group, an $SCH_3$ group, a $CF_3$ group, a $C_2F_5$ group, and a $C_3F_7$ group, and when two or more units exist, $R_{12}$ is defined as above independently for each of the units);

a group consisting of unsubstituted and substituted benzoyl groups represented by the following chemical formula (13);

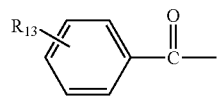
(13)

($R_{13}$ denotes a substituent to the aromatic ring, and $R_{13}$ is selected from an H atom, a halogen atom, a CN group, an $NO_2$ group, a $CH_3$ group, a $C_2H_5$ group, a $C_3H_7$ group, a $CF_3$ group, a $C_2F_5$ group, and a $C_3F_7$ group, and when two or more units exist, $R_{13}$ is defined as above independently for each of the units), a group consisting of unsubstituted and substituted phenylsulfanyl groups represented by the following chemical formula (14);

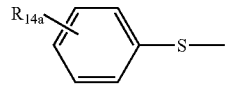
(14)

($R_{14a}$ denotes a substituent to the aromatic ring, and $R_{14a}$ is selected from an H atom, a halogen atom, a CN group, an $NO_2$ group, $COOR_{14b}$, $SO_2R_{14c}$ ($R_{14b}$ is selected from H, Na, K, $CH_3$, and $C_2H_5$, and $R_{14c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and a $(CH_3)_3$—C group, and when two or more units exist, each of $R_{14a}$, $R_{14b}$, and $R_{14c}$ is defined as above independently for each of the units);

a group consisting of unsubstituted and substituted (phenylmethyl)sulfanyl groups represented by the following chemical formula (15);

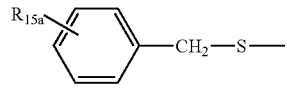
(15)

($R_{15a}$ denotes a substituent to the aromatic ring, and $R_{15a}$ is selected from an H atom, a halogen atom, a CN group, an $NO_2$ group, $COOR_{15b}$, $SO_2R_{15c}$ ($R_{15b}$ is selected from H, Na, K, $CH_3$, and $C_2H_5$, and $R_{15c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and a $(CH_3)_3$—C group, and when two or more units exist, each of $R_{15a}$, $R_{15b}$, and $R_{15c}$ is defined as above independently for each of the units);

a 2-thienyl group represented by the following chemical formula (16);

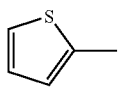
(16)

a 2-thienylsulfanyl group represented by the following chemical formula (17);

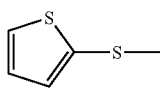
(17)

a 2-thienylcarbonyl group represented by the following chemical formula (18);

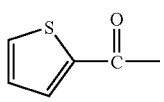
(18)

a group consisting of unsubstituted and substituted phenylsulfinyl groups represented by the following chemical formula (19);

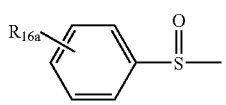
(19)

($R_{16a}$ denotes a substituent to the aromatic ring, and $R_{16a}$ is selected from an H group, a halogen atom, a CN group, an $NO_2$ group, $COOR_{16b}$, $SO_2R_{16c}$ ($R_{16b}$ is selected from H, Na, K, $CH_3$, and $C_2H_5$, and $R_{16c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and a $(CH_3)_3$—C group, and when two or more units exist, each of $R_{16a}$, $R_{16b}$, and $R_{16c}$ is defined as above independently for each of the units);

a group consisting of unsubstituted and substituted phenylsulfonyl groups represented by the following chemical formula (20); and

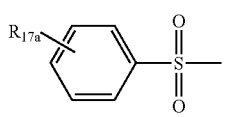
(20)

($R_{17a}$ denotes a substituent to the aromatic ring, and $R_{17a}$ is selected from an H atom, a halogen atom, a CN group, an $NO_2$ group, $COOR_{17b}$, $SO_2R_{17c}$ ($R_{17b}$ is selected from H, Na, K, $CH_3$, and $C_2H_5$, and $R_{17c}$ is selected from OH, ONa, OK, a halogen atom, $OCH_3$, and $OC_2H_5$), a $CH_3$ group, a $C_2H_5$ group, a $C_3H_7$ group, a $(CH_3)_2$—CH group, and a $(CH_3)_3$—C group, and when two or more units exist, each of $R_{17a}$, $R_{17b}$, and $R_{17c}$ is defined as above independently for each of the units);

a group consisting of (phenylmethyl)oxy group represented by the following chemical formula (21);

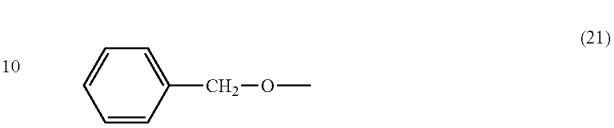
(21)

12. A polyhydroxyalkanoate according to any one of claims 1 to 8, characterized in that the polyhydroxyalkanoate has a number average molecular weight in a range of 1,000 to 1,000,000.

13. A production method of a polyhydroxyalkanoate characterized by comprising the steps of:
preparing a base polyhydroxyalkanoate containing a unit represented by the chemical formula (22) and at least an amine compound represented by the chemical formula (23); and
obtaining a polyhydroxyalkanoate containing a unit represented by the chemical formula (1) through a condensation reaction of the base polyhydroxyalkanoate and the amine compound;

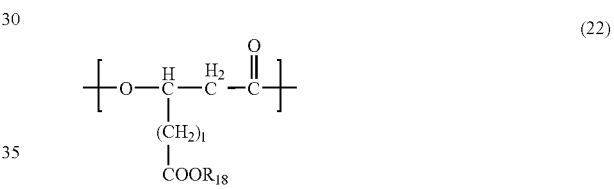
(22)

(l is an integer selected from 1 to 8, $R_{18}$ is selected from an H atom, an Na atom, and a K atom, and when two or more units exist, each of l and $R_{18}$ is defined as above independently for each of the units),

$H_2N\text{-}A_3(\text{—}SO_2R_{19})_y$ (23)

($R_{19}$ is selected from OH, a halogen atom, ONa, OK, and $OR_{19a}$, further, $R_{19a}$ and $A_3$ are selected from a substituted or unsubstituted aliphatic hydrocarbon structure, a substituted or unsubstituted aromatic ring structure, and a substituted or unsubstituted heterocyclic structure, y is an integer selected from 1 to 8, and when two or more units exist, each of $R_{19}$, $R_{19a}$, $A_3$, and y is defined as above independently for each of the units);

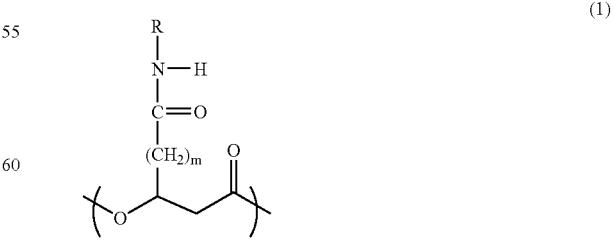
(1)

(R denotes $\text{-}A_1(\text{—}SO_2R_1)_x$, $R_1$ is selected from OH, a halogen atom, ONa, OK, and $OR_{1a}$, $R_{1a}$ and $A_1$ are selected from a substituted or unsubstituted aliphatic hydrocarbon structure, a substituted or unsubstituted aromatic ring structure, and a substituted or unsubstituted heterocyclic structure. Further, m and x are integers selected from 1 to 8, and when two or more units exist, each of R, $R_1$, $R_{1a}$, $A_1$, m, and x is defined as above independently for each of the units).

14. A production method according to claim 13, characterized in that the condensation reaction is a reaction forming an amide bond using a condensation agent.

15. A production method according to claim 14, characterized in that the method is carried out using at least one of the condensation agent selected from the group consisting of a phosphate condensation agent, a carbodiimide condensation agent, and an acid chloride condensation agent.

16. A production method according to claim 13, characterized in that the condensation reaction is a reaction forming an amide bond by converting a carboxylic acid portion of a polyhydroxyalkanoate which contains a unit represented by the chemical formula (22) to an acid chloride, and then reacting it with an amine compound represented by the chemical formula (23).

17. A production method according to claim 16, characterized in that the acid chloride is formed using thionyl chloride.

18. A production method according to claim 13, characterized by further comprising the step of methyl-esterifying an R portion in the chemical formula (1) to $-A_1-SO_3CH_3$ after the condensation reaction when an $R_1$ portion of the chemical formula (1) is one of OH, ONa, and OK.

19. A production method according to claim 18, characterized in that the step of methyl-esterifying is carried out using trimethylsilyldiazomethane.

20. A charge control agent for controlling a charging state of a powder, characterized in that the charge control agent comprises a polyhydroxyalkanoate containing in a molecule at least one unit represented by the chemical formula (1);

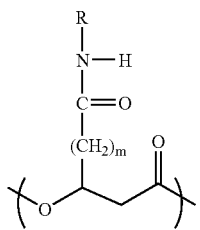

(R denotes $-A_1(-SO_2R_1)_x$, $R_1$ is selected from OH, a halogen atom, ONa, OK, and $OR_{1a}$, $R_{1a}$ and $A_1$ are selected from a substituted or unsubstituted aliphatic hydrocarbon structure, a substituted or unsubstituted aromatic ring structure, and a substituted or unsubstituted heterocyclic structure. Further, m and x are integers selected from 1 to 8, and when two or more units exist, each of R, $R_1$, $R_{1a}$, $A_1$, m, and x is defined as above independently for each of the units).

21. A charge control agent according to claim 20, wherein the powder comprises an electrostatic charge image developing toner.

22. An electrostatic charge image developing toner, characterized by comprising at least a binder resin, a colorant, and the charge control agent according to claim 20.

23. An image forming method, characterized by comprising at least the steps of:
externally applying a voltage to a charging member to charge an electrostatic latent image bearing member;
forming an electrostatic charge image on the charged electrostatic latent image bearing member;
developing the electrostatic charge image by using an electrostatic charge image developing toner to form a toner image on the electrostatic latent image bearing member, the electrostatic charge image developing toner being the electrostatic charge image developing toner according to claim 22;
transferring the toner image on the electrostatic latent image bearing member to a recording medium; and
heat-fixing the toner image on the recording medium.

24. An image forming method according to claim 23, characterized in that:
the transfer step comprises a first transfer step for transferring the toner image on the electrostatic latent image bearing member to an intermediate transfer member, and a second transfer step for transferring the toner image on the intermediate transfer member to a recording medium.

25. An image forming apparatus characterized by comprising at least:
means for externally applying a voltage to a charging member to charge an electrostatic latent image bearing member;
means for forming an electrostatic charge image on the charged electrostatic latent image bearing member;
means for developing the electrostatic charge image by using an electrostatic charge image developing toner to form a toner image on the electrostatic latent image bearing member, the electrostatic charge image developing toner being the electrostatic charge image developing toner according to claim 22;
means for transferring the toner image on the electrostatic latent image bearing member to a recording medium; and
means for heat-fixing the toner image on the recording medium.

26. An image forming apparatus according to claim 25, characterized in that the transfer means comprises a first transfer means for transferring the toner image on the electrostatic latent image bearing member to an intermediate transfer member, and a second transfer means for transferring the toner image on the intermediate transfer member to a recording medium.

* * * * *

UNITED STATES PATENT AND TRADEMARK OFFICE
CERTIFICATE OF CORRECTION

PATENT NO. : 7,393,912 B2
APPLICATION NO. : 11/159354
DATED : July 1, 2008
INVENTOR(S) : Chieko Mihara et al.

It is certified that error appears in the above-identified patent and that said Letters Patent is hereby corrected as shown below:

ON TITLE PAGE AT (57) ABSTRACT

Line 14, "$R_1R_{1a}$," should read --$R_1$, $R_{1a}$,--.

COLUMN 19

Line 32, "$R_{17}C$" should read --$R_{17c}$--.

COLUMN 22

Line 43, "$SO_2R_{4o}$," should read --$SO_2R_{4o}$--.

COLUMN 27

Line 19, "(GPC)" should read --(GPC).--; and
Line 45, "150° C." should read --150° C.,--.

COLUMN 36

Line 46, "75° C." should read --75° C.,--; and
Line 47, "70° C." should read --70° C.,--.

COLUMN 44

Line 37, "Was" should read --was--.

COLUMN 47

Line 27, "Ltd.)." should read --Ltd.)--.

COLUMN 48

Line 6, "(BA)" should read --(8A)--; and
Line 60, "temperature From" should read --temperature. From--.

COLUMN 52

Line 56, "units." should read --units--.

UNITED STATES PATENT AND TRADEMARK OFFICE
CERTIFICATE OF CORRECTION

PATENT NO. : 7,393,912 B2
APPLICATION NO. : 11/159354
DATED : July 1, 2008
INVENTOR(S) : Chieko Mihara et al.

It is certified that error appears in the above-identified patent and that said Letters Patent is hereby corrected as shown below:

COLUMN 55

Line 56, "(25° C." should read --(25° C.,--; and
    Line 57, "(30° C." should read --(30° C.,--.

COLUMN 56

Line 31, "(25° C." should read --(25° C.,--; and
    Line 32, "(30° C." should read --(30° C.,--.

COLUMN 57

Line 4, "(30° C." should read --(30° C.,--.

COLUMN 58

Line 1, "amounts-after" should read --amounts after--;
    Line 5, "C." should read --C.,--;
    Line 6, "(30° C." should read --(30° C.,--;
    Line 48, "(25° C." should read --(25° C.,--; and
    Line 49, "(30° C." should read --(30° C.,--.

COLUMN 59

Line 55, "(25° C." should read --(25° C.,--.

COLUMN 60

Line 55, "(NBR) The" should read --(NBR). The--.

COLUMN 61

Line 23, "(25° C." should read --(25° C.,--; and
    Line 25, "(30° C." should read --(30° C.,--.

COLUMN 63

Line 26, "a" should read --α--.

UNITED STATES PATENT AND TRADEMARK OFFICE
CERTIFICATE OF CORRECTION

PATENT NO.         : 7,393,912 B2
APPLICATION NO. : 11/159354
DATED                  : July 1, 2008
INVENTOR(S)         : Chieko Mihara et al.

It is certified that error appears in the above-identified patent and that said Letters Patent is hereby corrected as shown below:

COLUMN 64

Line 28, "image." should read --image)--.

COLUMN 67

Line 39, "–$A_1$(—$SO_2R_1$)$_x$," should read -- –$A_1$(—$SO_2R_1$)$_x$.--;
    Line 40, "$OR_{1a}$," should read --$OR_{1a}$.--;
    Line 43, "structure, further," should read --structure. Further,--; and
    Line 65, "$OR_{2a}$," should read --$OR_{2a}$.--.

COLUMN 68

Line 50, "$OR_{3f1}$," should read --$OR_{3f1}$.--.

COLUMN 69

Line 32, "group, further," should read --group. Further,--.

COLUMN 70

Line 25, "$OR_{5a}$," should read --$OR_{5a}$.--; and
    Line 52, "$OR_{6f1}$," should read --$OR_{6f1}$.--.

COLUMN 71

Line 28, "$OR_{7c}$," should read --$OR_{7c}$.--;
    Line 59, "$OR_{7c}$," should read --$OR_{7c}$.--; and
    Line 63, "atoms, further," should read --atoms. Further,--.

COLUMN 72

Line 28, "$OR_{8a}$," should read --$OR_{8a}$.--;
    Line 54, "$OR_{8a}$," should read --$OR_{8a}$.--; and
    Line 56, "group, further," should read --group. Further--.

UNITED STATES PATENT AND TRADEMARK OFFICE
CERTIFICATE OF CORRECTION

PATENT NO. : 7,393,912 B2
APPLICATION NO. : 11/159354
DATED : July 1, 2008
INVENTOR(S) : Chieko Mihara et al.

It is certified that error appears in the above-identified patent and that said Letters Patent is hereby corrected as shown below:

COLUMN 73

Line 36, "0 to 8, when" should read --0 to 8. When--.

COLUMN 76

Line 45, "$OR_{19a}$, further," should read --$OR_{19a}$. Further,--;
Line 48, "structure, y." should read --structure. y--;
Line 65, "–A(—$SO_2R_1)_x$, $R_1$" should read -- –$A_1$(—$SO_2,R_1)_x$. $R_1$--; and
Line 66, "$OR_{1a}$, $R_{1a}$" should read --$OR_{1a}$. $R_{1a}$--.

COLUMN 77

Line 48, "–$A_1$(—$SO_2R_1)_x$," should read -- –$A_1$(—$SO_2R_1)_x$.--; and
Line 49, "$OR_{1a}$," should read --$OR_{1a}$.--.

Signed and Sealed this

Tenth Day of February, 2009

JOHN DOLL
*Acting Director of the United States Patent and Trademark Office*